(12) United States Patent
Sato

(10) Patent No.: US 10,834,426 B2
(45) Date of Patent: Nov. 10, 2020

(54) IMAGE PROCESSING DEVICE AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/442,211

(22) PCT Filed: Nov. 21, 2013

(86) PCT No.: PCT/JP2013/081344
§ 371 (c)(1),
(2) Date: May 12, 2015

(87) PCT Pub. No.: WO2014/084108
PCT Pub. Date: Jun. 5, 2014

(65) Prior Publication Data
US 2016/0286238 A1 Sep. 29, 2016

(30) Foreign Application Priority Data

Nov. 30, 2012 (JP) .................................. 2012-263811
Jan. 10, 2013 (JP) .................................. 2013-002877

(51) Int. Cl.
*H04N 19/70* (2014.01)
*H04N 19/57* (2014.01)
(Continued)

(52) U.S. Cl.
CPC ............ *H04N 19/70* (2014.11); *H04N 19/184* (2014.11); *H04N 19/187* (2014.11); *H04N 19/30* (2014.11); *H04N 19/44* (2014.11); *H04N 19/57* (2014.11)

(58) Field of Classification Search
CPC .... H04N 19/70; H04N 19/184; H04N 19/187; H04N 19/30; H04N 19/44; H04N 19/57
(Continued)

(56) References Cited

U.S. PATENT DOCUMENTS

2003/0169814 A1* 9/2003 Fu .......................... H04N 19/70
375/240.12
2008/0089412 A1* 4/2008 Ugur .................... H04N 19/597
375/240.12
(Continued)

FOREIGN PATENT DOCUMENTS

CN 101889447 11/2010
JP 2007-201721 A 8/2007
(Continued)

OTHER PUBLICATIONS

Apr. 21, 2016, European Search Report for related EP Application No. 13858434.7.
(Continued)

*Primary Examiner* — William C Vaughn, Jr.
*Assistant Examiner* — Jae N Noh
(74) *Attorney, Agent, or Firm* — Paratus Law Group, PLLC

(57) ABSTRACT

The present disclosure relates to an image processing device and method which are capable of suppressing a reduction in an increase in coding efficiency. A receiving unit that receives an encoded bitstream including a syntax element related to an inter-image process and an analyzing unit that analyzes the syntax element received by the receiving unit in a state in which a value of the syntax element is restricted when the bitstream is a bitstream encoded based on a profile for encoding a still image are provided. For example, the present disclosure can be applied to an image processing device.

14 Claims, 70 Drawing Sheets

(51) Int. Cl.
  *H04N 19/184*  (2014.01)
  *H04N 19/187*  (2014.01)
  *H04N 19/30*   (2014.01)
  *H04N 19/44*   (2014.01)

(58) Field of Classification Search
  USPC .................................................. 375/240.02
  See application file for complete search history.

(56) References Cited

U.S. PATENT DOCUMENTS

| | | | |
|---|---|---|---|
| 2008/0129648 A1* | 6/2008 | Hagiwara | G09G 5/14 345/1.3 |
| 2009/0141809 A1* | 6/2009 | Visharam | H04N 19/61 375/240.25 |
| 2009/0141810 A1 | 6/2009 | Tabatabai et al. | |
| 2013/0287115 A1* | 10/2013 | Wang | H04N 19/70 375/240.18 |
| 2014/0086315 A1* | 3/2014 | Zhang | H04N 19/172 375/240.12 |
| 2014/0314148 A1* | 10/2014 | Lainema | H04N 19/70 375/240.12 |

FOREIGN PATENT DOCUMENTS

| | | |
|---|---|---|
| JP | 2009-302786 | 12/2009 |
| KR | 10-0768058 B1 | 10/2007 |

OTHER PUBLICATIONS

Symes, et al., "Simple Intra-only H.264/AVC profile for professional applications" Joint Video Team (JVT) of ISO/IEC MPEG & ITU-T VCEG (ISO/IEC JTC1/SC29/WG11 and ITU-T SG16 Q.6), Oct. 20-27, 2006, pp. 1-7, 21$^{st}$ Meeting: Hangzhou, China.
Sullivan, et al., "Overview of the High Efficiency Video Coding (HEVC) Standard", IEEE Transactions on Circuits and Systems for Video Technology, May 25, 2012, pp. 1-19.
Bross, et al., "High efficiency video coding (HEVC) text specification draft 8", Joint Collaborative Team on Video Coding (JCT-VC) of ITU-T SG16 WP3 and ISO/IEC JTC1/SC29/WG11, Jul. 11-20, 2012, pp. i-258, 10$^{th}$ Meeting: Stockholm, SE.
Apr. 29, 2016, European Search Report for related EP Application No. 13858705.0.
Ugur, et al., On still picture profile, Joint Collaborative Team on Video Coding (JCT-VC) of ITU-T SG16 WP3 and ISO/IEC JTC1/SC29/WG11, Jul. 11-20, 2012, p. 1-3, 10$^{th}$ Meeting, Stockholm, Sweden.
Dai, et al., In Support of a Still Image Profile of HEVC v1, Joint Collaborative Team on Video Coding (JCT-VC) of ITU-T SG16 WP3 and ISO/IEC JTC1/SC29/WG11, Oct. 10-19, 2012, p. 1-3, 10$^{th}$ Meeting, Shanghai, China.
ITU-T, Advanced video coding for generic audiovisual services, Recommendation ITU-T H.264, Jan. 2012, p. 287-288.
Apr. 6, 2017, EP communication issued for related EP application No. 13858705.0.
Sep. 1, 2017, CN communication issued for related CN application No. 201380061209.2.
Sep. 20, 2017, CN communication issued for related CN application No. 201380061135.2.
Sep. 7, 2017, JP communication issued for related JP application No. 2014-550148.
Sep. 7, 2017, JP communication issued for related JP application No. 2014-550149.
Ugur, et al., "On still picture profile", Joint Collaborative Team on Video Coding (JCT-VC) of ITU-T SG 16 WP 3 and ISO/IEC JTC 1/SC 29/WG 11, 10$^{th}$ Meeting, Jul. 11-20, 2012, pp. 1-3, Stockholm, SE.
Nov. 28, 2017, Japanese Office Action issued for related JP application No. 2014-550148.
Nov. 28, 2017, Japanese Office Action issued for related JP application No. 2014-550149.
Jan. 15, 2018, European Office Action port issued for related EP application No. 13858705.0.
Jan. 30, 2018, Japanese Office Action issued for related JP application No. 2014-550148.
Jan. 30, 2018, Japanese Office Action issued for related JP application No. 2014-550149.
Dec. 27, 2018, Japanese Office Action issued for related JP Application No. 2018-025748.
Bross et al., High Efficiency Video Coding (HEVC) text specification draft 9, Joint Collaborative Team on Video Coding (JCT-VC) of ITU-T SG16 WP3 and ISO/IEC JTC1/SC29/WG11, Oct. 10-19, 2012, pp. 1, 31, 64, 207, and 208, 11$^{th}$ Meeting, Shanghai, CN.
Sato, Suggested Modifications for Still Picture Profile, Joint Collaborative Team on Video Coding (JCT-VC) of ITU-T SG16 WP3 and ISO/IEC JTC 1/SC 29/WG 11, Jan. 14-23, 2013, pp. 1-12, 12$^{th}$ Meeting, Geneva, CH.
Mar. 12, 2019, Japanese Office Action issued for related JP Application No. 2018-025748.
May 21, 2019, Japanese Office Action issued for related JP Application No. 2018-025748.
Jun. 27, 2019, Japanese Office Action issued for related JP Application No. 2014-550149.
Bross et al., High Efficiency Video Coding (HEVC) text specification draft 9, Joint Collaborative Team on Video Coding (JCT-VC) of ITU-T SG16 WP3 and ISO/IEC JTC1/SC29/WG11, Oct. 10-19, 2012, pp. 1, 65, 207, and 208, 11$^{th}$ Meeting: Shanghai, CN.
Nov. 14, 2019, Japanese Office Action issued for related JP Application No. 2018-025748.
Bross et al., High Efficiency Video Coding (HEVC) text specification draft 9, Joint Collaborative Team on Video Coding (JCT-VC) of ITU-T SG16 WP3 and ISO/IEC JTC1/SC29/WG11, Oct. 10-19, 2012, pp. 1, 73, 207, 208, 226, 227, 11$^{th}$ Meeting: Shanghai, CN.
Mar. 19, 2020, Korean Office Action issued for related KR Application No. 10-2015-7013424.
Mar. 30, 2020, Korean Office Action issued for related KR Application No. 10-2015-7013421.
Rodriguez, Single layer: conformance and temporal id semantics, Joint Collaborative Team on Video Coding (JCT-VC) of ITU-T SG 16 WP 3 and ISO/IEC JTC 1/SC 29/WG 11, Oct. 10-19, 2012, pp. 1-6, 11th Meeting: Shanghai, CN.
Bross, et al., High Efficiency Video Coding (HEVC) text specification draft 6, Joint Collaborative Team on Video Coding (JCT-VC) of ITU-T SG16 WP3 and ISO/IEC JTC1/SC29/WG11, Nov. 21-30, 2011, p. i-225, 7th Meeting, Geneva, Switzerland.

\* cited by examiner

FIG. 3

| | | Descriptor |
|---|---|---|
| 1 | profile_tier_level (ProfilePresentFlag, MaxNumSubLayersMinus1) { | |
| 2 |   if(ProfilePresentFlag) { | |
| 3 |     general_profile_space | u(2) |
| 4 |     general_tier_flag | u(1) |
| 5 |     general_profile_idc | u(5) |
| 6 |     for(i = 0; i < 32; i++) | |
| 7 |       general_profile_compatibility_flag[i] | u(1) |
| 8 |     general_reserved_zero_16bits | u(16) |
| 9 |   } | |
| 10 |   general_level_idc | u(8) |
| 11 |   for(i = 0; i < MaxNumSubLayersMinus1; i++) { | |
| 12 |     sub_layer_profile_present_flag[i] | u(1) |
| 13 |     sub_layer_level_present_flag[i] | u(1) |
| 14 |     if(ProfilePresentFlag && sub_layer_profile_present_flag[i]) { | |
| 15 |       sub_layer_profile_space[i] | u(2) |
| 16 |       sub_layer_tier_flag | u(1) |
| 17 |       sub_layer_profile_idc[i] | u(5) |
| 18 |       for(j = 0; j < 32; j++) | |
| 19 |         sub_layer_profile_compatibility_flag[i][j] | u(1) |
| 20 |       sub_layer_reserved_zero_16bits[i] | u(16) |
| 21 |     } | |
| 22 |     if(sub_layer_level_present_flag[i]) | |
| 23 |       sub_layer_level_idc[i] | u(8) |
| 24 |   } | |
| 25 | } | |

FIG. 4

| 1 | video_parameter_set_rbsp( ) { | Descriptor |
|---|---|---|
| 2 | video_parameter_set_id | u(4) |
| 3 | vps_temporal_id_nesting_flag | u(1) |
| 4 | vps_reserved_zero_2bits | u(2) |
| 5 | vps_reserved_zero_6bits | u(6) |
| 6 | vps_max_sub_layers_minus1 | u(3) |
| 7 | profile_tier_level(1, vps_max_sub_layers_minus1) | |
| 8 | vps_reserved_zero_12bits | u(12) |
| 9 | for(i = 0; i <= vps_max_sub_layers_minus1; i++) { | |
| 10 | vps_max_dec_pic_buffering[i] | ue(v) |
| 11 | vps_max_num_reorder_pics[i] | ue(v) |
| 12 | vps_max_latency_increase[i] | ue(v) |
| 13 | } | |
| 14 | vps_num_hrd_parameters | ue(v) |
| 15 | for(i = 0; i < vps_num_hrd_parameters; i++) { | |
| 16 | if(i > 0) | |
| 17 | op_point(i) | |
| 18 | hrd_parameters(i == 0, vps_max_sub_layers_minus1) | |
| 19 | } | |
| 20 | vps_extension_flag | u(1) |
| 21 | if(vps_extension_flag) | |
| 22 | while(more_rbsp_data( )) | |
| 23 | vps_extension_data_flag | u(1) |
| 24 | } | |
| 25 | rbsp_trailing_bits( ) | |
| 26 | } | |

FIG. 5

| | | Descriptor |
|---|---|---|
| 1 | seq_parameter_set_rbsp( ) { | |
| 2 | video_parameter_set_id | u(4) |
| 3 | sps_max_sub_layers_minus1 | u(3) |
| 4 | sps_reserved_zero_bit | u(1) |
| 5 | profile_tier_level( 1, sps_max_sub_layers_minus1 ) | |
| 6 | seq_parameter_set_id | ue(v) |
| 7 | chroma_format_idc | ue(v) |
| 8 | if(chroma_format_idc = = 3) | |
| 9 | separate_colour_plane_flag | u(1) |
| 10 | pic_width_in_luma_samples | ue(v) |
| 11 | pic_height_in_luma_samples | ue(v) |
| 12 | pic_cropping_flag | u(1) |
| 13 | if(pic_cropping_flag) { | |
| 14 | pic_crop_left_offset | ue(v) |
| 15 | pic_crop_right_offset | ue(v) |
| 16 | pic_crop_top_offset | ue(v) |
| 17 | pic_crop_bottom_offset | ue(v) |
| 18 | } | |
| 19 | bit_depth_luma_minus8 | ue(v) |
| 20 | bit_depth_chroma_minus8 | ue(v) |
| 21 | pcm_enabled_flag | u(1) |
| 22 | if(pcm_enabled_flag) { | |
| 23 | pcm_sample_bit_depth_luma_minus1 | u(4) |
| 24 | pcm_sample_bit_depth_chroma_minus1 | u(4) |
| 25 | } | |
| 26 | log2_max_pic_order_cnt_lsb_minus4 | ue(v) |
| 27 | for(i = 0; i <= sps_max_sub_layers_minus1; i++) { | |
| 28 | sps_max_dec_pic_buffering[i] | ue(v) |
| 29 | sps_max_num_reorder_pics[i] | ue(v) |
| 30 | sps_max_latency_increase[i] | ue(v) |
| 31 | } | |
| 32 | restricted_ref_pic_lists_flag | u(1) |
| 33 | if(restricted_ref_pic_lists_flag) | |
| 34 | lists_modification_present_flag | u(1) |
| 35 | log2_min_coding_block_size_minus3 | ue(v) |
| 36 | log2_diff_max_min_coding_block_size | ue(v) |
| 37 | log2_min_transform_block_size_minus2 | ue(v) |
| 38 | log2_diff_max_min_transform_block_size | ue(v) |
| 39 | if( pcm_enabled_flag) { | |
| 40 | log2_min_pcm_coding_block_size_minus3 | ue(v) |
| 41 | log2_diff_max_min_pcm_coding_block_size | ue(v) |
| 42 | } | |
| 43 | max_transform_hierarchy_depth_inter | ue(v) |
| 44 | max_transform_hierarchy_depth_intra | ue(v) |
| 45 | scaling_list_enable_flag | u(1) |
| 46 | if(scaling_list_enable_flag) { | |
| 47 | sps_scaling_list_data_present_flag | u(1) |

FIG. 6

| 48 | if(sps_scaling_list_data_present_flag) | |
| --- | --- | --- |
| 49 | scaling_list_data() | |
| 50 | } | |
| 51 | amp_enabled_flag | u(1) |
| 52 | sample_adaptive_offset_enabled_flag | u(1) |
| 53 | if(pcm_enabled_flag) | |
| 54 | pcm_loop_filter_disable_flag | u(1) |
| 55 | sps_temporal_id_nesting_flag | u(1) |
| 56 | num_short_term_ref_pic_sets | ue(v) |
| 57 | for(i = 0; i < num_short_term_ref_pic_sets; i++) | |
| 58 | short_term_ref_pic_set(i) | |
| 59 | long_term_ref_pics_present_flag | u(1) |
| 60 | if(long_term_ref_pics_present_flag) { | |
| 61 | num_long_term_ref_pics_sps | ue(v) |
| 62 | for(i = 0; i < num_long_term_ref_pics_sps; i++) { | |
| 63 | lt_ref_pic_poc_lsb_sps[i] | u(v) |
| 64 | used_by_curr_pic_lt_sps_flag[i] | u(1) |
| 65 | } | |
| 66 | } | |
| 67 | sps_temporal_mvp_enable_flag | u(1) |
| 68 | vui_parameters_present_flag | u(1) |
| 69 | if(vui_parameters_present_flag) | |
| 70 | vui_parameters() | |
| 71 | sps_extension_flag | u(1) |
| 72 | if(sps_extension_flag) | |
| 73 | while(more_rbsp_data()) | |
| 74 | sps_extension_data_flag | u(1) |
| 75 | rbsp_trailing_bits() | |
| 76 | } | |

FIG. 7

| | | Descriptor |
|---|---|---|
| 1 | profile_tier_level(MaxNumSubLayersMinus1) { | |
| 2 | general_profile_space | u(2) |
| 3 | general_tier_flag | u(1) |
| 4 | general_profile_idc | u(5) |
| 5 | for( j = 0; j < 32; j++ ) | |
| 6 | general_profile_compatibility_flag[j] | u(1) |
| 7 | general_reserved_zero_16bits | u(16) |
| 8 | general_level_idc | u(8) |
| 9 | for (i = 0; i < MaxNumSubLayersMinus1; i++) { | |
| 10 | sub_layer_profile_present_flag[i] | u(1) |
| 11 | sub_layer_level_present_flag[i] | u(1) |
| 12 | if( ProfilePresentFlag && sub_layer_profile_present_flag[i]) { | |
| 13 | sub_layer_profile_space[i] | u(2) |
| 14 | sub_layer_tier_flag | u(1) |
| 15 | sub_layer_profile_idc[i] | u(6) |
| 16 | for (j = 0; j < 32; j++) | |
| 17 | sub_layer_profile_compatibility_flag[i][j] | u(1) |
| 18 | sub_layer_reserved_zero_16bits[i] | u(16) |
| 19 | } | |
| 20 | if(sub_layer_level_present_flag[i]) | |
| 21 | sub_layer_level_idc[i] | u(8) |
| 22 | } | |
| 23 | } | |

FIG. 8

| 1 | video_parameter_set_rbsp( ) { | Descriptor |
|---|---|---|
| 2 | video_parameter_set_id | u(4) |
| 3 | vps_temporal_id_nesting_flag | u(1) |
| 4 | vps_reserved_zero_2bits | u(2) |
| 5 | vps_reserved_zero_6bits | u(6) |
| 6 | vps_max_sub_layers_minus1 | u(3) |
| 7 | profile_tier_level(vps_max_sub_layers_minus1) | |
| 8 | vps_reserved_zero_12bits | u(12) |
| 9 | for( i = 0; i <= vps_max_sub_layers_minus1; i++ ) { | |
| 10 | vps_max_dec_pic_buffering[i] | ue(v) |
| 11 | vps_max_num_reorder_pics[i] | ue(v) |
| 12 | vps_max_latency_increase[i] | ue(v) |
| 13 | } | |
| 14 | vps_num_hrd_parameters | ue(v) |
| 15 | for( i = 0; i < vps_num_hrd_parameters; i++ ) { | |
| 16 | if( i > 0 ) | |
| 17 | op_point(i) | |
| 18 | hrd_parameters(i == 0, vps_max_sub_layers_minus1) | |
| 19 | } | |
| 20 | vps_extension_flag | u(1) |
| 21 | if(vps_extension_flag) | |
| 22 | while(more_rbsp_data( )) | |
| 23 | vps_extension_data_flag | u(1) |
| 24 | } | |
| 25 | rbsp_trailing_bits( ) | |
| 26 | } | |

FIG. 9

| | | Descriptor |
|---|---|---|
| 1 | seq_parameter_set_rbsp( ) { | |
| 2 |   video_parameter_set_id | u(4) |
| 3 |   sps_max_sub_layers_minus1 | u(3) |
| 4 |   sps_reserved_zero_bit | u(1) |
| 5 |   profile_tier_level(sps_max_sub_layers_minus1) | |
| 6 |   seq_parameter_set_id | ue(v) |
| 7 |   chroma_format_idc | ue(v) |
| 8 |   if(chroma_format_idc == 3) | |
| 9 |     separate_colour_plane_flag | u(1) |
| 10 |   pic_width_in_luma_samples | ue(v) |
| 11 |   pic_height_in_luma_samples | ue(v) |
| 12 |   pic_cropping_flag | u(1) |
| 13 |   if(pic_cropping_flag) { | |
| 14 |     pic_crop_left_offset | ue(v) |
| 15 |     pic_crop_right_offset | ue(v) |
| 16 |     pic_crop_top_offset | ue(v) |
| 17 |     pic_crop_bottom_offset | ue(v) |
| 18 |   } | |
| 19 |   bit_depth_luma_minus8 | ue(v) |
| 20 |   bit_depth_chroma_minus8 | ue(v) |
| 21 |   pcm_enabled_flag | u(1) |
| 22 |   if(pcm_enabled_flag) { | |
| 23 |     pcm_sample_bit_depth_luma_minus1 | u(4) |
| 24 |     pcm_sample_bit_depth_chroma_minus1 | u(4) |
| 25 |   } | |
| 26 |   log2_max_pic_order_cnt_lsb_minus4 | ue(v) |
| 27 |   for(i = 0; i <= sps_max_sub_layers_minus1; i++) { | |
| 28 |     sps_max_dec_pic_buffering[i] | ue(v) |
| 29 |     sps_max_num_reorder_pics[i] | ue(v) |
| 30 |     sps_max_latency_increase[i] | ue(v) |
| 31 |   } | |
| 32 |   restricted_ref_pic_lists_flag | u(1) |
| 33 |   if(restricted_ref_pic_lists_flag) | |
| 34 |     lists_modification_present_flag | u(1) |
| 35 |   log2_min_coding_block_size_minus3 | ue(v) |
| 36 |   log2_diff_max_min_coding_block_size | ue(v) |
| 37 |   log2_min_transform_block_size_minus2 | ue(v) |
| 38 |   log2_diff_max_min_transform_block_size | ue(v) |
| 39 |   if(pcm_enabled_flag) { | |
| 40 |     log2_min_pcm_coding_block_size_minus3 | ue(v) |
| 41 |     log2_diff_max_min_pcm_coding_block_size | ue(v) |
| 42 |   } | |
| 43 |   max_transform_hierarchy_depth_inter | ue(v) |
| 44 |   max_transform_hierarchy_depth_intra | ue(v) |
| 45 |   scaling_list_enable_flag | u(1) |
| 46 |   if(scaling_list_enable_flag) { | |
| 47 |     sps_scaling_list_data_present_flag | u(1) |

FIG. 10

| 48 | if(sps_scaling_list_data_present_flag) | |
| --- | --- | --- |
| 49 | scaling_list_data() | |
| 50 | } | |
| 51 | amp_enabled_flag | u(1) |
| 52 | sample_adaptive_offset_enabled_flag | u(1) |
| 53 | if(pcm_enabled_flag) | |
| 54 | pcm_loop_filter_disable_flag | u(1) |
| 55 | sps_temporal_id_nesting_flag | u(1) |
| 56 | num_short_term_ref_pic_sets | ue(v) |
| 57 | for(i = 0; i < num_short_term_ref_pic_sets; i++) | |
| 58 | short_term_ref_pic_set(i) | |
| 59 | long_term_ref_pics_present_flag | u(1) |
| 60 | if(long_term_ref_pics_present_flag) { | |
| 61 | num_long_term_ref_pics_sps | ue(v) |
| 62 | for(i = 0; i < num_long_term_ref_pics_sps; i++) { | |
| 63 | lt_ref_pic_poc_lsb_sps[ i ] | u(v) |
| 64 | used_by_curr_pic_lt_sps_flag[i] | u(1) |
| 65 | } | |
| 66 | } | |
| 67 | sps_temporal_mvp_enable_flag | u(1) |
| 68 | vui_parameters_present_flag | u(1) |
| 69 | if(vui_parameters_present_flag) | |
| 70 | vui_parameters() | |
| 71 | sps_extension_flag | u(1) |
| 72 | if(sps_extension_flag) | |
| 73 | while(more_rbsp_data()) | |
| 74 | sps_extension_data_flag | u(1) |
| 75 | rbsp_trailing_bits() | |
| 76 | } | |

FIG. 11

| 1 | video_parameter_set_rbsp( ) { | Descriptor |
|---|---|---|
| 2 |    video_parameter_set_id | u(4) |
| 3 |    vps_temporal_id_nesting_flag | u(1) |
| 4 |    vps_reserved_zero_2bits | u(2) |
| 5 |    vps_reserved_zero_6bits | u(6) |
| 6 |    profile_tier_level(1, 0) | |
| 7 |    vps_max_sub_layers_minus1 | u(3) |
| 8 |    profile_tier_level(0, vps_max_sub_layers_minus1) | |
| 9 |    vps_reserved_zero_12bits | u(12) |
| 10 |    for(i = 0; i <= vps_max_sub_layers_minus1; i++) { | |
| 11 |      vps_max_dec_pic_buffering[i] | ue(v) |
| 12 |      vps_max_num_reorder_pics[i] | ue(v) |
| 13 |      vps_max_latency_increase[i] | ue(v) |
| 14 |    } | |
| 15 |    vps_num_hrd_parameters | ue(v) |
| 16 |    for(i = 0; i < vps_num_hrd_parameters; i++) { | |
| 17 |      if(i > 0) | |
| 18 |        op_point(i) | |
| 19 |      hrd_parameters(i == 0, vps_max_sub_layers_minus1) | |
| 20 |    } | |
| 21 |    vps_extension_flag | u(1) |
| 22 |    if(vps_extension_flag) | |
| 23 |      while( more_rbsp_data( )) | |
| 24 |        vps_extension_data_flag | u(1) |
| 25 |    } | |
| 26 |    rbsp_trailing_bits( ) | |
| 27 | } | |

FIG. 12

| | | Descriptor |
|---|---|---|
| 1 | seq_parameter_set_rbsp( ) { | |
| 2 | video_parameter_set_id | u(4) |
| 3 | profile_tier_level(1,0) | |
| 4 | sps_max_sub_layers_minus1 | u(3) |
| 5 | sps_reserved_zero_bit | u(1) |
| 6 | profile_tier_level(0,sps_max_sub_layers_minus1) | |
| 7 | seq_parameter_set_id | ue(v) |
| 8 | chroma_format_idc | ue(v) |
| 9 | if(chroma_format_idc = = 3) | |
| 10 | separate_colour_plane_flag | u(1) |
| 11 | pic_width_in_luma_samples | ue(v) |
| 12 | pic_height_in_luma_samples | ue(v) |
| 13 | pic_cropping_flag | u(1) |
| 14 | if(pic_cropping_flag) { | |
| 15 | pic_crop_left_offset | ue(v) |
| 16 | pic_crop_right_offset | ue(v) |
| 17 | pic_crop_top_offset | ue(v) |
| 18 | pic_crop_bottom_offset | ue(v) |
| 19 | } | |
| 20 | bit_depth_luma_minus8 | ue(v) |
| 21 | bit_depth_chroma_minus8 | ue(v) |
| 22 | pcm_enabled_flag | u(1) |
| 23 | if(pcm_enabled_flag) { | |
| 24 | pcm_sample_bit_depth_luma_minus1 | u(4) |
| 25 | pcm_sample_bit_depth_chroma_minus1 | u(4) |
| 26 | } | |
| 27 | log2_max_pic_order_cnt_lsb_minus4 | ue(v) |
| 28 | for(i = 0;i <= sps_max_sub_layers_minus1; i++) { | |
| 29 | sps_max_dec_pic_buffering[i] | ue(v) |
| 30 | sps_max_num_reorder_pics[i] | ue(v) |
| 31 | sps_max_latency_increase[i] | ue(v) |
| 32 | } | |
| 33 | restricted_ref_pic_lists_flag | u(1) |
| 34 | if(restricted_ref_pic_lists_flag) | |
| 35 | lists_modification_present_flag | u(1) |
| 36 | log2_min_coding_block_size_minus3 | ue(v) |
| 37 | log2_diff_max_min_coding_block_size | ue(v) |
| 38 | log2_min_transform_block_size_minus2 | ue(v) |
| 39 | log2_diff_max_min_transform_block_size | ue(v) |
| 40 | if(pcm_enabled_flag) { | |
| 41 | log2_min_pcm_coding_block_size_minus3 | ue(v) |
| 42 | log2_diff_max_min_pcm_coding_block_size | ue(v) |
| 43 | } | |
| 44 | max_transform_hierarchy_depth_inter | ue(v) |
| 45 | max_transform_hierarchy_depth_intra | ue(v) |
| 46 | scaling_list_enable_flag | u(1) |
| 47 | if(scaling_list_enable_flag) { | |

FIG. 13

| 48 | sps_scaling_list_data_present_flag | u(1) |
|---|---|---|
| 49 | if(sps_scaling_list_data_present_flag) | |
| 50 | scaling_list_data() | |
| 51 | } | |
| 52 | amp_enabled_flag | u(1) |
| 53 | sample_adaptive_offset_enabled_flag | u(1) |
| 54 | if(pcm_enabled_flag) | |
| 55 | pcm_loop_filter_disable_flag | u(1) |
| 56 | sps_temporal_id_nesting_flag | u(1) |
| 57 | num_short_term_ref_pic_sets | ue(v) |
| 58 | for(i = 0;i < num_short_term_ref_pic_sets;i++) | |
| 59 | short_term_ref_pic_set(i) | |
| 60 | long_term_ref_pics_present_flag | u(1) |
| 61 | if(long_term_ref_pics_present_flag) { | |
| 62 | num_long_term_ref_pics_sps | ue(v) |
| 63 | for(i = 0;i < num_long_term_ref_pics_sps;i++ ) { | |
| 64 | lt_ref_pic_poc_lsb_sps[i] | u(v) |
| 65 | used_by_curr_pic_lt_sps_flag[i] | u(1) |
| 66 | } | |
| 67 | } | |
| 68 | sps_temporal_mvp_enable_flag | u(1) |
| 69 | vui_parameters_present_flag | u(1) |
| 70 | if(vui_parameters_present_flag) | |
| 71 | vui_parameters( ) | |
| 72 | sps_extension_flag | u(1) |
| 73 | if(sps_extension_flag) | |
| 74 | while(more_rbsp_data( )) | |
| 75 | sps_extension_data_flag | u(1) |
| 76 | rbsp_trailing_bits( ) | |
| 77 | } | |

FIG. 14

| | | Descriptor |
|---|---|---|
| 1 | pic_parameter_set_rbsp( ) { | |
| 2 |   pps_pic_parameter_set_id | ue(v) |
| 3 |   pps_seq_parameter_set_id | ue(v) |
| 4 |   dependent_slice_segments_enabled_flag | u(1) |
| 5 |   sign_data_hiding_flag | u(1) |
| 6 |   cabac_init_present_flag | u(1) |
| 7 |   num_ref_idx_l0_default_active_minus1 | ue(v) |
| 8 |   num_ref_idx_l1_default_active_minus1 | ue(v) |
| 9 |   init_qp_minus26 | se(v) |
| 10 |   constrained_intra_pred_flag | u(1) |
| 11 |   transform_skip_enabled_flag | u(1) |
| 12 |   cu_qp_delta_enabled_flag | u(1) |
| 13 |   if(cu_qp_delta_enabled_flag) | |
| 14 |     diff_cu_qp_delta_depth | ue(v) |
| 15 |   pps_cb_qp_offset | se(v) |
| 16 |   pps_cr_qp_offset | se(v) |
| 17 |   pps_slice_chroma_qp_offsets_present_flag | u(1) |
| 18 |   weighted_pred_flag | u(1) |
| 19 |   weighted_bipred_flag | u(1) |
| 20 |   output_flag_present_flag | u(1) |
| 21 |   transquant_bypass_enable_flag | u(1) |
| 22 |   tiles_enabled_flag | u(1) |
| 23 |   entropy_coding_sync_enabled_flag | u(1) |
| 24 |   if(tiles_enabled_flag) { | |
| 25 |     num_tile_columns_minus1 | ue(v) |
| 26 |     num_tile_rows_minus1 | ue(v) |
| 27 |     uniform_spacing_flag | u(1) |
| 28 |     if(!uniform_spacing_flag) { | |
| 29 |       for(i = 0; i < num_tile_columns_minus1; i++) | |
| 30 |         column_width_minus1[i] | ue(v) |
| 31 |       for(i = 0; i < num_tile_rows_minus1; i++) | |
| 32 |         row_height_minus1[i] | ue(v) |
| 33 |     } | |
| 34 |     loop_filter_across_tiles_enabled_flag | u(1) |
| 35 |   } | |
| 36 |   loop_filter_across_slices_enabled_flag | u(1) |
| 37 |   deblocking_filter_control_present_flag | u(1) |
| 38 |   if(deblocking_filter_control_present_flag) { | |
| 39 |     deblocking_filter_override_enabled_flag | u(1) |
| 40 |     pps_disable_deblocking_filter_flag | u(1) |
| 41 |     if(!pps_disable_deblocking_filter_flag) { | |
| 42 |       pps_beta_offset_div2 | se(v) |
| 43 |       pps_tc_offset_div2 | se(v) |
| 44 |     } | |
| 45 |   } | |

FIG. 15

| 46 | pps_scaling_list_data_present_flag | u(1) |
|---|---|---|
| 47 | if(pps_scaling_list_data_present_flag) | |
| 48 | scaling_list_data() | |
| 49 | lists_modification_present_flag | u(1) |
| 50 | log2_parallel_merge_level_minus2 | ue(v) |
| 51 | num_extra_slice_header_bits | u(3) |
| 52 | slice_segment_header_extension_present_flag | u(1) |
| 53 | pps_extension_flag | u(1) |
| 54 | if(pps_extension_flag) | |
| 55 | while(more_rbsp_data()) | |
| 56 | pps_extension_data_flag | u(1) |
| 57 | rbsp_trailing_bits() | |
| 58 | } | |

FIG. 16

| 1 | scaling_list_data() { | Descriptor |
|---|---|---|
| 2 | for(sizeID = 0;sizeID < 4;sizeID++) | |
| 3 | for(matrixID = 0;matrixID < (sizeID = = 3)?2:6;matrixID++) { | |
| 4 | scaling_list_pred_mode_flag | u(1) |
| 5 | if(!scaling_list_pred_mode_flag) | |
| 6 | scaling_list_pred_matrix_id_delta | ue(v) |
| 7 | else | |
| 8 | scaling_list_for_matrix(sizeID,matrixID) | |
| 9 | } | |
| 10 | } | |

FIG. 17

| 1 | Size of quantization matrix | SizeID |
|---|---|---|
| 2 | 4x4 | 0 |
| 3 | 8x8 | 1 |
| 4 | 16x16 | 2 |
| 5 | 32x32 | 3 |

FIG. 18

| | SizeID | Prediction type | Colour component | MatrixID |
|---|---|---|---|---|
| 1 | | | | |
| 2 | 0, 1, 2 | Intra | Y | 0 |
| 3 | 0, 1, 2 | Intra | Cb | 1 |
| 4 | 0, 1, 2 | Intra | Cr | 2 |
| 5 | 0, 1, 2 | Inter | Y | 3 |
| 6 | 0, 1, 2 | Inter | Cb | 4 |
| 7 | 0, 1, 2 | Inter | Cr | 5 |
| 8 | 3 | Intra | Y | 0 |
| 9 | 3 | Inter | Y | 1 |

FIG. 19

| 1 | scaling_list_data( ) { | Descriptor |
|---|---|---|
| 2 | for( sizeID = 0; sizeID < 4; sizeID++ ) | |
| 3 | for( matrixID = 0; matrixID < ( sizeID = = 3 ) ? 2 : 6; matrixID++ ) { | |
| 4 | *if(!((sizeID==0 || sizeID==1 || sizeID==2)&&matrixID==3 || matrixID==4 || matrixID==5) || (sizeID==3&&matrixID==1))* | |
| 5 | scaling_list_pred_mode_flag | u(1) |
| 6 | if(!scaling_list_pred_mode_flag) | |
| 7 | scaling_list_pred_matrix_id_delta | ue(v) |
| 8 | else | |
| 9 | scaling_list_for_matrix(sizeID, matrixID) | |
| 10 | | |
| 11 | } | |
| 12 | } | |

FIG. 20

| | | Descriptor |
|---|---|---|
| 1 | slice_header( ) { | |
| 2 |   first_slice_in_pic_flag | u(1) |
| 3 |   if(RapPicFlag) | |
| 4 |     no_output_of_prior_pics_flag | u(1) |
| 5 |   pic_parameter_set_id | ue(v) |
| 6 |   if(!first_slice_in_pic_flag) | |
| 7 |     slice_address | u(v) |
| 8 |   if(dependent_slice_enabled_flag && !first_slice_in_pic_flag) | |
| 9 |     dependent_slice_flag | u(1) |
| 10 |   if(!dependent_slice_flag) { | |
| 11 |     slice_type | ue(v) |
| 12 |     if(output_flag_present_flag) | |
| 13 |       pic_output_flag | u(1) |
| 14 |     if(separate_colour_plane_flag == 1) | |
| 15 |       colour_plane_id | u(2) |
| 16 |     if(!IdrPicFlag) | |
| 17 |       pic_order_cnt_lsb | u(v) |
| 18 |       short_term_ref_pic_set_sps_flag | u(1) |
| 19 |       if(!short_term_ref_pic_set_sps_flag) | |
| 20 |         short_term_ref_pic_set(num_short_term_ref_pic_sets) | |
| 21 |       else | |
| 22 |         short_term_ref_pic_set_idx | u(v) |
| 23 |       if(long_term_ref_pics_present_flag) { | |
| 24 |         if(num_long_term_ref_pics_sps > 0) | |
| 25 |           num_long_term_sps | ue(v) |
| 26 |         num_long_term_pics | ue(v) |
| 27 |         for(i = 0; i < num_long_term_sps + num_long_term_pics; i++) { | |
| 28 |           if(i < num_long_term_sps) | |
| 29 |             lt_idx_sps[i] | u(v) |
| 30 |           else { | |
| 31 |             poc_lsb_lt[i] | u(v) |
| 32 |             used_by_curr_pic_lt_flag[i] | u(1) |
| 33 |           } | |
| 34 |           delta_poc_msb_present_flag[i] | u(1) |
| 35 |           if(delta_poc_msb_present_flag[i]) | |
| 36 |             delta_poc_msb_cycle_lt[i] | ue(v) |
| 37 |         } | |
| 38 |       } | |
| 39 |     } | |
| 40 |     if(sample_adaptive_offset_enabled_flag) { | |
| 41 |       slice_sao_luma_flag | u(1) |
| 42 |       slice_sao_chroma_flag | u(1) |
| 43 |     } | |
| 44 |     if(slice_type == P || slice_type == B) { | |
| 45 |       if(sps_temporal_mvp_enable_flag) | |
| 46 |         slice_temporal_mvp_enable_flag | u(1) |
| 47 |       num_ref_idx_active_override_flag | u(1) |

FIG. 21

| 48 | if(num_ref_idx_active_override_flag) { | |
| --- | --- | --- |
| 49 | num_ref_idx_l0_active_minus1 | ue(v) |
| 50 | if(slice_type == B) | |
| 51 | num_ref_idx_l1_active_minus1 | ue(v) |
| 52 | } | |
| 53 | if( lists_modification_present_flag) | |
| 54 | ref_pic_list_modification( ) | |
| 55 | if(slice_type == B) | |
| 56 | mvd_l1_zero_flag | u(1) |
| 57 | if(cabac_init_present_flag) | |
| 58 | cabac_init_flag | u(1) |
| 59 | if(slice_temporal_mvp_enable_flag) { | |
| 60 | if(slice_type == B) | |
| 61 | collocated_from_l0_flag | u(1) |
| 62 | if((collocated_from_l0_flag && num_ref_idx_l0_active_minus1 > 0) \|\| (!collocated_from_l0_flag && num_ref_idx_l1_active_minus1 > 0)) | |
| 63 | collocated_ref_idx | ue(v) |
| 64 | } | |
| 65 | if((weighted_pred_flag && slice_type == P) \|\| (weighted_bipred_flag && slice_type == B)) | |
| 66 | pred_weight_table( ) | |
| 67 | five_minus_max_num_merge_cand | ue(v) |
| 68 | } | |
| 69 | slice_qp_delta | se(v) |
| 70 | if(pic_slice_level_chroma_qp_offsets_present_flag) { | |
| 71 | slice_cb_qp_offset | se(v) |
| 72 | slice_cr_qp_offset | se(v) |
| 73 | } | |
| 74 | if(deblocking_filter_control_present_flag) { | |
| 75 | if(deblocking_filter_override_enabled_flag ) | |
| 76 | deblocking_filter_override_flag | u(1) |
| 77 | if(deblocking_filter_override_flag) { | |
| 78 | slice_header_disable_deblocking_filter_flag | u(1) |
| 79 | if(!slice_header_disable_deblocking_filter_flag) { | |
| 80 | beta_offset_div2 | se(v) |
| 81 | tc_offset_div2 | se(v) |
| 82 | } | |
| 83 | } | |
| 84 | } | |
| 85 | if(loop_filter_across_slices_enabled_flag && (slice_sao_luma_flag \|\| slice_sao_chroma_flag \|\| !disable_deblocking_filter_flag)) | |
| 86 | slice_loop_filter_across_slices_enabled_flag | u(1) |
| 87 | } | |
| 88 | if(tiles_enabled_flag \|\| entropy_coding_sync_enabled_flag) { | |
| 89 | num_entry_point_offsets | ue(v) |
| 90 | if(num_entry_point_offsets > 0) { | |
| 91 | offset_len_minus1 | ue(v) |

FIG. 22

| 92 | for(i = 0;i < num_entry_point_offsets;i++) | |
| --- | --- | --- |
| 93 | entry_point_offset[i] | u(v) |
| 94 | } | |
| 95 | } | |
| 96 | if(slice_header_extension_present_flag) { | |
| 97 | slice_header_extension_length | ue(v) |
| 98 | for(i = 0;i < slice_header_extension_length;i++) | |
| 99 | slice_header_extension_data_byte[i] | u(8) |
| 100 | } | |
| 101 | byte_alignment( ) | |
| 102 | } | |

FIG. 23

| | nal_unit_type | Name of nal_unit_type | Content of NAL unit and RBSP syntax structure | NAL unit type class |
|---|---|---|---|---|
| 1 | nal_unit_type | Name of nal_unit_type | Content of NAL unit and RBSP syntax structure | NAL unit type class |
| 2 | 0 | UNSPEC0 | Unspecified | non-VCL |
| 3 | 1, 2 | TRAIL_R, TRAIL_N | Coded slice of a non-TSA, non-STSA trailing picture slice_layer_rbsp( ) | VCL |
| 4 | 3, 4 | TSA_R, TSA_N | Coded slice of a TSA picture slice_layer_rbsp( ) | VCL |
| 5 | 5, 6 | STSA_R, STSA_N | Coded slice of an STSA picture slice_layer_rbsp( ) | VCL |
| 6 | 7, 8, 9 | BLA_W_TFD BLA_W_DLP BLA_N_LP | Coded slice of a BLA picture slice_layer_rbsp( ) | VCL |
| 7 | 10, 11 | IDR_W_LP IDR_N_LP | Coded slice of an IDR picture slice_layer_rbsp( ) | VCL |
| 8 | 12 | CRA_NUT | Coded slice of a CRA picture slice_layer_rbsp( ) | VCL |
| 9 | 13 | DLP_NUT | Coded slice of a DLP picture slice_layer_rbsp( ) | VCL |
| 10 | 14 | TFD_NUT | Coded slice of a TFD picture slice_layer_rbsp( ) | VCL |
| 11 | 15..20 | RSV_VCL15.. RSV_VCL20 | Reserved | VCL |
| 12 | 21..24 | RSV_NVCL21.. RSV_NVCL24 | Reserved | non-VCL |
| 13 | 25 | VPS_NUT | Video parameter set video_parameter_set_rbsp( ) | non-VCL |
| 14 | 26 | SPS_NUT | Sequence parameter set seq_parameter_set_rbsp( ) | non-VCL |
| 15 | 27 | PPS_NUT | Picture parameter set pic_parameter_set_rbsp( ) | non-VCL |
| 16 | 28 | AUD_NUT | Access unit delimiter access_unit_delimiter_rbsp( ) | non-VCL |
| 17 | 29 | EOS_NUT | End of sequence end_of_seq_rbsp( ) | non-VCL |
| 18 | 30 | EOB_NUT | End of bitsteam end_of_bitstream_rbsp( ) | non-VCL |
| 19 | 31 | FD_NUT | Filler data filler_data_rbsp( ) | non-VCL |
| 20 | 32 | SEI_NUT | Supplemental enhancement information (SEI) sei_rbsp( ) | non-VCL |
| 21 | 33..47 | RSV_NVCL33.. RSV_NVCL47 | Reserved | non-VCL |
| 22 | 48..63 | UNSPEC48.. UNSPEC63 | Unspecified | non-VCL |

FIG. 66

```xml
<?xml version="1.0"?>
<MPD
  xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:2011 DASH-MPD.xsd"
  type="static"
  mediaPresentationDuration="PT3262S"
  minBufferTime="PT1.2S"
  profiles="urn:mpeg:dash:profile:isoff-on-demand:2011" >

<BaseURL>http://cdn1.example.com/</BaseURL>
  <BaseURL>http://cdn2.example.com/</BaseURL>

<Period>
    <!--English Audio-->
    <AdaptationSet mimeType="audio/mp4" codecs="mp4a.0x40" lang="en" subsegmentAlignment="true" subsegmentStartsWithSAP="1" >
      <ContentProtection schemeIdUri="urn:uuid:706D6953-6580-5244-4D48-656184657221" />
      <Representation id="1" bandwidth="64000" >
        <BaseURL>7857412348.mp4</BaseURL>
      </Representation>
      <Representation id="2" bandwidth="32000" >
        <BaseURL>3489846346.mp4</BaseURL>
      </Representation>
    </AdaptationSet>
    <!--Video-->
    <AdaptationSet mimeType="video/mp4" codecs="avc1.460228" subsegmentAlignment="true" subsegmentStartsWithSAP="2" >
      <ContentProtection schemeIdUri="urn:uuid:706D6953-6580-5244-4D48-656184657221" />
      <Representation id="6" bandwidth="256000" width="320" height="240" >
        <BaseURL>5563456473.mp4</BaseURL>
      </Representation>
      <Representation id="7" bandwidth="512000" width="320" height="240" >
        <BaseURL>5663363634.mp4</BaseURL>
      </Representation>
      <Representation id="8" bandwidth="1024000" width="640" height="480" >
        <BaseURL>6562465735.mp4</BaseURL>
      </Representation>
      <Representation id="9" bandwidth="1384000" width="640" height="480" >
        <BaseURL>4132585845.mp4</BaseURL>
      </Representation>
      <Representation id="A" bandwidth="1536000" width="1280" height="720" >
        <BaseURL>8804568425.mp4</BaseURL>
      </Representation>
      <Representation id="B" bandwidth="2048000" width="1280" height="720" >
        <BaseURL>2335367457734.mp4</BaseURL>
      </Representation>
    </AdaptationSet>
  </Period>
</MPD>
```

IMAGE PROCESSING DEVICE AND METHOD

CROSS REFERENCE TO PRIOR APPLICATION

This application is a National Stage Patent Application of PCT International Patent Application No. PCT/JP2013/081344 (filed on Nov. 21, 2013) under 35 U.S.C. § 371, which claims priority to Japanese Patent Application Nos. 2013-002877 (filed on Jan. 10, 2013) and 2012-263811 (filed on Nov. 30, 2012), which are all hereby incorporated by reference in their entirety.

TECHNICAL FIELD

The present disclosure relates to an image processing device and method, and more particularly, an image processing device and method which are capable of suppressing a reduction in coding efficiency.

BACKGROUND ART

In recent years, for the purpose of digitalizing image information and transmitting and accumulating information at high efficiency at that time, devices that compress and encode images by using image information-specific redundancy employing a coding scheme that performs compression through an orthogonal transform such as a discrete cosine transform and motion compensation have been spread. As such a coding scheme, for example, there is Moving Picture Experts Group (MPEG).

Particularly, MPEG 2 (International Organization for Standardization/International Electrotechnical Commission (ISO/IEC) 13818-2) is a standard that is defined as a general-purpose image coding scheme, and covers interlaced scan images, progressive scan images, standard resolution images, and high definition images. Currently, MPEG 2 is being widely used for a wide range of applications such as professional use and consumer use. Using the MPEG 2 compression scheme, for example, in the case of an interlaced scan image of a standard resolution having 720×480 pixels, a coding amount (bit rate) of 4 Mbps to 8 Mbps is allocated. Further, using the MPEG 2 compression scheme, for example, in the case of an interlaced scan image of a high resolution having 1920×1088 pixels, a coding amount (bit rate) of 18 Mbps to 22 Mbps is allocated. Thus, it is possible to implement a high compression rate and an excellent image quality.

MPEG 2 is mainly intended for high definition coding suitable for broadcasting but does not support a coding scheme having a coding amount (bit rate) lower than that of MPEG 1, that is, a coding scheme of a higher compression rate. With the spread of mobile terminals, the need for such a coding scheme is considered to be increased in the future, and thus an MPEG 4 coding scheme has been standardized. In connection with an image coding scheme, an international standard thereof has been approved as ISO/IEC 14496-2 in December, 1998.

Further, in recent years, standardization of a standard such as H.26L (International Telecommunication Union Telecommunication Standardization Sector Q6/16 Video Coding Expert Group (ITU-T Q6/16 VCEG)) for the purpose of image coding for video conference has been conducted. H.26L requires a larger computation amount for coding and decoding than in an existing coding scheme such as MPEG 2 or MPEG 4, but is known to implement higher coding efficiency. Further, currently, as one of activities of MPEG 4, standardization of incorporating even a function that is not supported in H.26L and implementing higher coding efficiency based on H.26L has been performed as a Joint Model of Enhanced-Compression Video Coding.

As a standardization schedule, an international standard called H.264 and MPEG-4 Part10 (which is also hereinafter referred to as "Advanced Video Coding (AVC)") has been established in March, 2003.

Furthermore, as an extension of H.264/AVC, Fidelity Range Extension (FRExt) including an encoding tool necessary for professional use such as RGB or 4:2:2 or 4:4:4 or 8×8 DCT and a quantization matrix which are specified in MPEG-2 has been standardized in February, 2005. As a result, the H.264/AVC has become a coding scheme capable of also expressing a film noise included in a movie well and is being used in a wide range of applications such as a Blu-Ray Disc (a trademark).

However, in recent years, there is an increasing need for further high compression rate coding capable of compressing an image (which is also referred to as a "4K image") of about 4000×2000 pixels which are four times as high as a high-definition image or delivering a high-definition image in a limited transmission capacity environment such as the Internet. To this end, an improvement in coding efficiency has been under continuous review by Video Coding Expert Group (VCEG) under ITU-T.

In this regard, currently, in order to further improve coding efficiency to be higher than in the AVC, standardization of a coding scheme called High Efficiency Video Coding (HEVC) has been being conducted by Joint Collaboration Team-Video Coding (JCTVC) which is a joint standardization organization of ITU-T and ISO/IEC. In the HEVC standard, a committee draft that is a first draft specification has been issued in February, 2012 (see Non-Patent Document 1).

In the case of the HEVC, generally, information that is transmitted from an encoding side to a decoding side includes syntax elements for P slices and B slices, that is, syntax elements related to an inter-screen process as well as syntaxes for I slices.

Meanwhile, a still picture profile serving as a profile for using the HEVC as a still image codec has been proposed (for example, see Non-Patent Document 2).

Since the still picture profile is a profile for encoding and decoding still images, when this profile is applied, syntax elements related to the inter-screen process are unnecessary.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 8," JCTVC-H1003_d7, Joint Collaborative Team on Video Coding (JCT-VC) of ITU-T SG16 WP3 and ISO/IEC JTC1/SC29/WG11, 10th Meeting: Stockholm, SE, 11-20 Jul. 2012

Non-Patent Document 2: Kemal Ugur, Jani Lainema, Miska Hannuksela, "On still picture profile," JCTVC-J0037, Joint Collaborative Team on Video Coding (JCT-VC) of ITU-T SG16 WP3 and ISO/IEC JTC1/SC29/WG11, 10th Meeting: Stockholm, SE, 11-20 Jul. 2012

SUMMARY OF THE INVENTION

Problems to be Solved by the Invention

However, in the case of the method disclosed in Non-Patent Document 2, control on the syntax elements related to the inter-screen process is not performed. In other words, similarly to the case of the moving image profile, the syntax elements related to the inter-screen process are transmitted from the encoding side to the decoding side. Thus, the coding efficiency is likely to be lowered since unnecessary information is transmitted.

The present disclosure was made in light of the foregoing, and it is desirable to be capable of suppressing a reduction in coding efficiency.

Solutions to Problems

An image processing device according to an aspect of the present technology is an image processing device including a receiving unit that receives an encoded bitstream including a syntax element related to an inter-image process and an analyzing unit that analyzes the syntax element received by the receiving unit in a state in which a value of the syntax element is restricted when the bitstream is a bitstream encoded based on a profile for encoding a still image.

The image processing device may further include a decoding unit that decodes the bitstream using the syntax element analyzed by the analyzing unit.

The image processing device may further include a determining unit that determines whether or not the value of the syntax element received by the receiving unit is properly restricted when the bitstream is the bitstream encoded based on the profile for encoding the still image.

The image processing device may further include an abnormality processing unit that performs an abnormality process when the determining unit determines that the value of the syntax element is not properly restricted.

The syntax element may be stored in a sequence parameter set of the bitstream.

The syntax element may be a syntax related to a reference picture.

The syntax element may be a syntax related to the number of reference pictures.

The image processing device may further include a determining unit that determines whether or not the value of the syntax element received by the receiving unit is a predetermined value.

The predetermined value may be 0.

An image processing method according to an aspect of the present technology is an image processing method including receiving an encoded bitstream including a syntax element related to an inter-image process and analyzing the received syntax element in a state in which a value of the syntax element is restricted when the bitstream is a bitstream encoded based on a profile for encoding a still image.

Further, the bitstream may be decoded using the analyzed syntax element.

It may be determined whether or not the value of the received syntax element is properly restricted when the bitstream is the bitstream encoded based on the profile for encoding the still image.

An abnormality process may be performed when the value of the syntax element is determined to be not properly restricted.

The syntax element may be stored in a sequence parameter set of the bitstream.

The syntax element may be a syntax related to a reference picture.

The syntax element may be a syntax related to the number of reference pictures.

Further, it may be determined whether or not the value of the received syntax element is a predetermined value.

The predetermined value may be 0.

According to an aspect of the present technology, an encoded bitstream including a syntax element related to an inter-image process is received, and the received syntax element is analyzed in a state in which a value of the syntax element is restricted when the bitstream is a bitstream encoded based on a profile for encoding a still image.

Effects of the Invention

According to the present disclosure, it is possible to encode and decode an image. Particularly, it is possible to suppress a reduction in coding efficiency.

BRIEF DESCRIPTION OF DRAWINGS

FIG. 3 is a diagram illustrating an exemplary profile tier level (Profile_tier_level).

FIG. 4 is a diagram illustrating an exemplary video parameter set (VPS).

FIG. 5 is a diagram illustrating an exemplary sequence parameter set (SPS).

FIG. 6 is a diagram illustrating an exemplary sequence parameter set (SPS), subsequently to FIG. 5.

FIG. 7 is a diagram illustrating another exemplary profile tier level (Profile_tier_level).

FIG. 8 is a diagram illustrating another exemplary video parameter set (VPS).

FIG. 9 is a diagram illustrating another exemplary sequence parameter set (SPS).

FIG. 10 is a diagram illustrating another exemplary sequence parameter set (SPS), subsequently to FIG. 9.

FIG. 11 is a diagram illustrating still another exemplary video parameter set (VPS).

FIG. 12 is a diagram illustrating still another exemplary sequence parameter set (SPS).

FIG. 13 is a diagram illustrating still another exemplary sequence parameter set (SPS), subsequently to FIG. 12.

FIG. 14 is a diagram illustrating an exemplary picture parameter set (PPS).

FIG. 15 is a diagram illustrating an exemplary picture parameter set (PPS), subsequently to FIG. 14.

FIG. 16 is a diagram illustrating an exemplary scaling list data (scaling_list_data ( )).

FIG. 17 is a diagram illustrating an exemplary semantics of a size ID (SizeID).

FIG. 18 is a diagram illustrating an exemplary semantics of a size ID (SizeID) and a matrix ID (MatrixID).

FIG. 19 is a diagram illustrating another exemplary scaling list data (scaling_list_data ( )).

FIG. 20 is a diagram illustrating an exemplary slice header (slice_header ( )).

FIG. 21 is a diagram illustrating an exemplary slice header (slice_header ( )), subsequently to FIG. 20.

FIG. 22 is a diagram illustrating an exemplary slice header (slice_header ( )), subsequently to FIG. 21.

FIG. 23 is a diagram illustrating an exemplary allocation of nal_unit_type.

FIG. 66 is an explanatory diagram illustrating a specific example of MPD.

MODE FOR CARRYING OUT THE INVENTION

Hereinafter, modes (hereinafter, referred to as "embodiments") of carrying out the present disclosure will be described. The description will proceed in the following order.

0. Overview

1. First Embodiment (image coding device)

2. Second Embodiment (image coding device)

3. Third Embodiment (image decoding device)

4. Fourth Embodiment (image decoding device)

5. Fifth embodiment (multi-view image coding device and multi-view image decoding device)

6. Sixth embodiment (scalable image coding device and scalable image decoding device)

7. Seventh Embodiment (computer)

8. Application examples

9. Application examples of scalable coding

10. Eighth Embodiment (set/unit/module/processor)

11. Ninth embodiment (application examples of content reproducing system of MPEG-DASH)

12. Tenth embodiment (application examples of wireless communication system of Wi-Fi standard)

0. Overview

<Coding Scheme>

Hereinafter, the present technology will be described in connection with an application to image coding and decoding of a HEVC scheme.

<Coding Unit>

In the AVC, a hierarchical structure based on a macroblock and a sub macroblock is defined. However, a macroblock of 16×16 pixels is not optimal for a large image frame such as an Ultra High Definition (UHD) (4000×2000 pixels) serving as a target of a next generation coding scheme.

Figure 1:
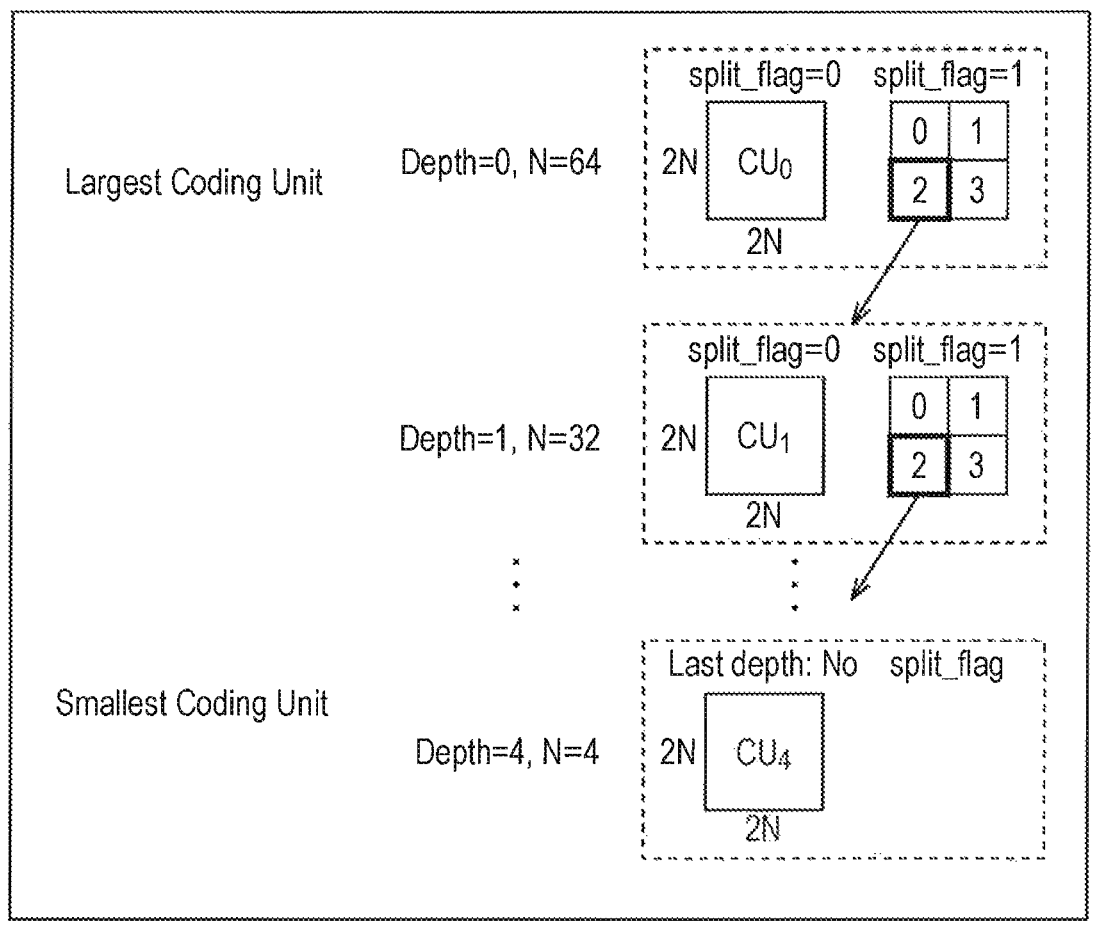
FIG. 1 is a diagram for describing an exemplary configuration of a coding unit.

On the other hand, in the HEVC, a coding unit (CU) is defined as illustrated in FIG. 1.

A CU is also referred to as a coding tree block (CTB), and the CU is a partial area of an image of a picture unit undertaking the same role of a macroblock in the AVC. The macroblock of the AVC is fixed to a size of 16×16 pixels, but a size of the CU of the HEVC is not fixed and designated in image compression information in each sequence.

For example, a largest coding unit (LCU) and a smallest coding unit (SCU) of a CU are specified in a sequence parameter set (SPS) included in encoded data to be output.

As split_flag=1 is set in a range in which each LCU is not smaller than a SCU, a coding unit can be divided into CUs having a smaller size. In the example of FIG. 1, a size of an LCU is 128×0.128, and a largest scalable depth is 5. A CU of a size of 2N×2N is divided into CUs having a size of N×N serving as the hierarchy that is one-level lower when a value of split_flag is "1."

Further, a CU is divided in prediction units (PUs) that are areas (partial areas of an image of a picture unit) serving as processing units of intra or inter prediction, and divided into transform units (TUs) that are areas (partial areas of an image of a picture unit) serving as processing units of orthogonal transform. In the HEVC, any of 4×4, 8×8, 16×16, and 32×32 can be used as a processing unit of orthogonal transform.

In the case of the coding scheme in which a CU is defined, and various kinds of processes are performed in units of CUs such as the HEVC, a macroblock in the AVC can be considered to correspond to an LCU, and a block (sub block) can be considered to correspond to a CU. Further, a motion compensation block in the AVC can be considered to correspond to a PU. Here, since a CU has a hierarchical structure, a size of an LCU of a topmost layer is commonly set to be larger than a macroblock in the AVC, for example, such as 128×128 pixels.

Thus, hereinafter, an LCU is assumed to include a macroblock in the AVC, and a CU is assumed to include a block (sub block) in the AVC. In other words, a "block" used in the following description indicates an arbitrary partial area in a picture, and, for example, a size, shape, and characteristics of a block are not limited. In other words, a "block" includes an arbitrary area (a processing unit) such as a TU, a PU, an SCU, a CU, an LCU, a sub block, a macroblock, or a slice. Of course, a "block" includes any other partial area (processing unit) as well. When it is necessary to limit a size, a processing unit, or the like, it will be appropriately described.

<Mode Selection>

Meanwhile, in the coding schemes such as the AVC and the HEVC, in order to achieve higher coding efficiency, it is important to select an appropriate prediction mode.

As an example of such a selection method, there is a method implemented in reference software (opened at http://iphome.hhi.de/suehring/tml/index.htm) of H.264/MPEG-4 AVC called a joint model (JM).

In the JM, it is possible to select two mode determination methods, that is, a high complexity mode and a low complexity mode described below. In both modes, cost function values related to the respective prediction modes are calculated, and a prediction mode having a smallest cost function value is selected as an optimal mode for a current block serving as a processing target.

A cost function in the high complexity mode is represented as in the following Formula (1):

[Mathematical Formula 1]

$$\text{Cost(Mode } \epsilon\Omega) = D + \lambda * R \tag{1}$$

Here, Ω indicates a universal set of a candidate mode for encoding a current block, and D indicates differential energy between a decoded image and an input image when encoding is performed in a corresponding prediction mode. λ indicates Lagrange's undetermined multiplier given as a function of a quantization parameter. R indicates a total coding amount including an orthogonal transform coefficient when encoding is performed in a corresponding prediction mode.

In other words, in order to perform encoding in the high complexity mode, it is necessary to perform a temporary encoding process once by all candidate modes in order to calculate the parameters D and R, and thus a larger computation amount is required.

A cost function in the low complexity mode is represented by the following Formula (2):

[Mathematical Formula 2]

$$\text{Cost(Mode } \epsilon\Omega) = D + QP2Quant(QP) * HeaderBit \tag{2}$$

Here, D indicates differential energy between a predicted image and an input image unlike the high complexity mode. QP2Quant (QP) is given as a function of a quantization parameter QP, and HeaderBit indicates a coding amount related to information belonging to a header such as a motion vector or a mode including no orthogonal transform coefficient.

In other words, in the low complexity mode, it is necessary to perform a prediction process for respective candidate modes, but since up to a decoded image is not necessary, it is unnecessary to perform up to a coding process. Thus, it can be implemented with a computation amount smaller than that in the high complexity mode.

<Tile>

Figure 2:
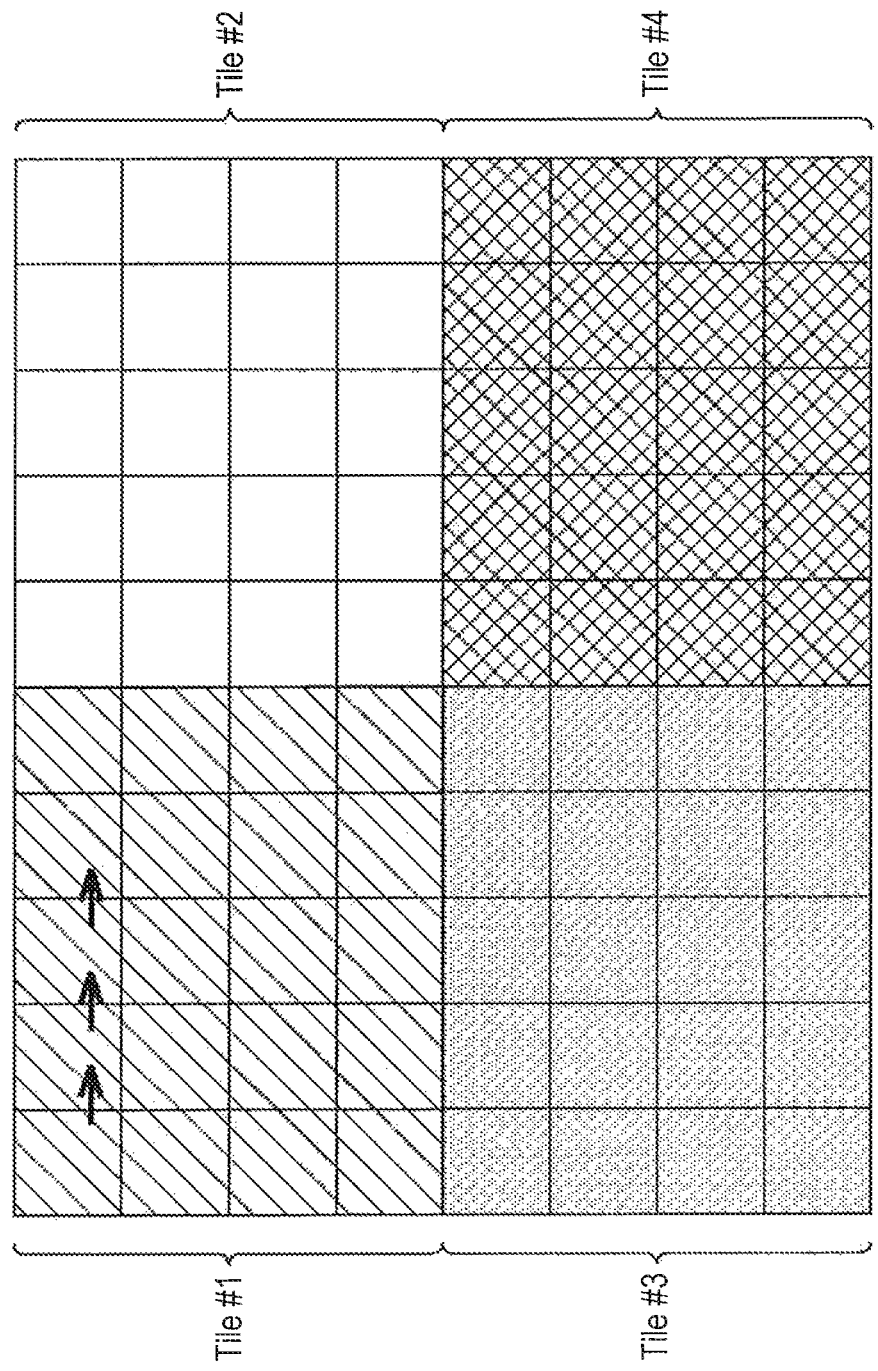
FIG. 2 is a diagram for describing a tile.

Meanwhile, in the HEVC, a tile illustrated in FIG. 2 is specified as a unit of a parallel process in addition to a slice specified in the AVC.

A width and a height of each tile are designated in image compression information, and a decoding process can be independently performed on each tile.

<Still Picture Profile>

Further, in Non-Patent Document 2, the still picture profile serving as the profile for using the HEVC as the still image codec is proposed.

However, in the case of the HEVC, generally, information that is transmitted from an encoding side to a decoding side includes syntax elements for P slices and B slices, that is, syntax elements related to an inter-screen process as well as syntaxes for I slices.

Since the still picture profile is the profile for encoding and decoding still images, when this profile is applied, the above-described syntax elements related to the inter-screen process are unnecessary. However, in the case of the method disclosed in Non-Patent Document 2, control on the syntax elements related to the inter-screen process is not performed. In other words, similarly to the case of the moving image profile, the syntax elements related to the inter-screen process are transmitted from the encoding side to the decoding side. Thus, the coding efficiency is likely to be lowered since unnecessary information is transmitted.

In this regard, in the present technology, when the coding process is performed based on the profile for encoding the still images, values of syntax elements related to the inter-image process are restricted, and transmission of unnecessary information is suppressed. As a result, it is possible to suppress a reduction in coding efficiency.

Specific examples of the restriction will be described below.

<0-1: Restriction of Syntax Element Related to Sub Layer>

FIG. 3 is a diagram illustrating an exemplary syntax of a profile tier level (profile_tier_level( )) in the HEVC. Numbers at the left end are given as line numbers for description and not included in an actual syntax. Similarly, numbers at the left end illustrated in FIGS. 4 to 23 which will be described below are given as line numbers for description of figures and not actually included in a syntax.

A syntax element general_profile_idc shown in a 5-th line in the profile tier level (profile_tier_level( )) illustrated in FIG. 3 specifies that a profile of a sequence (current sequence) of a processing target is a still picture profile.

The profile tier level (profile_tier_level( )) of FIG. 3 is called by a "video parameter set (VPS)" or a "sequence parameter set (SPS)."

FIG. 4 is a diagram illustrating an exemplary video parameter set (VPS) in the HEVC. FIGS. 5 and 6 are diagrams illustrating an exemplary sequence parameter set (SPS) in the HEVC.

As illustrated in FIG. 4, in the video parameter set (VPS), a profile tier level (profile_tier_level( )) in a 7-th line is called. Further, as illustrated in FIG. 5, in the sequence parameter set (SPS), the profile tier level (profile_tier_level( )) in a 5-th line is called.

Here, when encoding is performed based on the still picture profile, there is no temporal layer depth (which is also referred to as a "sub layer"). In other words, syntax elements related to the sub layer are unnecessary.

In this regard, in the profile tier level (profile_tier_level( )) of FIG. 3, before the still picture profile is specified by the syntax element general_profile_idc, 0 may be designated as a value of a parameter vps_max_sub_layers_minus1 (a 6-th line) related to the sub layer in the video parameter set (VPS) of FIG. 4, and 0 may be designated as a value of a parameter sps_max_sub_layers_minus1 (a 3-rd line) related to the sub layer in the sequence parameter set (SPS) (FIGS. 5 and 6).

In other words, when the syntax element general_profile_idc in the profile tier level (profile_tier_level( )) of FIG. 3 specifies that the profile is the still picture profile, 0 may have to be designated as the value of the parameter vps_max_sub_layers_minus1 (the 6-th line) related to the sub layer in the video parameter set (VPS) of FIG. 4, and 0 may have to be designated as the value of the parameter sps_max_sub_layers_minus1 (the 3-rd line) related to the sub layer in the sequence parameter set (SPS) (FIGS. 5 and 6).

As a result, it is possible to prevent unnecessary portions of the profile tier level (profile_tier_level( )) from being read. In other words, it is possible to prevent an increase in a load caused by the reading and prevent reading and transmission of unnecessary parameters. Thus, it is possible to suppress a reduction in coding efficiency.

Further, as a result, it is unnecessary to change the syntaxes of the profile tier level (profile_tier_level ( )), the video parameter set (VPS), and the sequence parameter set (SPS), and it is possible to suppress a reduction in coding efficiency through control by semantics. When the syntax is changed, for example, it is likely to be difficult to maintain syntax compatibility with an encoder and a decoder of a related art that do not support the still picture profile. Particularly, in the case of encoders and decoders implemented by hardware, there are cases in which it is difficult to update the syntax. A decrease in syntax compatibility is likely to reduce versatility. However, as described above, when the values of the syntax element are restricted by the semantics, it is possible to maintain syntax compatibility and prevent a reduction in versatility.

Further, since the syntax compatibility is maintained as described above, it is possible to easily apply a common syntax even to both encoding of still images and encoding of moving images, and thus it is possible to easily implement an encoder and a decoder that process both a still image and a moving image through a common circuit. In other words, it can contribute to a size reduction of a device, suppression of an increase in cost, and the like.

<0-2: Restriction of Syntax Element Related to Calling of Profile Tier Level>

Here, it is not impossible to implement such a restriction by changing the syntax.

As described above, when the profile tier level (profile_tier_level( )) is called from the video parameter set (VPS) or the sequence parameter set (SPS), a value of a syntax element ProfilePresentFlag related to the calling of the profile tier level which is designated at the time of the calling is consistently 1.

In other words, it is redundant to transmit this syntax element. Further, an if statement of a 2-nd line of the profile tier level (profile_tier_level( )) of (FIG. 3) is unnecessary as well.

In this regard, the syntax of the profile tier level (profile_tier_level( )) of FIG. 3 may be changed as in an example illustrated in FIG. 7, the syntax of the video parameter set (VPS) of FIG. 4 may be changed as in an example illustrated in FIG. 8, and the syntax of the sequence parameter set (SPS) of FIGS. 5 and 6 may be changed as in an example illustrated in FIGS. 9 and 10.

In other words, the profile tier level (profile_tier_level( )) may be designated by designating only a syntax element MaxNunSubLayersMinusl related to the sub layer as in the examples of FIG. 7 (a 1-st line), FIG. 8 (a 7-th line), and FIG. 9 (a 5-th line) without designating the syntax element ProfilePresentFlag.

Further, as illustrated in the 1-st to 7-th lines of FIG. 7, in the profile tier level (profile_tier_level( )), the if statement using the syntax element ProfilePresentFlag may be omitted.

As a result, it is possible to prevent transmission of an unnecessary parameter and suppress a reduction in coding efficiency. Further, it is possible to suppress an increase in the load of the process of reading the profile tier level (profile_tier_level( )) which is caused by the reading of the unnecessary if statement.

In other words, the value of the syntax element ProfilePresentFlag related to the calling of the profile tier level may have to be fixed to 1.

<0-3: Restriction of Syntax Element Related to Profile Tier Level>

In the above method, when the syntax element max_sub_layers_minus1 related to the sub layer is encoded, a setting has to be performed after detecting information as to whether or not encoding is performed based on the still picture profile in a subsequent profile tier level (profile_tier_level( )).

In this regard, the syntax of the video parameter set (VPS) of FIG. 4 may be changed as in an example illustrated in FIG. 11, and the syntax of the sequence parameter set (SPS) of FIGS. 5 and 6 may be changed in an example illustrated in FIGS. 12 and 13.

In other words, in the video parameter set (VPS), as in 6-th to 8-th lines (FIG. 11), a syntax element profile_tier_level (1,0) related to the profile tier level may be designated, a value of a syntax element vps_max_sub_layers_minus1 related to the sub layer may be designated, and a syntax element profile_tier_level (0,vps_max_sub_layers_minus1) related to the profile tier level may be designated.

Similarly, in the sequence parameter set (SPS), as in 3-rd to 6-th lines (FIG. 12), the syntax element profile_tier_level (1,0) related to the profile tier level may be designated, a value of a syntax element sps_max_sub_layers_minus1 related to the sub layer may be designated, and the syntax element profile_tier_level (0,sps_max_sub_layers_minus1) related to the profile tier level may be designated.

Further, for example, when a parameter set to which a syntax element belongs is not discriminated unlike vps_max_sub_layers_minus1 and sps_max_sub_layers_minus1, the parameter sets are simply referred to as max_sub_layers_minus1. In other words, vps_max_sub_layers_minus1 is max_sub_layers_minus, in the video parameter set (VPS), and sps_max_sub_layers_minus1 is max_sub_layers_minus1 in the sequence parameter set (SPS). Other syntax elements are assumed to have a similar relation.

As the syntax element profile_tier_level (1,0) is designated before the syntax element max_sub_layers_minus1 related to the sub layer is designated, information related to when all temporal layers (temporal_layer) of image data are encoded or decoded is transmitted.

Here, when the still picture profile is applied, 0 is designated as the value of the syntax element max_sub_layers_minus1 related to the sub layer.

After the syntax element max_sub_layers_minus1 related to the sub layer is encoded, information related to when some temporal layers (temporal_layer) of image data are encoded or decoded is transmitted through profile_tier_level (0,nax_sub_layers_minus).

By changing the syntax as described above, it is possible to designate the value of the syntax element max_sub_layers_minus1 related to the sub layer after it is designated whether or not the profile is the still picture profile.

<0-4: Restriction of Syntax Element Related to Virtual Reference Decoder>

Further, when the still picture profile is applied, it is unnecessary to control the virtual reference decoder. In this regard, as illustrated in FIG. 4, 0 may be designated as a value of a syntax element vps_num_hrd_parameters (a 14-th line) related to the virtual reference decoder in the video parameter set (VPS).

In other words, when the still picture profile is applied, the value of the syntax element vps_num_hrd_parameters (the 14-th line) related to the virtual reference decoder in the video parameter set (VPS) may have to be fixed to 0.

The syntax element vps_num_hrd_parameters related to the virtual reference decoder is a positive value that is encoded by an extended Golomb coding and then transmitted. Thus, when this value is 0 or 1, the coding amount becomes minimum. In other words, as 0 is designated as the value of the syntax element vps_num_hrd_parameters related to the virtual reference decoder, it is possible to suppress a reduction in coding efficiency.

Further, as 0 is designated as the value of the syntax element vps_num_hrd_parameters related to the virtual reference decoder, it is possible to skip a loop process (a for statement) of 15-th to 19-th lines. Thus, as a result, it is possible to suppress an increase in a load. Further, it is possible to prevent transmission of the unnecessary syntax elements in the loop process (the for statement) and suppress a reduction in coding efficiency.

Further, it is possible to restrict the value of the syntax element by the semantics without changing the syntax and suppress a reduction in syntax versatility.

Further, this restriction can be applied even when the video parameter set (VPS) is the example of FIG. 8 or the example of FIG. 11.

<0-5: Restriction of Syntax Element Related to P Slice and B Slice>

Further, when the still picture profile is applied, there is neither a P slice nor a B slice. In this regard, as illustrated in FIG. 5, 0 may be designated as a value of a syntax element restricted_ref_pic_lists_flag (a 32-nd line) related to the P slice and the B slice in the sequence parameter set (SPS).

In other words, when the still picture profile is applied, the value of the syntax element restricted_ref_pic_lists_flag (the 32-nd line) related to the P slice and the B slice in the sequence parameter set (SPS) may have to be fixed to 0.

Further, as 0 is designated as the value of the syntax element restricted_ref_pic_lists_flag related to the P slice and the B slice, it is possible to skip 33-rd to 42-nd lines. Thus, as a result, it is possible to suppress an increase in a load. Further, it is possible to prevent transmission of unnecessary syntax elements of the 33-rd to 42-nd lines and suppress a reduction in coding efficiency.

Further, it is possible to restrict the value of the syntax element by the semantics without changing the syntax and suppress a reduction in syntax versatility.

Further, the restriction can be applied even when the sequence parameter set (SPS) is the example of FIGS. 9 and 10 or the example of FIGS. 12 and 13.

<0-6: Restriction of Syntax Element Related to Short Term>

Further, when the still picture profile is applied, there is no concept of time (there is no other picture). In this regard, as illustrated in FIG. 6, 0 may be designated as a value of a syntax element num_short_term_ref_pic_sets (a 56-th line) related to the short term in the sequence parameter set (SPS).

In other words, when the still picture profile is applied, the value of the syntax element num_short_term_ref_pic_sets (the 56-th line) related to the short term in the sequence parameter set (SPS) may have to be fixed to 0.

The syntax element num_short_term_ref_pic_sets related to the short term is a positive value that is encoded by extended Golomb coding and then transmitted. Thus, when the value is 0 or 1, the coding amount becomes minimum. In other words, as 0 is designated as the value of the syntax element num_short_term_ref_pic_sets related to the short term, it is possible to suppress a reduction in coding efficiency.

Further, as 0 is designated as the value of the syntax element num_short_term_ref_pic_sets related to the short term, it is possible to skip 57-th and 58-th lines. Thus, as a result, it is possible to suppress an increase in a load.

Further, it is possible to restrict the value of the syntax element by the semantics without changing the syntax and suppress a reduction in syntax versatility.

Further, this restriction can be applied even when the sequence parameter set (SPS) is the example of FIGS. 9 and 10 or the example of FIGS. 12 and 13.

<0-7: Restriction of Syntax Element Related to Long Term>

Further, when the still picture profile is applied, there is no concept of time (there is no other picture). In this regard, as illustrated in FIG. 6, 0 may be designated as a value of a syntax element long_term_ref_pics_present_flag (a 59-th line) related to the long term in the sequence parameter set (SPS).

In other words, when the still picture profile is applied, the value of the syntax element long_term ref_pics_present_flag (the 59-th line) related to the long term in the sequence parameter set (SPS) may have to be fixed to 0.

As 0 is designated as the value of the syntax element long_term_ref_pics_present_flag related to the long term, it is possible to skip 60-th to 66-th lines. Thus, as a result, it is possible to suppress an increase in a load. Further, it is possible to prevent transmission of an unnecessary syntax element in the 60-th to 66-th lines and suppress a reduction in coding efficiency.

Further, it is possible to restrict the value of the syntax element by the semantics without changing the syntax and suppress a reduction in syntax versatility.

Further, this restriction can be applied even when the sequence parameter set (SPS) is the example of FIGS. 9 and 10 or the example of FIGS. 12 and 13.

<0-8: Restriction of Syntax Element Related to Motion Vector>

Further, when the still picture profile is applied, there is no concept of time (there is no other picture). In this regard, as illustrated in FIG. 6, 0 may be designated as a value of a syntax element sps_temporal_mvp_enable_flag (a 67-th line) related to the motion vector in the sequence parameter set (SPS).

In other words, when the still picture profile is applied, the value of the syntax element sps_temporal_mvp_enable_flag (the 67-th line) related to the motion vector in the sequence parameter set (SPS) may have to be fixed to 0.

As 0 is designated as the value of the syntax element sps_temporal_mvp_enable_flag related to the motion vector, it is possible to minimize the coding amount, and it is possible to suppress a reduction in coding efficiency.

Further, it is possible to restrict the value of the syntax element by the semantics without changing the syntax and suppress a reduction in syntax versatility.

Further, this restriction can be applied even when the sequence parameter set (SPS) is the example of FIGS. 9 and 10 or the example of FIGS. 12 and 13.

<0-9: Restriction of Syntax Element of Picture Parameter Set>

FIGS. 14 and 15 are diagrams illustrating an exemplary picture parameter set (PPS) in the HEVC.

When the still picture profile is applied, there is no concept of time (there is no other picture). In this regard, as illustrated in FIG. 14, 0 or 1 may be designated as both of values of the syntax element num_ref_idx_10 default_active minus1 (a 6-th line) related to L0 and a syntax element num_ref_idx_11_default_active minus1 (a 7-th line) related to L1 in the picture parameter set (PPS).

In other words, when the still picture profile is applied, both of the values of the syntax element num_ref_idx_10_default_active minus1 (the 6-th line) related to L0 and the syntax element num_ref_idx_11_default_active minus1 (the 7-th line) related to L1 in the picture parameter set (PPS) may have to be fixed to 0 or 1.

The syntax elements are positive values that are encoded by extended Golomb coding and then transmitted. Thus, when the values are 0 or 1, the coding amount becomes minimum. In other words, as 0 is designated as the values of the syntax element num_ref_idx_10_default_active minus1 related to L0 and the syntax element num_ref_idx_11_default_active minus1 related to L1, it is possible to suppress a reduction in coding efficiency.

Further, when the still picture profile is applied, there is no concept of time (there is no other picture). In this regard, as illustrated in FIG. 15, 0 may be designated as a value of a syntax element (flag) lists_modification_present_flag (a 49-th line) of the picture parameter set (PPS) indicating whether or not there is a syntax element ref_pic_list_modification in a current slice header.

In other words, when the still picture profile is applied, the value of the syntax element (flag) lists_modification_present_flag (the 49-th line) of the picture parameter set (PPS) indicating whether or not there is a syntax element ref_pic_list_modification in the current slice header may have to be fixed to 0.

When the value of the syntax element lists_modification_present_flag is 1, the syntax element ref_pic_list_modification related to the reference image list is transmitted for the current slice as illustrated in 53-rd and 54-th lines of FIG. 21, but in the case of the still picture profile, this syntax element is unnecessary. In other words, as 0 is designated as the value of the syntax element lists_modification_present_flag, it is possible to omit transmission of the syntax element ref_pic_list_modification of the reference image list that is unnecessary information for the current slice, and it is possible to suppress a reduction in coding efficiency.

Further, when the still picture profile is applied, there is no concept of time (there is no other picture). In this regard, as illustrated in FIG. 15, 0 may be designated as a value of a syntax element log 2_parallel_merge_level_minus2 (a 50-th line) of the picture parameter set (PPS) designating a parallel process level of a merge mode and a skip mode in a prediction process.

In other words, when the still picture profile is applied, the value of the syntax element log 2_parallel_merge_level_minus2 (the 50-th line) of the picture parameter set (PPS) designating the parallel process level of the merge mode and the skip mode in the prediction process may have to be fixed to 0.

This syntax element is a positive value that is encoded by extended Golomb coding and then transmitted. Thus, when this value is 0, the coding amount becomes minimum. In other words, as 0 is designated as the value of the syntax element log 2_parallel_merge_level_minus2 designating the parallel process level of the merge mode and the skip mode in the prediction process, it is possible to suppress a reduction in coding efficiency.

Further, when the still picture profile is applied, there is no concept of time (there is no other picture). In this regard, as illustrated in FIG. 14, 0 may be designated as both of values of a syntax element (flag) weighted_pred_flag (a 18-th line) related to the weighted prediction of the P slice and a syntax element (flag) weighted_bipred_flag (a 19-th line) related to the weighted prediction of the B slice in the picture parameter set (PPS).

In other words, when the still picture profile is applied, the values of the syntax element (flag) weighted_pred_flag (the 18-th line) related to the weighted prediction of the P slice and the syntax element (flag) weighted_bipred_flag (the 19-th line) related to the weighted prediction of the B slice in the picture parameter set (PPS) may have to be fixed to 0.

When the value of the syntax element weighted_ped_flag or weighted_bipred_flag is 1, as illustrated in 65-th to 68-th lines of FIG. 21, the weighted prediction table or the like is transmitted for the current slice, but in the case of the still picture profile, this information is unnecessary. In other words, as 0 is designated as the value of the syntax element weighted_pred_flag or weighted_bipred_flag, it is possible to omit transmission of unnecessary information for the current slice, and it is possible to suppress a reduction in coding efficiency.

Here, as will be described later, even when the slice type is restricted to the I slice, transmission of the information can be omitted, and thus the above-described restriction related to the syntax element weighted_pred_flag or weighted_bipred_flag can be omitted.

Further, it is possible to restrict the value of the syntax element by the semantics without changing the syntax and suppress a reduction in syntax versatility.

<0-10: Restriction of Syntax Element Related to Prediction Mode of Scaling List>

Meanwhile, in the sequence parameter set (SPS) illustrated in FIGS. 5 and 6, a scaling list (scaling_list_data ( )) is called (a 49-th line). Similarly, even in the picture parameter set (PPS) illustrated in FIGS. 14 and 15, the scaling list (scaling_list_data ( )) is called (a 48-th line).

FIG. 16 illustrates an exemplary scaling list (scaling_list_data ( )). In the scaling list (scaling_list_data ( )) illustrated in FIG. 16, semantics of a size ID (sizeID) and a matrix ID (matrixID) are as illustrated in FIGS. 17 and 18.

Here, when the value of the size ID (sizeID) is 0, 1, or 2, and the value of the matrix ID (matrixID) is 3, 4, or 5 or when the value of the size ID (sizeID) is 3, and the value of the matrix ID (matrixID) is 1, in the still picture profile, it is redundant to transmit the scaling list.

In this regard, in this case, 0 may be designated as a value of a syntax element scaling_list_pred_mode_flag related to the prediction mode of the scaling list, and 0 or 1 may be designated as a value of a syntax element scaling_list_pred_matrix_id_delta related to a prediction matrix of the scaling list.

In other words, when the still picture profile is applied, the value of the syntax element scaling_list_pred_mode_flag (a 4-th line) related to the prediction mode of the scaling list may have to be fixed to 0, and the value of the syntax element scaling_list_pred_matrix_id_delta (a 6-th line) related to the prediction matrix of the scaling list may have to be fixed to 0 or 1.

Further, as 1 is designated as the value of the syntax element scaling_list_pred_matrix_id_delta related to the prediction matrix of the scaling list, it is possible to reduce the necessity of inserting start code emulation prevention while keeping a code length to a minimum.

<0-11: Change of Syntax Related to Prediction Mode of Scaling List>

Further, instead of restricting the value of the syntax element by the semantics as described above, the syntax may be changed as illustrated in FIG. 19.

In the syntax of FIG. 19, as illustrated in a 4-th line, the condition of the for statement is designated in detail using the size ID (sizeID) and the matrix ID (matrixID) as described above.

As a result, the same effects can be obtained.

<0-12: Restriction of Syntax Element Related to Slice Type>

FIGS. 20 to 22 illustrate an exemplary syntax of a slice header.

When the still picture profile is applied, the slice type is the I slice. In this regard, as illustrated in FIG. 20, a value indicating the I slice may be designated as a value of a syntax element slice_type (an 11-th line) related to the slice type in the slice header (slice_header( )).

In other words, when the still picture profile is applied, the value of the syntax element slice_type (the 11-th line) related to the slice type in the slice header (slice_header( )) may have to be fixed to the I slice.

As a result, it is possible to skip 44-th to 68-th lines of the slice header (slice_header( )). Thus, as a result, it is possible to suppress an increase in a load. Further, it is possible to prevent transmission of unnecessary syntax elements of the 44-th to 68-th lines, and it is possible to suppress a reduction in coding efficiency.

Further, it is possible to restrict the value of the syntax element by the semantics without changing the syntax and suppress a reduction in syntax versatility.

<0-13: Restriction of Syntax Element Related to NAL Unit Type>

Meanwhile, in FIGS. 20 to 22, IdrPicFlag and RapPicFlag are calculated based on nal_unit_type as in the following Formulas (3) and (4):

[Mathematical Formula 3]

$$IdrPicFlag= (nal\_unit\_type==IDR\_W\_LP \| nal\_unit\_type==IDR\_N\_LP) \quad (3)$$

$$RapPicFlag=(nal\_unit\_type>=7 \&\& nal\_unit\_type<=12) \quad (4)$$

Here, a syntax element nal_unit_type related to the NAL unit type is allocated as illustrated in FIG. 23.

In this regard, when the still picture profile is applied, IDR_W_LP or IDR_N_LP may be designated as the NAL unit type (nal_unit_type) for the VCL.

In other words, when the still picture profile is applied, the NAL unit type (nal_unit_type) for the VCL may have to be fixed to IDR_W_LP or IDR_N_LP.

By performing the above process, it is possible to prevent transmission of redundant information and improve the coding efficiency of image compression information to be output when encoding is performed based on the still picture profile.

Further, the syntax elements related to the inter-image process in which the values are restricted when the coding process is performed based on the profile for encoding the still image is not limited to the above example. The values of the syntax elements other than the above-described syntax elements may be restricted. At this time, the syntax may be changed by restricting the semantics.

Figure 24:
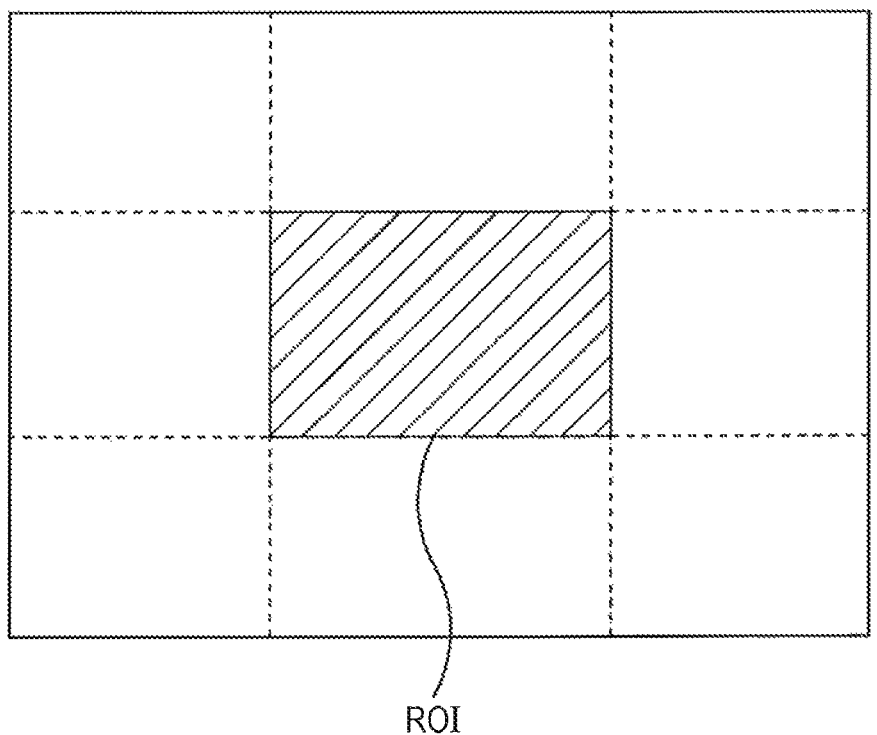
FIG. 24 is a diagram for describing an exemplary Region of Interest (ROI) region.

Further, as illustrated in FIG. 24, when there is a Region of Interest (ROI) in a part of a still image, for example, when a person's face is shown in a part of a still image, the image may be divided into tiles of FIG. 2, a tile serving as a ROI region may be designated by metadata such as Supplemental Enhancement Information (SEI), and the decoding process of only the ROI region may be performed for a decoded image.

Next, application examples of the present technology to specific devices will be described.

1. First Embodiment

Image Coding Device

Figure 25:
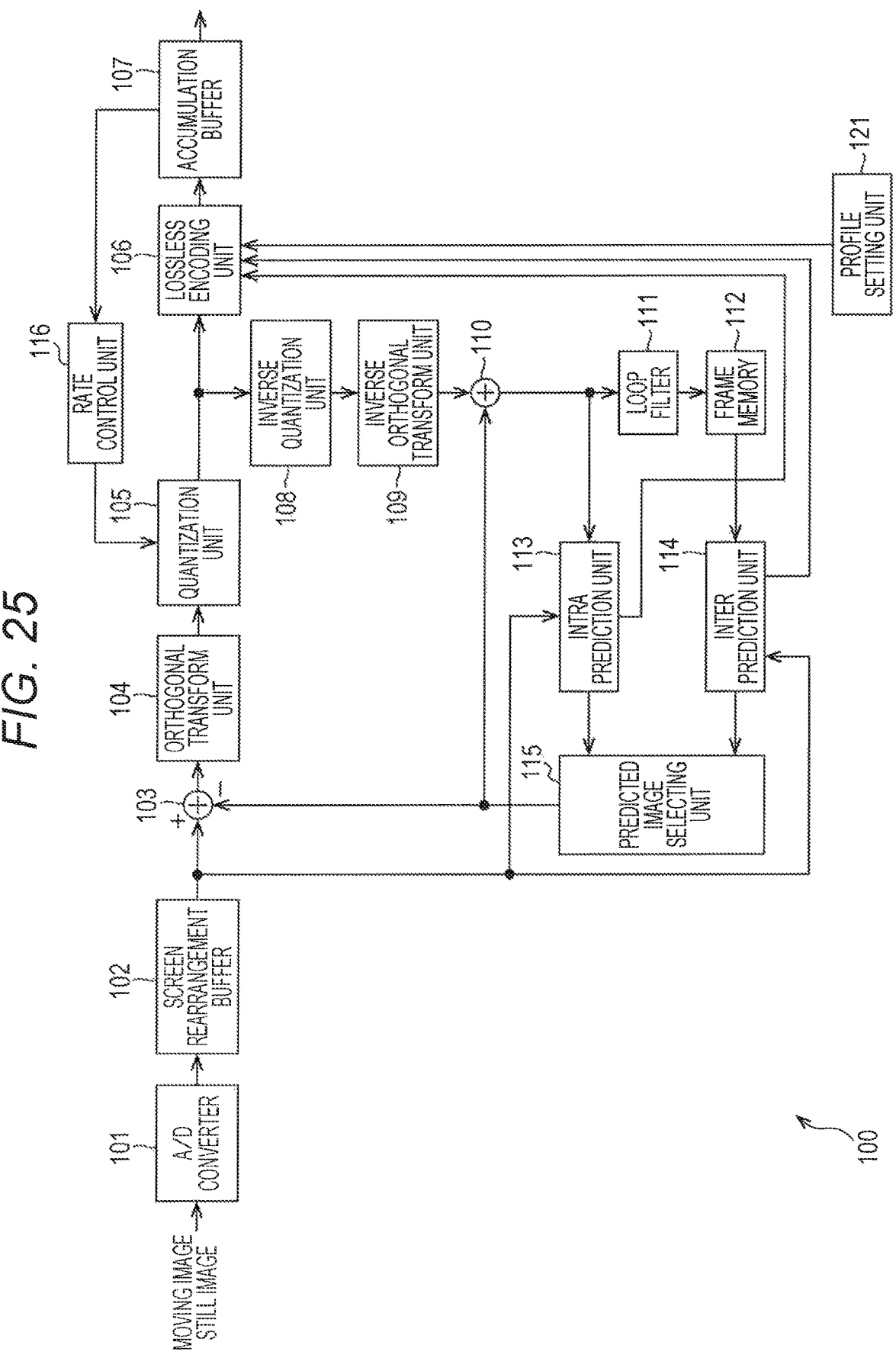
FIG. 25 is a block diagram illustrating an exemplary main configuration of an image coding device.

FIG. 25 is a block diagram illustrating an exemplary configuration of an image coding device as an example of an image processing device to which the present technology is applied. For example, an image coding device 100 illustrated in FIG. 25 encodes image data of a moving image using the prediction process of the HEVC or a prediction process of a scheme based on the HEVC.

Further, the image coding device 100 can encode image data of a still image as well as image data of a moving image. In this case, a still image profile (for example, the still picture profile) is set to the image coding device 100.

As illustrated in FIG. 25, the image coding device 100 includes an A/D converter 101, a screen rearrangement buffer 102, an operation unit 103, an orthogonal transform unit 104, a quantization unit 105, a lossless encoding unit 106, an accumulation buffer 107, an inverse quantization unit 108, and an inverse orthogonal transform unit 109. The image coding device 100 further includes an operation unit 110, a loop filter ill, a frame memory 112, an intra prediction unit 113, an inter prediction unit 114, a predicted image selecting unit 115, and a rate control unit 116.

The A/D converter 101 performs A/D conversion on image data (analog data) of an input image input to the image coding device 100. The A/D converter 101 supplies the converted image data (digital data) to the screen rearrangement buffer 102.

The screen rearrangement buffer 102 stores each frame image data of the input image supplied in a display order in the order. The screen rearrangement buffer 102 rearranges the order of the frames of the input image in an encoding order according to a Group Of Picture (GOP). In other words, the screen rearrangement buffer 102 reads the image data of the frames stored in the display order in the encoding order. The screen rearrangement buffer 102 supplies the read image data to the operation unit 103. Further, the screen rearrangement buffer 102 supplies the read image data to the intra prediction unit 113 and the inter prediction unit 114 as well. In other words, the image data of the frames are supplied to the operation unit 103, the intra prediction unit 113, and the inter prediction unit 114 in the encoding order. Further, when the input image is the still image, since there is no concept of time (since the number of frames is 1), the rearranging is omitted.

The operation unit 103 generates image data of a differential image obtained by subtracting the predicted image from the input image using the image data of the input image read from the screen rearrangement buffer 102 and the image data of the predicted image supplied from the intra prediction unit 113 or the inter prediction unit 114 through the predicted image selecting unit 115. For example, in the case of an image on which the intra coding is performed, the operation unit 103 generates a differential image between the input image and the predicted image generated by the intra prediction unit 113. Further, for example, in the case of an image on which the inter coding is performed, the operation unit 103 generates a differential image between the input image and the predicted image generated by the inter prediction unit 114. The operation unit 103 outputs the generated image data of the differential image to the orthogonal transform unit 104.

The orthogonal transform unit 104 performs orthogonal transform such as discrete cosine transform or Karhunen-Loeve transform on the image data of the differential image supplied from the operation unit 103. The orthogonal transform unit 104 supplies obtained transform coefficients to the quantization unit 105.

The quantization unit 105 quantizes the transform coefficients supplied from the orthogonal transform unit 104. The quantization unit 105 sets a quantization parameter based on information related to a target value of a coding amount supplied from the rate control unit 116, and performs the quantization. The quantization unit 105 supplies the quantized transform coefficients to the lossless encoding unit 106.

The lossless encoding unit 106 encodes the transform coefficients quantized by the quantization unit 105 according to an arbitrary coding scheme, and generates encoded data. Since coefficient data is quantized under control of the rate control unit 116, the data amount (the coding amount) of the encoded data becomes the target value set by the rate control unit 116 (or approximates to the target value).

The lossless encoding unit 106 acquires, for example, information indicating an intra prediction mode from the intra prediction unit 113, and acquires, for example, information indicating an inter prediction mode and differential motion vector information from the inter prediction unit 114. The lossless encoding unit 106 encodes various kinds of information according to an arbitrary coding scheme, and sets (multiplexes) the encoded information as part of header information of encoded data. The lossless encoding unit 106 supplies the obtained encoded data to be accumulated in the accumulation buffer 107.

Examples of the coding scheme of the lossless encoding unit 106 include variable length coding and arithmetic coding. As the variable length coding, for example, there is Context-Adaptive Variable Length Coding (CAVLC) defined in the H.264/AVC scheme. As the arithmetic coding, for example, there is Context-Adaptive Binary Arithmetic Coding (CABAC).

The accumulation buffer 107 temporarily holds the encoded data supplied from the lossless encoding unit 106. The accumulation buffer 107 outputs the held encoded data to the outside of the image coding device 100 at a predetermined timing. In other words, the accumulation buffer 107 also serves as a transmitting unit that transmits the encoded data.

The transform coefficients quantized by the quantization unit 105 are also supplied to the inverse quantization unit 108. The inverse quantization unit 108 inversely quantizes the quantized transform coefficients by a method corresponding to the quantization performed by the quantization unit 105. The inverse quantization unit 108 supplies the obtained transform coefficients to the inverse orthogonal transform unit 109.

The inverse orthogonal transform unit 109 performs inverse orthogonal transform on the transform coefficients supplied from the inverse quantization unit 108 by a method corresponding to the orthogonal transform process performed by the orthogonal transform unit 104. The image data of the differential image is restored by the inverse orthogonal transform. The inverse orthogonal transform unit 109 supplies the restored image data of the differential image to the operation unit 110 as the inverse orthogonal transform result.

The operation unit 110 generates image data of an image obtained by adding the restored differential image and the predicted image using the inverse orthogonal transform result supplied from the inverse orthogonal transform unit 109 and the image data of the predicted image supplied from the intra prediction unit 113 or the inter prediction unit 114 through the predicted image selecting unit 115. In other words, a locally reconstructed image (hereinafter, referred to as "the reconstructed image") is obtained by the addition process. The operation unit 110 supplies the image data of the reconstructed image to the loop filter 111 or the intra prediction unit 113.

The loop filter 111 includes a deblocking filter, an adaptive loop filter, or the like, and performs an appropriate filter process on the image data of the reconstructed image supplied from the operation unit 110. For example, the loop filter 111 performs the deblocking filter process on the image data of the reconstructed image, and removes block distortion of the reconstructed image. Further, for example, the loop filter 111 improves the image quality of the reconstructed image by performing the loop filter process on the deblocking filter process result (the image data of the reconstructed image from which the block distortion has been removed) using the Wiener Filter.

The loop filter 111 may perform another arbitrary filter process on the reconstructed image. The loop filter 111 may supply information used in the filter process such as a filter coefficient to the lossless encoding unit 106 as necessary so that the information can be encoded.

The loop filter 111 supplies the image data of the reconstructed image (hereinafter, referred to as a "decoded image") that has been subjected to the filter process as described above to the frame memory 112.

The frame memory 112 stores the supplied image data of the decoded image. Further, the frame memory 112 supplies the stored image data of the decoded image to the inter prediction unit 114 as a reference image at a predetermined timing.

The intra prediction unit 113 performs the prediction process on the current picture that is the image of the frame of the processing target, and generates the predicted image. The intra prediction unit 113 performs the prediction process in units of predetermined blocks (using a block as a processing unit). In other words, the intra prediction unit 113 generates the predicted image of the current block serving as the processing target in the current picture. At this time, the intra prediction unit 113 performs the prediction process (intra-screen prediction (which is also referred to as intra prediction)) using the reconstructed image supplied from the operation unit 110 as the reference image. In other words, the intra prediction unit 113 generates the predicted image using pixel values of pixels neighboring the current block which are included in the reconstructed image. The pixel values of the neighboring pixels used for the intra prediction are pixel values of previously processed pixels of the current picture. In intra prediction (that is, in the scheme of generating the predicted image), a plurality of methods (which are also referred to as "intra prediction modes") are prepared as candidates in advance. The intra prediction unit 113 performs the intra prediction in a plurality of intra prediction modes which are prepared in advance.

The intra prediction unit 113 generates predicted images in all the intra prediction modes serving as the candidates, evaluates cost function values of the predicted images using the input image supplied from the screen rearrangement buffer 102, and selects an optimal mode. When the optimal intra prediction mode is selected, the intra prediction unit 113 supplies the predicted image generated in the optimal mode to the predicted image selecting unit 115.

Further, as described above, the intra prediction unit 113 appropriately supplies, for example, the intra prediction mode information indicating the employed intra prediction mode to the lossless encoding unit 106 so that the information is encoded.

The inter prediction unit 114 performs the prediction process on the current picture, and generates the predicted image. The inter prediction unit 114 performs the prediction process in units of predetermined blocks (using a block as a processing unit). In other words, the inter prediction unit 114 generates the predicted image of the current block serving as the processing target in the current picture. At this time, the inter prediction unit 114 performs the prediction process using the image data of the input image supplied from the screen rearrangement buffer 102 and the image data of the decoded image supplied from the frame memory 112 as the reference image. The decoded image is an image (another picture other than the current picture) of the frame processed before the current picture. In other words, the inter prediction unit 114 performs the prediction process (inter-screen prediction (which is also referred to as "inter prediction")) of generating the predicted image using an image of another picture.

The inter prediction includes motion prediction and motion compensation. More specifically, the inter prediction unit 114 performs the motion prediction on the current block using the input image and the reference image, and detects a motion vector. Then, the inter prediction unit 114 performs the motion compensation process according to the detected motion vector using the reference image, and generates the predicted image (inter predicted image information) of the current block. In the inter prediction (that is, in the scheme of generating the predicted image), a plurality of methods (which are also referred to as "inter prediction modes") are prepared as candidates in advance. The inter prediction unit 114 performs the inter prediction in a plurality of inter prediction modes which are prepared in advance.

The inter prediction unit 114 generates the predicted images in all the inter prediction modes serving as the candidate. The inter prediction unit 114 evaluates cost function values of the predicted images using the input image supplied from the screen rearrangement buffer 102, information of the generated differential motion vector, and the like, and selects an optimal mode. When the optimal inter prediction mode is selected, the inter prediction unit 114 supplies the predicted image generated in the optimal mode to the predicted image selecting unit 115.

The inter prediction unit 114 supplies the information indicating the employed inter prediction mode, information necessary for performing processing in the inter prediction mode when the encoded data is decoded, and the like to the lossless encoding unit 106 so that the information is encoded. As the necessary information, there is information of a generated differential motion vector, and as prediction motion vector information, there is a flag indicating an index of a prediction motion vector.

The predicted image selecting unit 115 selects a supply source of the predicted image to be supplied to the operation unit 103 and the operation unit 110. For example, in the case of the intra coding, the predicted image selecting unit 115 selects the intra prediction unit 113 as the supply source of the predicted image, and supplies the predicted image supplied from the intra prediction unit 113 to the operation unit 103 and the operation unit 110. Further, for example, in the case of the inter coding, the predicted image selecting unit 115 selects the inter prediction unit 114 as the supply source of the predicted image, and supplies the predicted image supplied from the inter prediction unit 114 to the operation unit 103 and the operation unit 110.

The rate control unit 116 control a rate of a quantization operation of the quantization unit 105 based on the coding amount of the encoded data accumulated in the accumulation buffer 107 such that neither an overflow nor an underflow occurs.

The image coding device 100 further includes a profile setting unit 121.

The profile setting unit 121 sets a profile that is applied to encoding of image data. For example, when the still image is encoded, the profile setting unit 121 sets the still picture profile. For example, the profile setting unit 121 sets the profile according to an external instruction such as a user instruction. Of course, this method is arbitrary, and the profile may be set based on any information. When the profile is set, the profile setting unit 121 supplies the information to the lossless encoding unit 106.

The lossless encoding unit 106 performs encoding according to the profile set by the profile setting unit 121. For example, when the still picture profile is set by the profile setting unit 121, the lossless encoding unit 106 restricts the value of the syntax element related to the inter-image process. The specific example of this restriction has been described in <0. Overview>.

<Lossless Encoding Unit>

Figure 26:
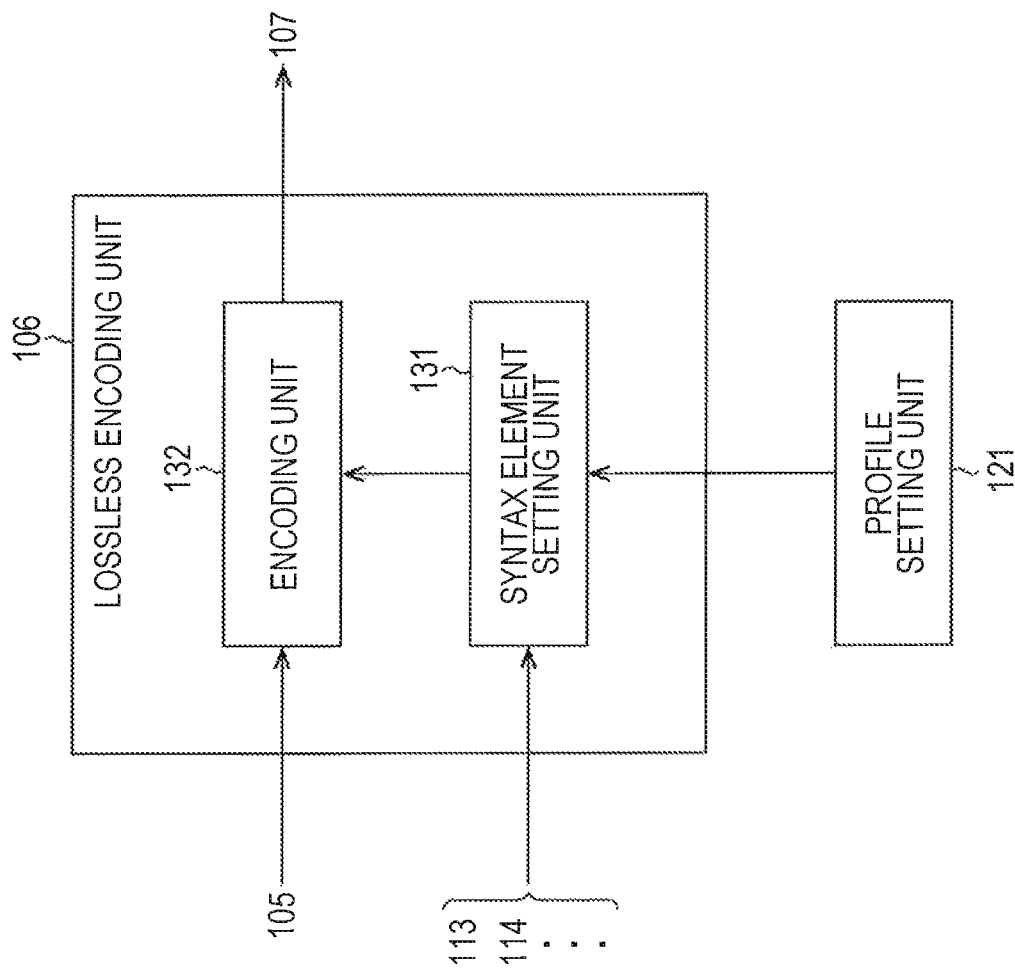
FIG. 26 is a block diagram illustrating an exemplary main configuration of a lossless encoding unit.

FIG. 26 is a block diagram illustrating an exemplary main configuration of the lossless encoding unit 106 of FIG. 25 related to a syntax element setting. As illustrated in FIG. 25, the lossless encoding unit 106 includes a syntax element setting unit 131 and an encoding unit 132.

The syntax element setting unit 131 performs processing related to a syntax element setting. For example, the syntax element setting unit 131 sets the syntax elements of various NAL units (nal_unit) such as the video parameter set (VPS), the sequence parameter set (SPS), the picture parameter set (PPS), and the slice header. The syntax element setting unit 131 acquires necessary information from the processing units of the image coding device 100 such as the intra prediction unit 113 and the inter prediction unit 114 as necessary, and sets the value of the syntax element based on the acquired information.

Further, the syntax element setting unit 131 receives the designated profile from the profile setting unit 121. The syntax element setting unit 131 sets the syntax element according to the profile designated by the profile setting unit 121.

For example, when the still picture profile is set by the profile setting unit 121, the syntax element setting unit 131 restricts the value of the syntax element related to the inter-image process. The specific example of this restriction has been described in <0. Overview>.

The syntax element setting unit 131 supplies the set syntax element to the encoding unit 132.

For example, the encoding unit 132 acquires the quantization coefficients of the image data from the quantization unit 105, encodes the acquired quantization coefficients according to the arithmetic coding or the like, and obtains the encoded data. The encoding unit 132 supplies the obtained encoded data to the accumulation buffer 107.

Further, the encoding unit 132 also encodes information other than the image data, and supplies the encoded information to the accumulation buffer 107. For example, the encoding unit 132 encodes the syntax element set by the syntax element setting unit 131, and supplies the encoded syntax element to the accumulation buffer 107.

As described above, when the still picture profile is set, the lossless encoding unit 106 restricts the value of the syntax element related to the inter-image process, and generates the encoded data. Thus, the image coding device 100 can suppress transmission of redundant information and suppress a reduction in coding efficiency.

In addition, the image coding device 100 can suppress an increase of an unnecessary load in the decoding process by reducing the redundant information of the encoded data.

Further, the image coding device 100 can switch the profile and easily encode both the still image and the moving image through a single circuit.

<Flow of Coding Process>

Next, an exemplary flow of the coding process performed by the image coding device 100 illustrated in FIG. 25 will be described with reference to flowcharts of FIGS. 27 and 28.

Figure 27:
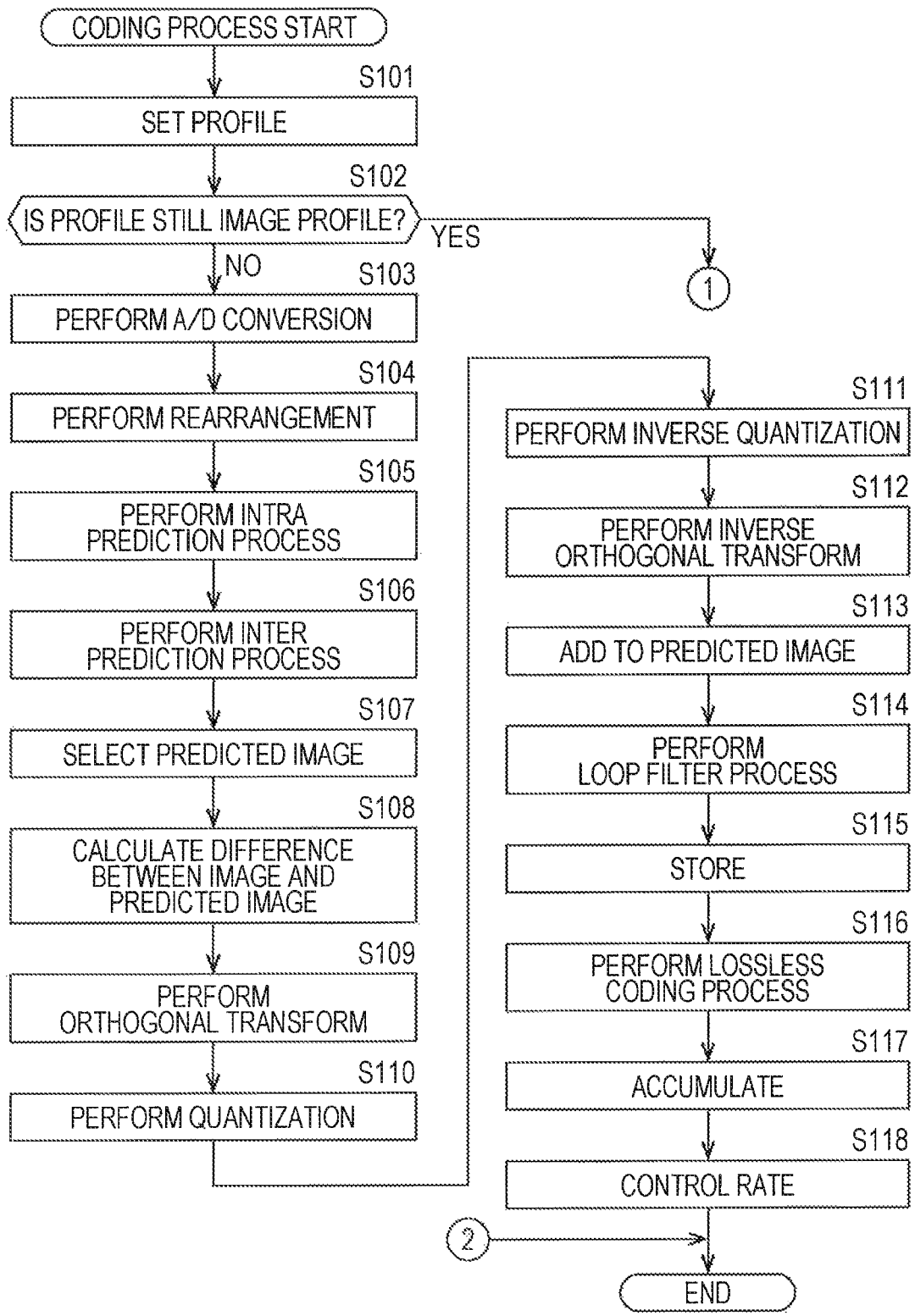
FIG. 27 is a flowchart for describing an exemplary flow of a coding process.

When the coding process starts, in step S101 of FIG. 27, the profile setting unit 121 sets the profile according to the image data to be encoded, for example, according to the external instruction such as the user instruction.

In step S102, the lossless encoding unit 106 determines whether or not the profile set in step S101 is the still image profile (the profile suitable for encoding of the image data of the still image). When the set profile is determined to be the moving image profile (the profile suitable for encoding of the image data of the moving image), the process proceeds to step S103.

When the image data of the moving image is encoded, in step S103, the A/D converter 101 performs A/D conversion on image of frames (pictures) of an input moving image.

In step S104, the screen rearrangement buffer 102 stores the images that have been subjected to the A/D conversion in step S103, and rearranges the respective pictures arranged in the display order in the encoding order.

In step S105, the intra prediction unit 113 performs the intra prediction process of the intra prediction mode.

In step S106, the inter prediction unit 114 performs the inter prediction process in which the motion prediction and the motion compensation of the inter prediction mode are performed.

In step S107, the predicted image selecting unit 115 selects the predicted image based on the cost function value or the like. In other words, the predicted image selecting unit 115 selects either of the predicted image generated by the intra prediction in step S105 and the predicted image generated by the inter prediction in step S106.

In step S108, the operation unit 103 calculates a difference between the input image in which the frame order is rearranged by the process of step S104 and the predicted image selected by the process of step S107. In other words, the operation unit 103 generates image data of a differential image between the input image and the predicted image. The obtained image data of the differential image is smaller in a data amount than original image data. Thus, the data amount can be compressed to be smaller than when the image is encoded without change.

In step S109, the orthogonal transform unit 104 performs the orthogonal transform on the image data of the differential image generated by the process of step S108.

In step S110, the quantization unit 105 quantizes the orthogonal transform coefficients obtained by the process of step S109 using the quantization parameter calculated by the rate control unit 116.

In step S111, the inverse quantization unit 108 inversely quantizes the quantized coefficients (which are also referred to as "quantization coefficients") generated by the process of step S110 according to characteristics corresponding to characteristics of the quantization unit 105.

In step S112, the inverse orthogonal transform unit 109 performs the inverse orthogonal transform on the orthogonal transform coefficients obtained by the process of step S111.

In step S113, the operation unit 110 generates image data of a reconstructed image by adding the predicted image selected by the process of step S107 to the differential image restored by the process of step S112.

In step S114, the loop filter 111 performs the loop filter process on the image data of the reconstructed image generated by the process of step S113. As a result, for example, the block distortion of the reconstructed image is removed.

In step S115, the frame memory 112 stores the decoded image obtained by the process of step S114.

In step S116, the lossless encoding unit 106 encodes the quantized coefficients obtained by the process of step S110. In other words, lossless coding such as variable length coding or arithmetic coding is performed on data corresponding to the differential image.

At this time, the lossless encoding unit 106 encodes information related to the prediction mode of the predicted image selected by the process of step S107, and adds the encoded information to the encoded data obtained by encoding the differential image. In other words, the lossless encoding unit 106 also encodes the optimal intra prediction mode information supplied from the intra prediction unit 113, information according to the optimal inter prediction mode supplied from the inter prediction unit 114, or the like, and adds the encoded information to the encoded data.

Further, the lossless encoding unit 106 also sets and encodes the syntax elements of various kinds of NAL units or the like, and adds the encoded syntax elements to the encoded data.

In step S117, the accumulation buffer 107 accumulates the encoded data obtained by the process of step S115. The encoded data accumulated in the accumulation buffer 107 is appropriately read, and transmitted to the decoding side via a transmission path or a recording medium.

In step S118, the rate control unit 116 controls the rate of the quantization operation of the quantization unit 105 based on the coding amount (the generated coding amount) of the encoded data accumulated in the accumulation buffer 107 by the process of step S117 such that neither an overflow nor an underflow occurs. Further, the rate control unit 116 supplies information related to the quantization parameter to the quantization unit 105. When the process of step S118 ends, the coding process ends.

Figure 28:
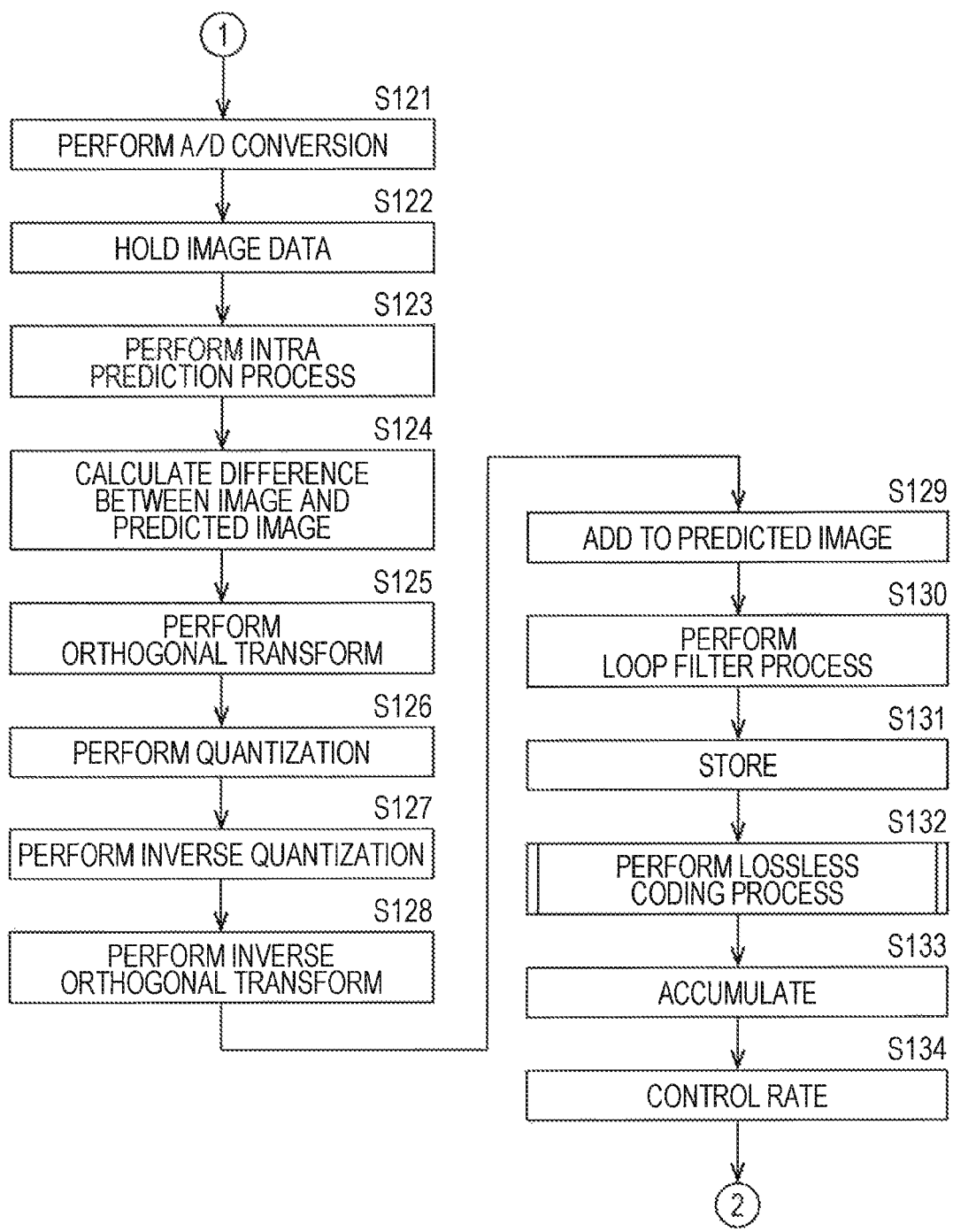
FIG. 28 is a flowchart for describing an exemplary flow of a coding process, subsequently to FIG. 27.

Further, when the profile set in step 3101 is determined to be the still image profile (the profile suitable for encoding of the image data of the still image) in step S102, the process proceeds to step S121 of FIG. 28.

In this case, processing similar to processing performed on the moving image in respective steps of FIG. 27 is performed on the image data of the input still image in steps S121 to S134.

Here, when the image data of the still image is encoded, since the image data has no concept of time (there is a single picture), the inter prediction process of step S106 is omitted. Thus, the process of selecting the predicted image in step S107 is omitted as well.

In other words, the processes of steps S121 to 3123 of FIG. 28 correspond to the processes of steps 3103 to S105 of FIG. 27. Further, the processes of steps 3124 to S134 of FIG. 28 correspond to the processes of steps S108 to S118 of FIG. 27.

Here, in the process of step S132 of FIG. 28, the value of the syntax element related to the inter-image process is restricted. The details of this process will be described later. When the process of step S134 of FIG. 28 ends, the coding process ends.

<Flow of Lossless Coding Process>

Figure 29:
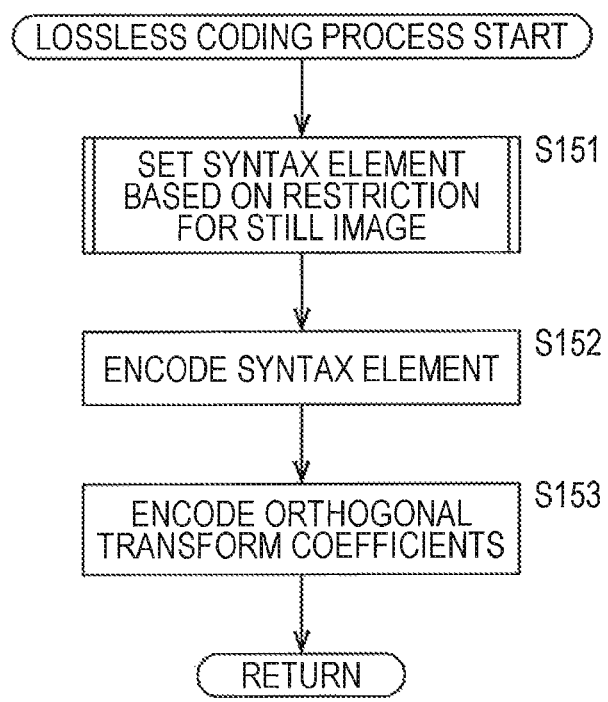
FIG. 29 is a flowchart for describing an exemplary flow of a lossless coding process.

Next, an exemplary flow of the lossless coding process performed in step S132 of FIG. 28 will be described with reference to a flowchart of FIG. 29.

When the lossless coding process starts in the encoding of the still image, in step S151, the syntax element setting unit 131 sets the syntax element based on the restriction for the still image. For example, as described above in <0. Overview>, in order to reduce transmission of redundant information, when the still picture profile is applied, the syntax element setting unit 131 restricts the value of the syntax element related to the inter-image process.

In step S152, the encoding unit 132 encodes the syntax element set in step S151.

In step S153, the encoding unit 132 encodes the orthogonal transform coefficients quantized by the quantization unit 105. When the process of step S153 ends, the lossless coding process ends, and the process returns to FIG. 28.

<Flow of Syntax Element Setting Process>

Next, an exemplary flow of the syntax element setting process performed in step S151 of FIG. 29 will be described with reference to a flowchart of FIG. 30.

When the syntax element setting process starts, in step S171, the syntax element setting unit 131 sets the parameter vps_max_sub_layers_minus1 related to the sub layer of the video parameter set (VPS) and the parameter sps_max_sub_layers_minus1 related to the sub layer of the sequence parameter set (SPS) to 0.

In step S172, the syntax element setting unit 131 sets the syntax element general_profile_idc of the profile tier level (profile_tier_level( )) to a value indicating the still picture profile.

In step S173, the syntax element setting unit 131 sets other syntax elements of the profile tier level (profile_tier_level( )).

In step S174, the syntax element setting unit 131 sets the value of the syntax element vps_num_hrd_parameters related to the virtual reference decoder in the video parameter set (VPS) to 0.

In step S175, the syntax element setting unit 131 sets the value of the syntax element restricted_ref_pic_lists_flag related to the P slice and the B slice in the sequence parameter set (SPS) to 0.

In step S176, the syntax element setting unit 131 sets the value of the syntax element num_short_term_ref_pic_sets related to the short term in the sequence parameter set (SPS) to 0.

In step S177, the syntax element setting unit 131 sets the value of the syntax element long_term_ref_pics_present_flag related to the long term in the sequence parameter set (SPS) to 0.

In step S178, the syntax element setting unit 131 sets the value of the syntax element sps_temporal_mvp_enable_flag related to the motion vector in the sequence parameter set (SPS) to 0.

In step S179, the syntax element setting unit 131 sets both of the value of the syntax element num_ref_idx_10_default_active minus1 related to L0 and the value of the syntax element num_ref_idx_11_default_active minus1 related to L1 in the picture parameter set (PPS) to 0 or 1.

In step S180, the syntax element setting unit 131 sets the value of the syntax element lists_modification_present_flag of the picture parameter set (PPS) indicating whether or not the syntax element ref_pic_list_modification is present in the current slice header to 0.

In step S181, the syntax element setting unit 131 sets the value of the syntax element log 2_parallel_merge_level_minus2 of the picture parameter set (PPS) designating the parallel process level of the merge mode and the skip mode in the prediction process to 0.

In step S182, the syntax element setting unit 131 sets the value of the syntax element scaling_list_pred_mode_flag related to the prediction mode of the scaling list (scaling_list_data ( )) to 0, and sets the value of the syntax element scaling_list_pred_matrix_id_delta related to the prediction matrix of the scaling list (scaling_list_data ( )) to 0 or 1.

In step S183, the syntax element setting unit 131 sets the value of the syntax element slice_type related to the slice type in the slice header (slice_header( )) to the value indicating the I slice.

In step 3184, the syntax element setting unit 131 sets the NAL unit type (nal_unit_type) for the VCL to IDR_W_LP or IDR_N_LP.

In step S185, the syntax element setting unit 131 sets other syntax elements. For example, in step S185, the syntax element setting unit 131 may set the value of the syntax element (flag) weighted_pred_flag related to the weighted prediction of the P slice or the syntax element (flag) weighted_bipred_flag related to the weighted prediction of the B slice in the picture parameter set (PPS) to 0. When the process of step S185 ends, the process returns to FIG. 29.

Of course, the processing order of the above-described respective steps is arbitrary, and the processing order of the respective steps may be changed, and processes of a plurality of steps may be performed in parallel. Particularly, as described above in <0-1> to <0-3>, the processing order of steps S171 to S173 is arbitrary.

Further, since the restrictions of the values of the syntax elements are independent of one another, all values of a group of syntax elements need not be restricted, and only the values of some syntax elements may be restricted. In other words, among the above-described steps in the syntax element setting process of FIG. 30, only the processes of some steps may be performed.

Figure 30:
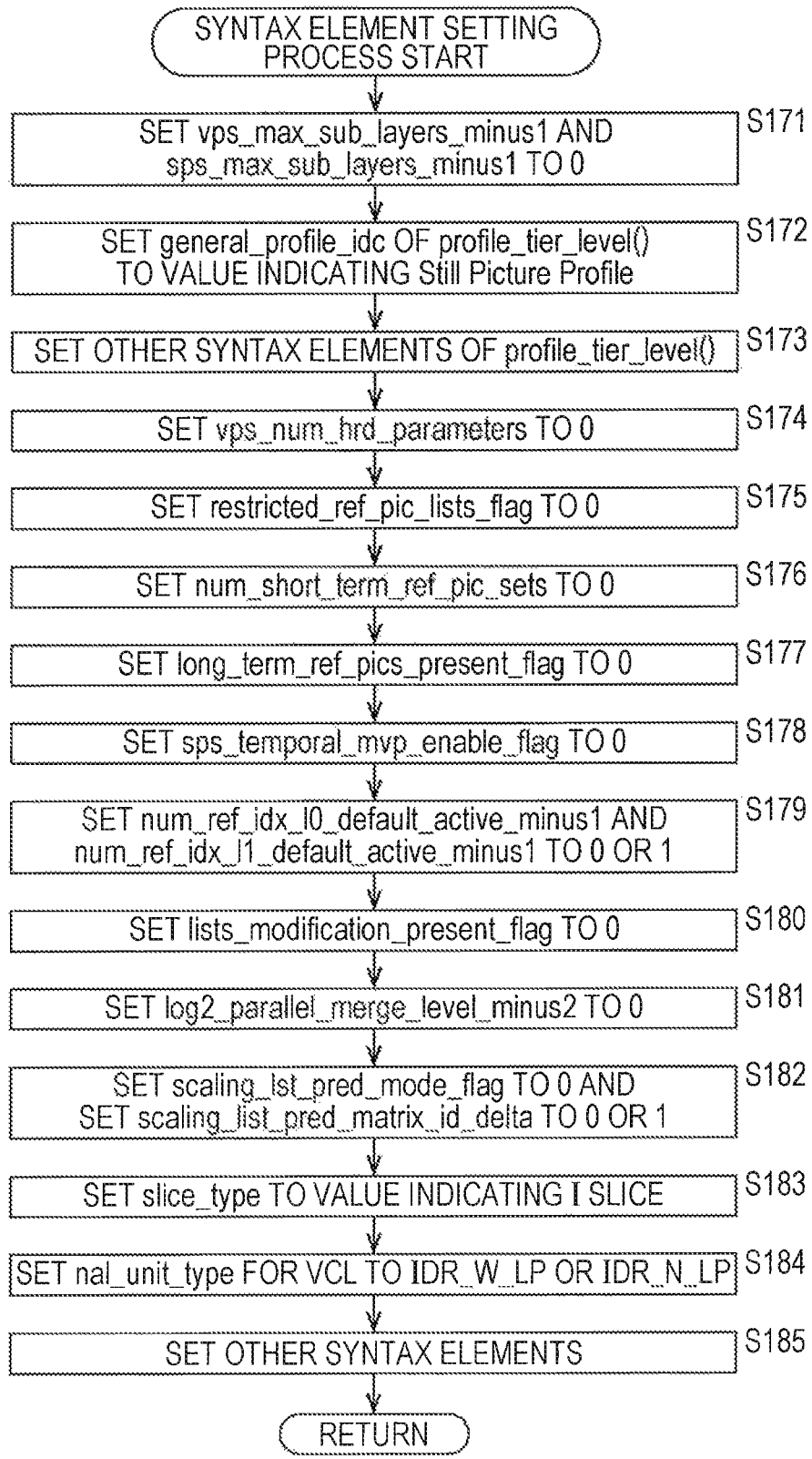
FIG. 30 is a flowchart for describing an exemplary flow a syntax element setting process.

Further, since the syntax elements whose value is restricted are not limited to the above-described examples, a process of restricting a value of a syntax element that is not mentioned above may be added in the syntax element setting process of FIG. 30.

By performing the respective processes as described above, the image coding device 100 can suppress transmission of redundant information and improve the coding efficiency in image compression information to be output when encoding is performed based on the profile for encoding the still image.

2. Second Embodiment

Image Coding Device

Further, it is desirable to select a profile according to an input image. In this regard, it may be determined whether the input image is the moving image or the still image, and an appropriate profile may be set according to a determination result.

Figure 31:
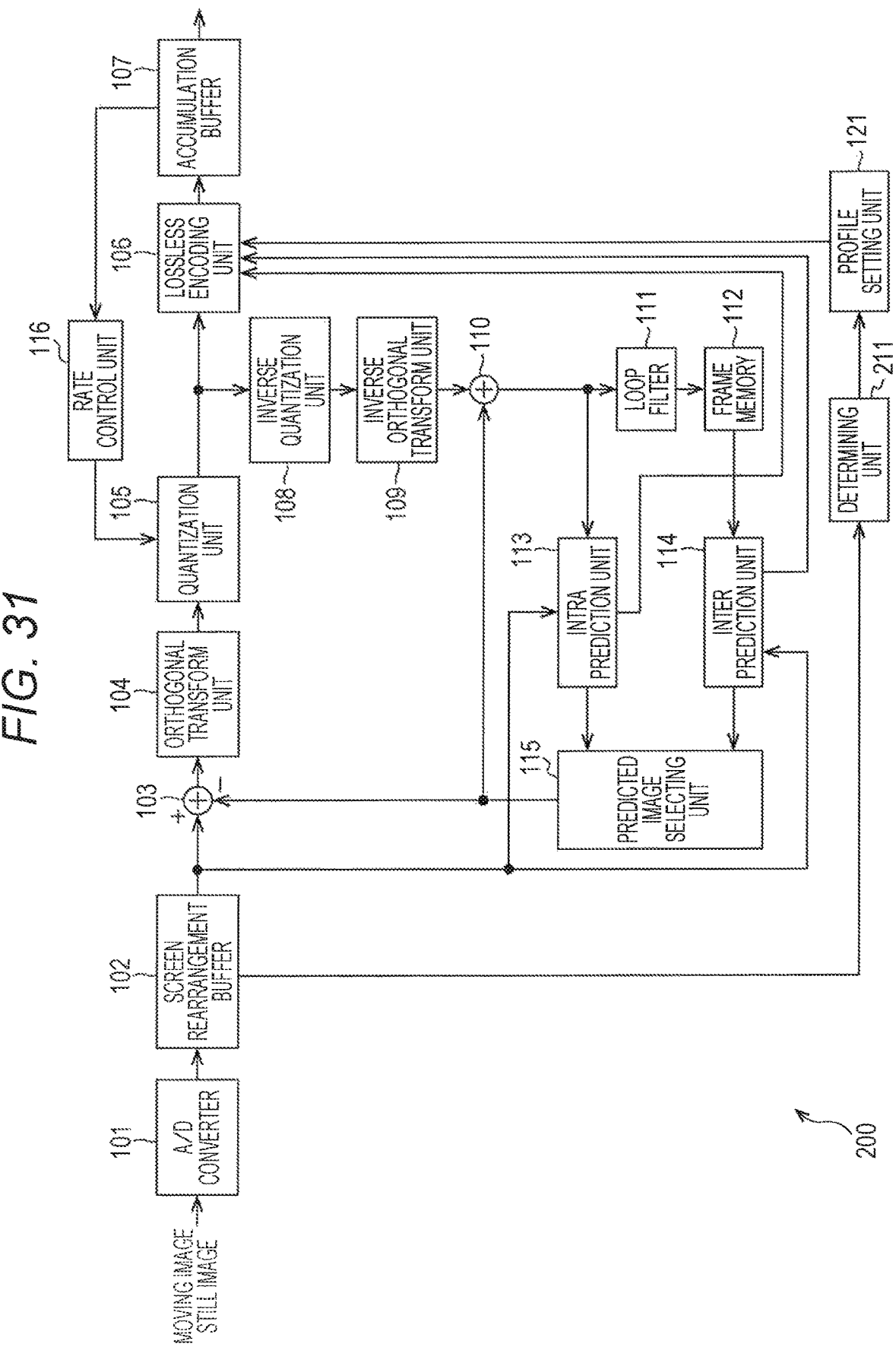
FIG. 31 is a block diagram illustrating another exemplary configuration of an image coding device.

FIG. 31 is a block diagram illustrating an exemplary configuration of an image coding device as an example of an image processing device to which the present technology is applied in this case. For example, an image coding device 200 illustrated in FIG. 31 encodes image data of a moving image and a still image using the prediction process of the HEVC or a prediction process of a scheme based on the HEVC.

The image coding device 200 has basically the same configuration as the image coding device 100 and performs the same process. The image coding device 200 includes a determining unit 211 in addition to the configuration of the image coding device 100.

The determining unit 211 acquires image information from the screen rearrangement buffer 102, analyzes the image information, and determines whether image data of an encoding target is a moving image or a still image. The determining unit 211 supplies the determination result to the profile setting unit 121.

The profile setting unit 121 sets an appropriate profile according to the determination result supplied from the determining unit 211. In other words, for example, when the determining unit 211 determines that the image data of the encoding target is the moving image, the profile setting unit 121 sets the moving image profile. Further, for example, when the determining unit 211 determines that the image data of the encoding target is the still image, the profile setting unit 121 sets the still image profile (for example, the still picture profile).

When the profile is set, the profile setting unit 121 supplies the information to the lossless encoding unit 106. The lossless encoding unit 106 performs encoding according to the profile set by the profile setting unit 121.

As a result, the image coding device 200 can set the profile according to the input image data without designation from the outside, for example, the user. In other words, the image coding device 200 can suppress transmission of the redundant information and improve the coding efficiency in the image compression information to be output without designation from the outside, for example, the user.

In addition, the image coding device 200 can suppress an increase of an unnecessary load in the decoding process by reducing the redundant information of the encoded data.

Further, the image coding device 200 can encode both a still image and a moving image through a single circuit.

<Flow of Coding Process>

Next, an exemplary flow of the coding process performed by the image coding device 200 in this case will be described with reference to flowcharts of FIGS. 32 and 33.

Figure 32:
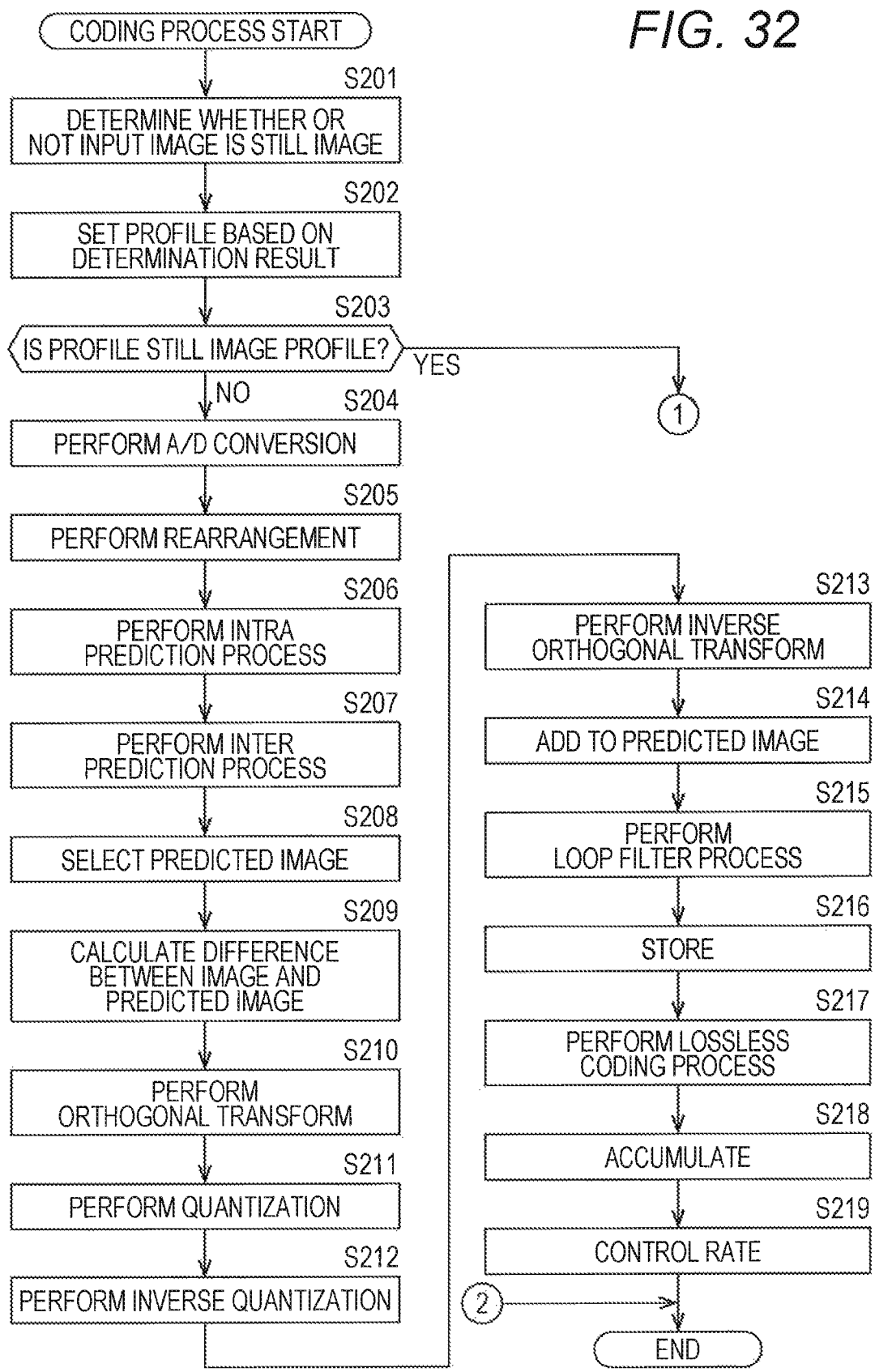
FIG. 32 is a flowchart for describing another exemplary flow of a coding process.

When the coding process starts, in step S201 of FIG. 32, the determining unit 211 determines whether or not an input image is a still image.

In step S202, the profile setting unit 121 sets the profile according to the determination result obtained in step S201.

Thereafter, the same process as in steps S102 to S118 of FIG. 27 is performed in steps S203 to S219 of FIG. 32.

Figure 33:
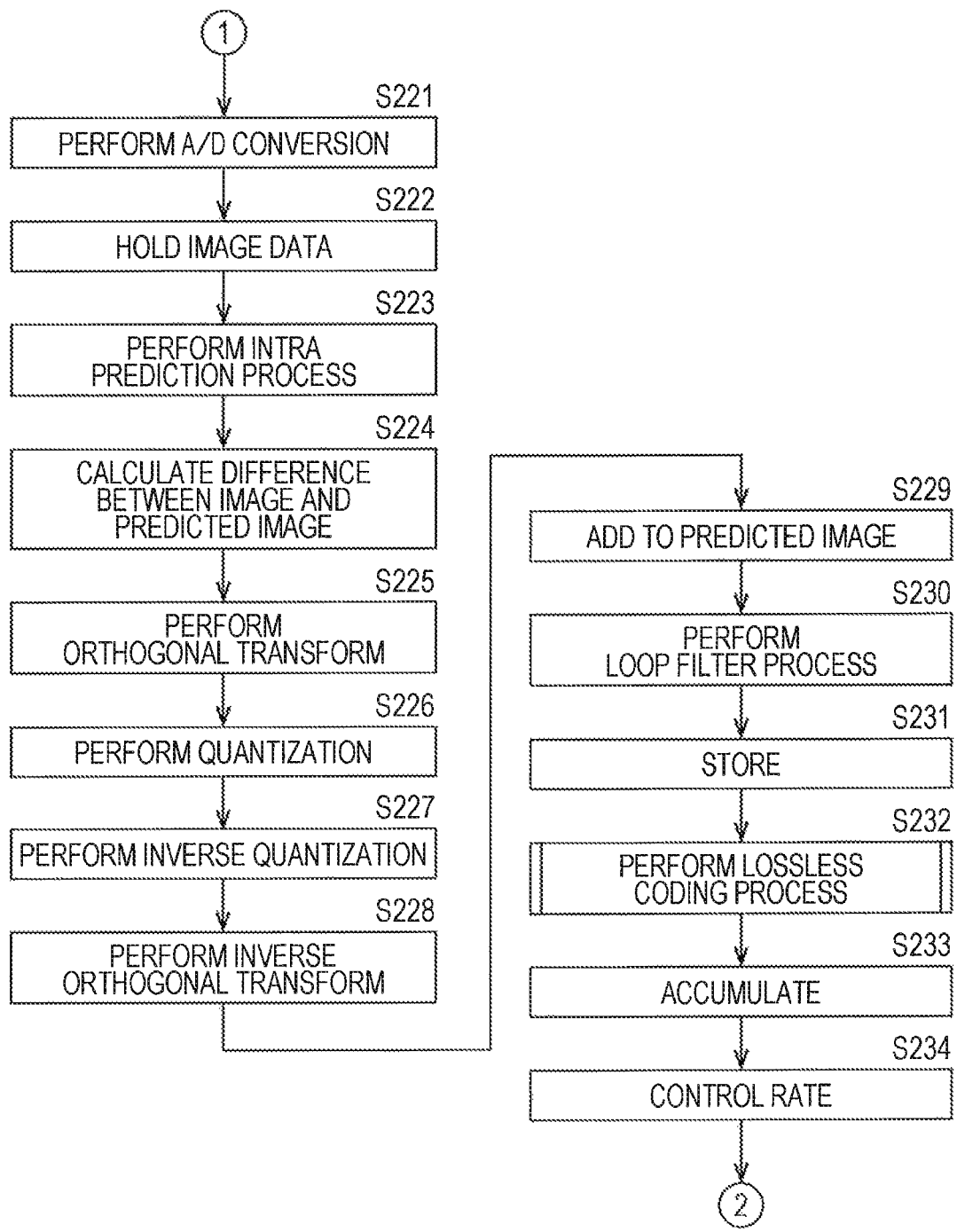
FIG. 33 is a flowchart for describing another exemplary flow of a coding process, subsequently to FIG. 32.

In step S203 of FIG. 32, when the still image profile is determined to have been set, the process proceeds to step S221 of FIG. 33. The same process as in steps S121 to S134 of FIG. 28 is performed in steps S221 to S234 of FIG. 33.

By performing the respective processes as described above, the image coding device 200 can set the profile according to the input image data with designation from the outside, for example, the user, suppress transmission of redundant information, and improve the coding efficiency in the image compression information to be output.

3. Third Embodiment

Image Decoding Device

Figure 34:
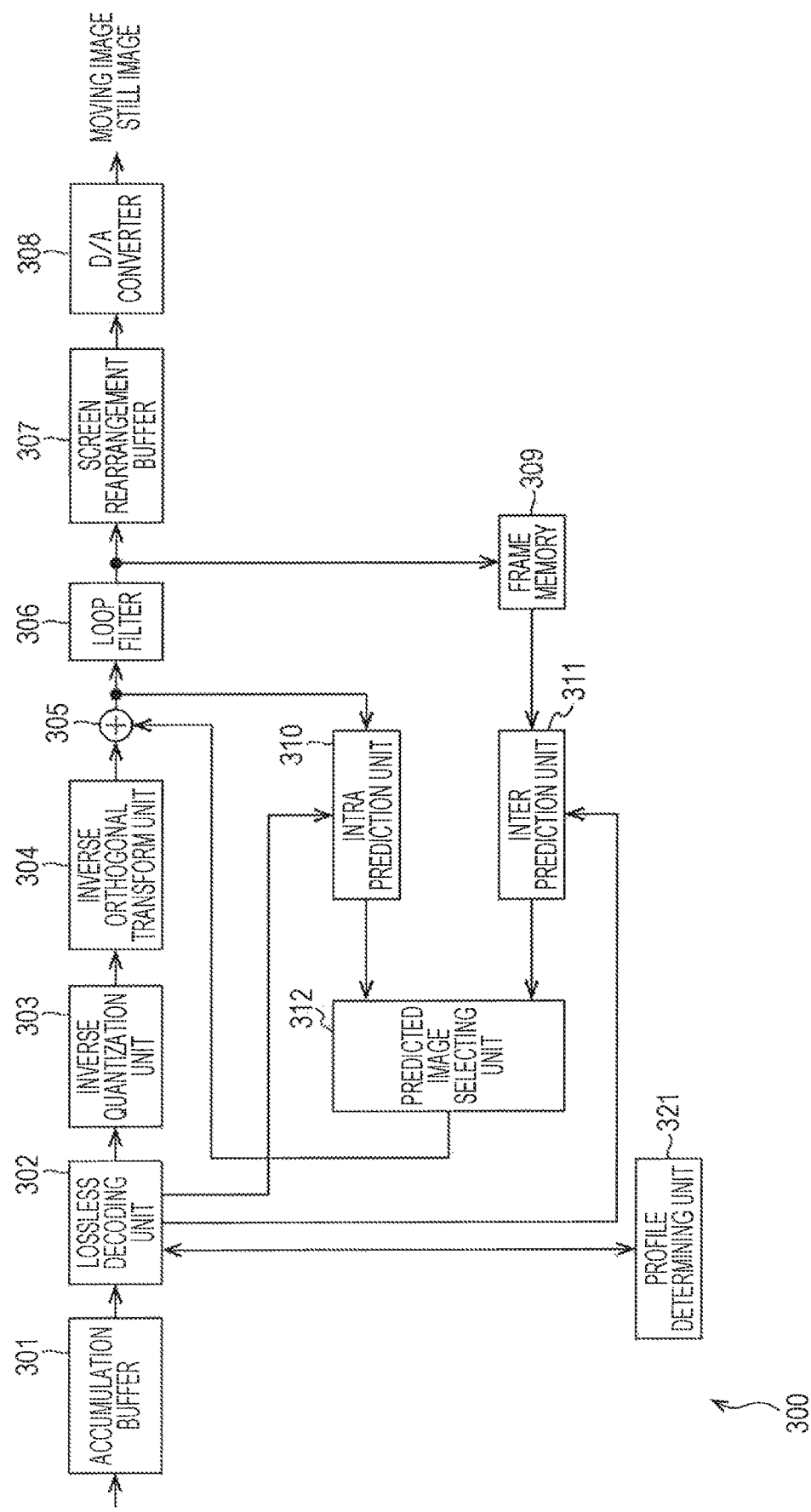
FIG. 34 is a block diagram illustrating an exemplary main configuration of an image decoding device.

Next, decoding of the encoded data that has been encoded as described above will be described below. FIG. 34 is a block diagram illustrating an exemplary main configuration of an image decoding device corresponding to the image coding device 100 of FIG. 25 or the image coding device 200 of FIG. 31 as an example of an image processing device to which the present technology is applied.

An image decoding device 300 illustrated in FIG. 34 decodes the encoded data generated by the image coding device 100 or the image coding device 200 according to a decoding method corresponding to an encoding method thereof.

As illustrated in FIG. 34, the image decoding device 300 includes an accumulation buffer 301, a lossless decoding unit 302, an inverse quantization unit 303, an inverse orthogonal transform unit 304, an operation unit 305, a loop filter 306, a screen rearrangement buffer 307, and a D/A converter 308. The image decoding device 300 further includes a frame memory 309, an intra prediction unit 310, an inter prediction unit 311, and a predicted image selecting unit 312.

The accumulation buffer 301 also functions as a receiving unit that receives transmitted encoded data. The accumulation buffer 301 receives and accumulates the transmitted encoded data, and supplies the encoded data to the lossless decoding unit 302 at a predetermined timing. The encoded data includes information necessary for decoding such as prediction mode information. The lossless decoding unit 302 decodes information encoded by the lossless encoding unit 106 which is supplied from the accumulation buffer 301 according to a decoding scheme corresponding to the coding scheme thereof. The lossless decoding unit 302 supplies quantized coefficient data of a differential image obtained by the decoding to the inverse quantization unit 303.

Further, the lossless decoding unit 302 determines whether the mode selected as the optimal prediction mode is the intra prediction mode or the inter prediction mode, and supplies information related to the optimal prediction mode to the mode determined to be selected, that is, the intra prediction unit 310 or the inter prediction unit 311. In other words, for example, when the intra prediction mode is selected as the optimal prediction mode in the image coding device, the information related to the optimal prediction mode is supplied to the intra prediction unit 310. Further, for example, when the inter prediction mode is selected as the optimal prediction mode in the image coding device, the information related to the optimal prediction mode is supplied to the inter prediction unit 311.

Further, for example, the lossless decoding unit 302 supplies information necessary for inverse quantization such as a quantization matrix and a quantization parameter to the inverse quantization unit 303.

The inverse quantization unit 303 inversely quantizes the quantized coefficient data obtained by the decoding performed by the lossless decoding unit 302 according to a scheme corresponding to the quantization scheme of the quantization unit 105. The inverse quantization unit 303 is a processing unit similar to the inverse quantization unit 108. In other words, the description of the inverse quantization unit 303 can also apply to the inverse quantization unit 108. Here, it is necessary to change and read, for example, input and output destinations of data according to a device.

The inverse quantization unit 303 supplies the obtained coefficient data to the inverse orthogonal transform unit 304.

The inverse orthogonal transform unit 304 performs inverse orthogonal transform on the orthogonal transform coefficients supplied from the inverse quantization unit 303 according to a scheme corresponding to the orthogonal transform scheme of the orthogonal transform unit 104. The inverse orthogonal transform unit 304 is a processing unit similar to the inverse orthogonal transform unit 109. In other words, the description of the inverse orthogonal transform unit 304 can also apply to the inverse orthogonal transform unit 109. Here, it is necessary to change and read, for example, input and output destinations of data according to a device.

The image data of the differential image is restored by the inverse orthogonal transform process. The restored image data of the differential image corresponds to the image data of the differential image before the orthogonal transform is performed in the image coding device. Hereinafter, the restored image data of the differential image obtained by the inverse orthogonal transform process of the inverse orthogonal transform unit 304 is also referred to as "decoded residual data." The inverse orthogonal transform unit 304 supplies the decoded residual data to the operation unit 305. Further, the operation unit 305 is supplied with the image data of the predicted image from the intra prediction unit 310 or the inter prediction unit 311 via the predicted image selecting unit 312.

The operation unit 305 obtains image data of a reconstructed image obtained by adding the differential image and the predicted image using the decoded residual data and the image data of the predicted image. The reconstructed image corresponds to the input image before the predicted image is subtracted by the operation unit 103. The operation unit 305 supplies the reconstructed image to the loop filter 306 and the intra prediction unit 310.

The loop filter 306 appropriately performs the loop filter process such as the deblocking filter process or the adaptive loop filter process on the supplied reconstructed image, and generates a decoded image. For example, the loop filter 306 performs the deblocking filter process on the reconstructed image, and removes block distortion. Further, for example, the loop filter 306 improves the image quality by performing the loop filter process on the deblocking filter process result (the reconstructed image from which the block distortion has been removed) using the Wiener Filter.

A type of the filter process performed by the loop filter 306 is arbitrary, and any other filter process may be performed. Further, the loop filter 306 may perform the filter process using a filter coefficient supplied from the image coding device.

The loop filter 306 supplies the decoded image serving as the filter process result to the screen rearrangement buffer 307 and the frame memory 309.

The screen rearrangement buffer 307 performs frame order rearranging on the decoded image. In other words, the screen rearrangement buffer 307 rearranges the images of the respective frames arranged in the encoding order by the screen rearrangement buffer 102 in the original display order. In other words, the screen rearrangement buffer 307 stores the image data of the decoded images of the respective frames supplied in the encoding order in the encoding order, reads the image data of the decoded images of the respective frames stored in the encoding order in the display order, and supplies the read image data to the D/A converter 308. The D/A converter 308 performs D/A conversion on the decoded image (digital data) of the respective frames supplied from the screen rearrangement buffer 307, and outputs the converted images to be displayed on a display (not illustrated) as analog data.

The frame memory 309 stores the supplied decoded images, and supplies the stored decoded images to the inter prediction unit 311 as the reference image at a predetermined timing or based on a request from the outside, for example, the inter prediction unit 311.

The intra prediction unit 310 is appropriately supplied with, for example, information indicating the intra prediction mode obtained by decoding the header information from the lossless decoding unit 302. The intra prediction unit 310 performs the intra prediction in the intra prediction mode (the optimal intra prediction mode) used in the intra prediction unit 113, and generates the predicted image. At this time, the intra prediction unit 310 performs the intra prediction using the image data of the reconstructed image supplied from the operation unit 305. In other words, the intra prediction unit 310 uses the reconstructed image as the reference image (the neighboring pixel). The intra prediction unit 310 supplies the generated predicted image to the predicted image selecting unit 312.

The inter prediction unit 311 acquires information (the optimal prediction mode information, the reference image information, and the like) obtained by decoding the header information from the lossless decoding unit 302.

The inter prediction unit 311 performs the inter prediction using the reference image acquired from the frame memory 309 in the inter prediction mode (the optimal inter prediction mode) indicated by the optimal prediction mode information acquired from the lossless decoding unit 302, and generates the predicted image.

The predicted image selecting unit 312 supplies the predicted image received from the intra prediction unit 310 or the predicted image received from the inter prediction unit 311 to the operation unit 305. Then, the operation unit 305 adds the predicted image to the decoded residual data (the differential image information) supplied from the inverse orthogonal transform unit 304, and acquires the reconstructed image.

The image decoding device 300 further includes a profile determining unit 321.

The profile determining unit 321 acquires information related to the profile of the encoded data which is included in the encoded data (bitstream) transmitted from the encoding side (for example, the image coding device 100 or the image coding device 200) from the lossless decoding unit 302, and determines the profile set at the encoding side (for example, the image coding device 100 or the image coding device 200) based on the acquired information.

For example, the profile determining unit 321 determines whether or not the still image profile (for example, the still picture profile) has been set.

The profile determining unit 321 supplies a determination result to the lossless decoding unit 302. The lossless decoding unit 302 decodes the encoded data according to the profile determination result supplied from the profile determining unit 321. For example, when the profile determining unit 321 determines that the still image profile (for example, the still picture profile) has been set, the lossless decoding unit 302 analyzes the syntax element related to the inter-image process in a state in which the value is restricted. A specific example of the method of restricting the value of the syntax element has been described above in <0. Overview>.

<Lossless Decoding Unit>

Figure 35:
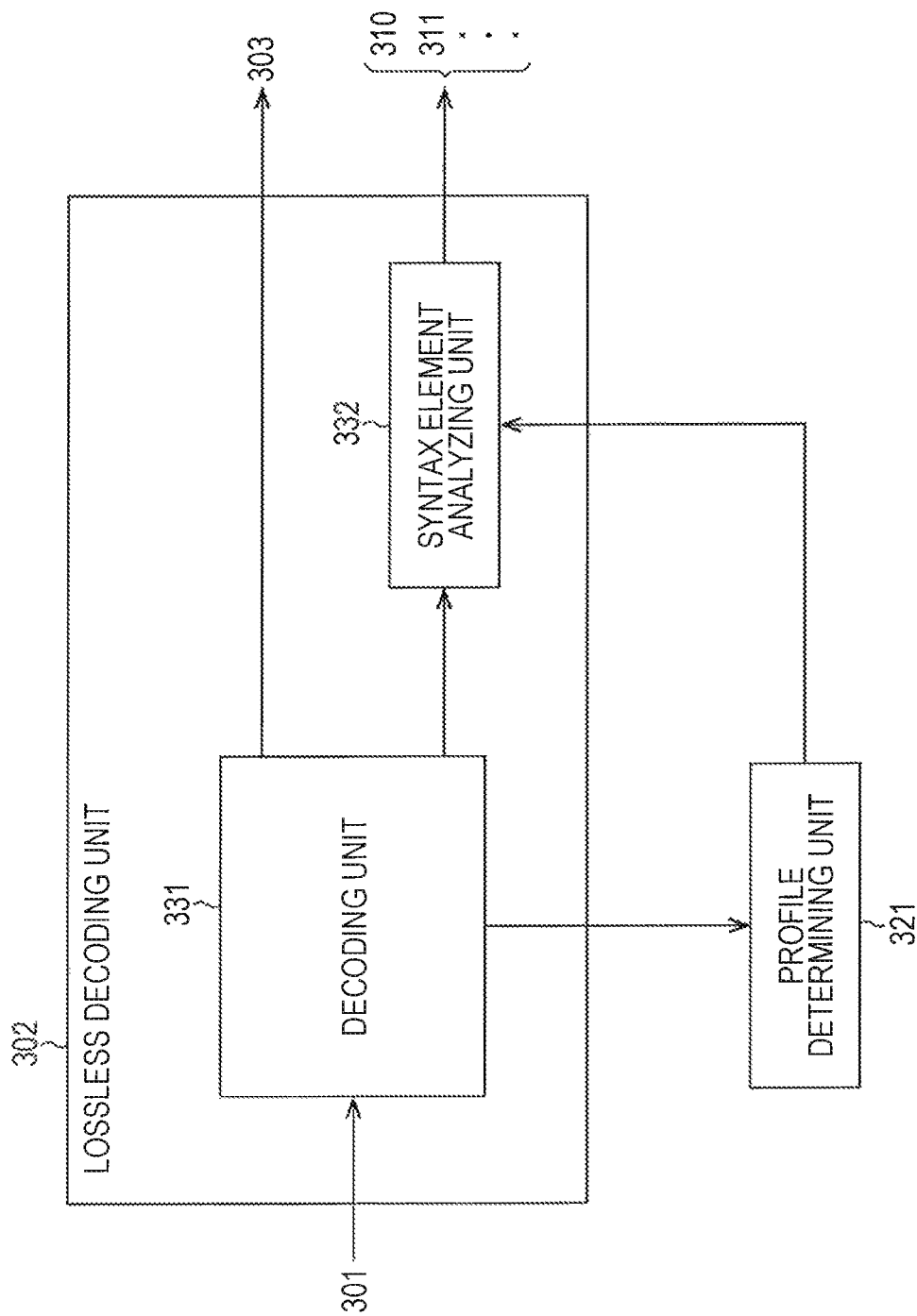
FIG. 35 is a block diagram illustrating an exemplary main configuration of a lossless decoding unit.

FIG. 35 is a block diagram illustrating an exemplary main configuration of the lossless decoding unit 302 of FIG. 34 that is related to syntax element analysis. As illustrated in FIG. 35, the lossless decoding unit 302 includes a decoding unit 331 and a syntax element analyzing unit 332.

The decoding unit 331 decodes the encoded data supplied from the accumulation buffer 301. The decoding unit 331 supplies, for example, information related to the profile which is obtained by decoding the encoded data to the profile determining unit 321.

The profile determining unit 321 determines the set profile as described above, and supplies information designating the profile to the syntax element analyzing unit 332.

Further, for example, the decoding unit 331 supplies the quantized orthogonal transform coefficients obtained by decoding the encoded data to the inverse quantization unit 303. Furthermore, for example, the decoding unit 331 supplies the syntax element obtained by decoding the encoded data to the syntax element analyzing unit 332.

The syntax element analyzing unit 332 analyzes various kinds of syntaxes supplied from the decoding unit 331 and controls the operations of the respective processing units of the image decoding device 300 such as the intra prediction unit 310 and the inter prediction unit 311 according to the analysis result.

The syntax element analyzing unit 332 analyzes the syntax element according to the determination result supplied from the profile determining unit 321. For example, when the still image profile (for example, the still picture profile) is determined to have been set, the syntax element analyzing unit 332 analyzes the syntax element related to the inter-image process in the state in which the value is restricted. A specific example of the method of restricting the value of the syntax element has been described above in <0. Overview>.

As a result, the syntax element analyzing unit 332 can omit the analysis of the unnecessary syntax element according to the set profile (it is possible to skip the syntax element). In other words, even when unnecessary information is included in encoded data of a decoding target, the image decoding device 300 can appropriately skip the unnecessary information according to the set profile and suppress an unnecessary load increase in the decoding process.

Further, the image decoding device 300 can decode both the encoded data of the still image and the encoded data of the moving image through a single circuit.

<Flow of Decoding Process>

Next, an exemplary flow of the decoding process performed by the image decoding device 300 will be described with reference to flowcharts of FIGS. 36 and 37.

When the decoding process starts, in step 3301, the lossless decoding unit 302 decodes the profile.

In step S302, the profile determining unit 321 determines whether or not the profile set in the encoded data is the still image profile based on the profile decoded in step 3301. When the moving image profile is determined to have been set, the process proceeds to step S303, and various kinds of processes (the processes of steps S303 to S313) of decoding the encoded data of the moving image are performed as follows.

In step S303, the syntax element analyzing unit 332 of the lossless decoding unit 302 analyzes the syntax element obtained from the encoded data and sets various kinds of parameters used for decoding.

In step S304, the accumulation buffer 301 accumulates transmitted bitstreams (encoded data). In step S305, the lossless decoding unit 302 decodes the bitstreams (encoded data) supplied from the accumulation buffer 301. In other words, for example, image data of an I picture, a P picture, and a B picture encoded by the lossless encoding unit 106 is decoded. At this time, various kinds of information other than the image data included in the bitstream such as the header information are decoded as well.

In step S306, the inverse quantization unit 303 inversely quantizes the quantized coefficients obtained by the process of step S305.

In step S307, the inverse orthogonal transform unit 304 performs inverse orthogonal transform on the coefficients inversely quantized in step S306.

In step 3308, the intra prediction unit 310 or the inter prediction unit 311 performs the prediction process, and generates the predicted image. In other words, the prediction process is performed in the prediction mode that is determined to have been applied at the time of encoding in the lossless decoding unit 302. More specifically, for example, when the intra prediction is applied at the time of encoding, the intra prediction unit 310 generates the predicted image in the intra prediction mode recognized to be optimal at the time of encoding. Further, for example, when the inter prediction is applied at the time of encoding, the inter prediction unit 311 generates the predicted image in the inter prediction mode recognized to be optimal at the time of encoding.

In step S309, the operation unit 305 adds the predicted image generated in step 3308 to the differential image obtained by the inverse orthogonal transform in step S307. Consequently, the image data of the reconstructed image is obtained.

In step S310, the loop filter 306 appropriately performs the loop filter process such as the deblocking filter process or the adaptive loop filter process on the image data of the reconstructed image obtained by the process of step S309.

In step S311, the screen rearrangement buffer 307 rearranges the frames of the reconstructed image that has been subjected to the filter process in step S310. In other words, the order of the frames rearranged at the time of encoding is rearranged in the original display order.

In step S312, the D/A converter 308 performs D/A conversion on the image in which the order of the frames has been rearranged in step S311. The image is output to a display (not illustrated) so that the image is displayed.

In step S313, the frame memory 309 stores the image that has been subjected to the filter process in step S310.

When the process of step S313 ends, the decoding process ends.

Figure 37:
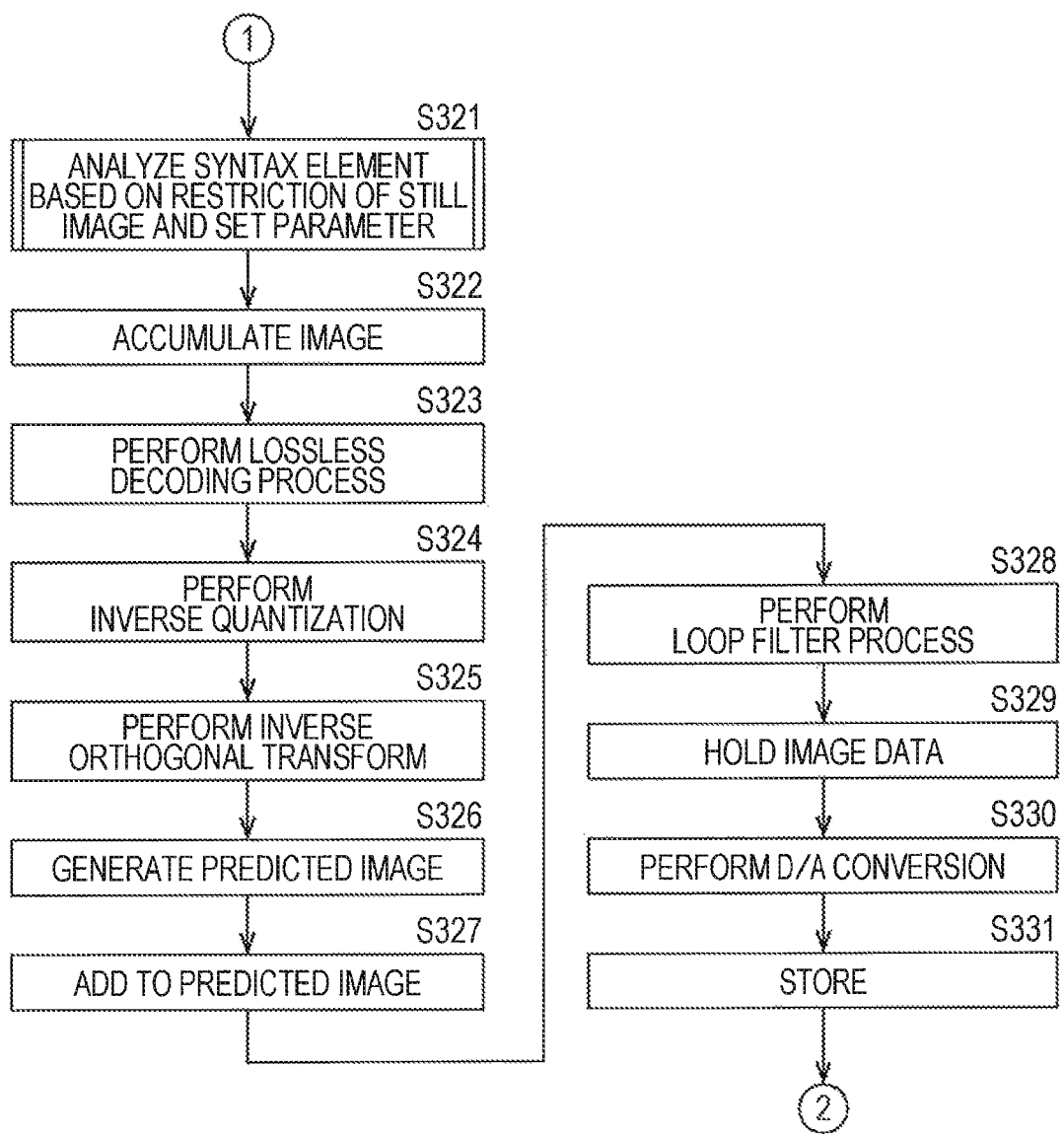
FIG. 37 is a flowchart for describing an exemplary flow of a decoding process, subsequently to FIG. 36.

Further, when the still image profile (the profile suitable for encoding of the image data of the still image) is determined to have been set in step S302, the process proceeds to step S321 of FIG. 37.

Figure 36:
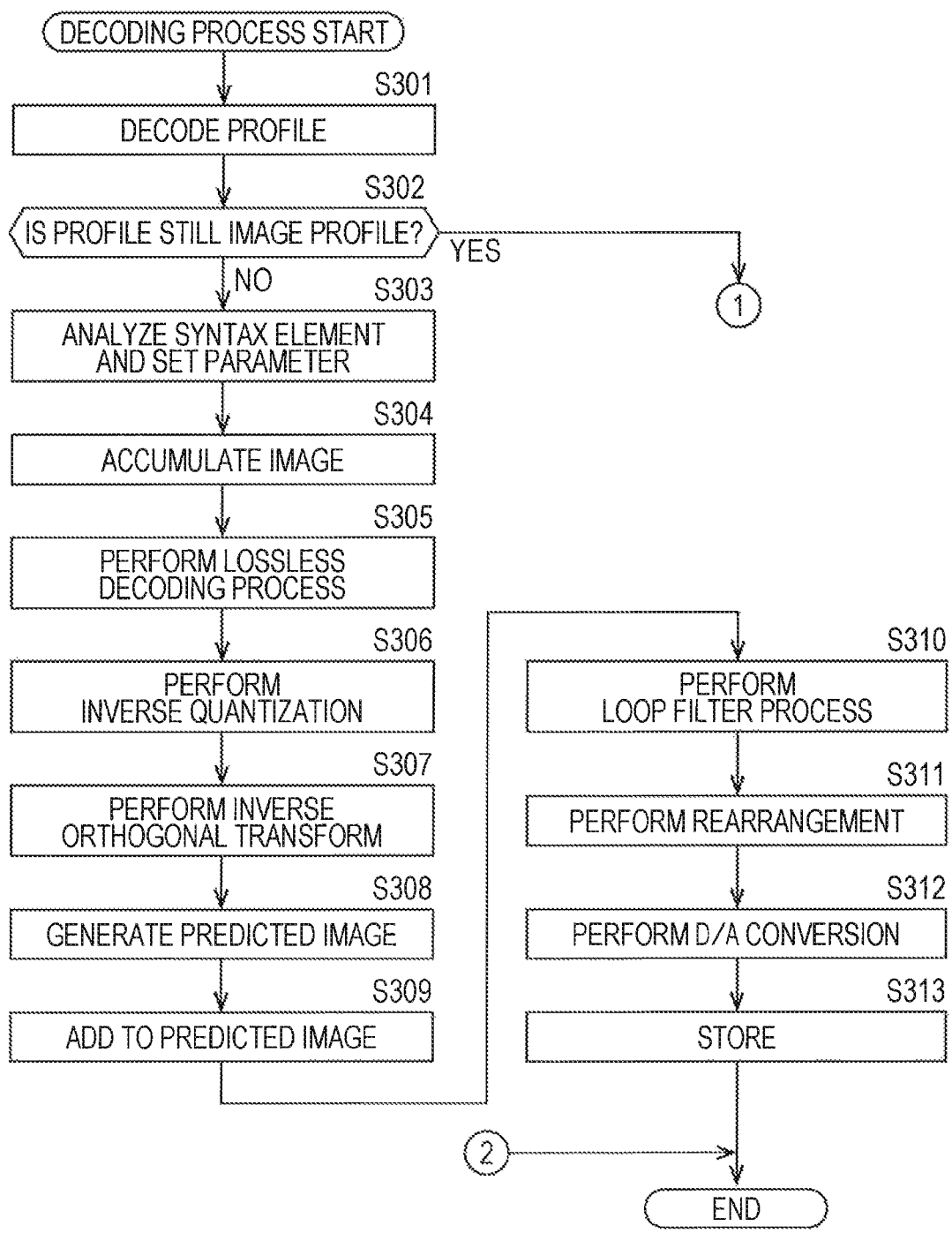
FIG. 36 is a flowchart for describing an exemplary flow of a decoding process.

In this case, in steps S321 to S331, the same process as the process performed on the input moving image in respective steps of FIG. 36 is performed on the image data of the input still image.

In other words, the processes of steps S321 to S331 of FIG. 37 correspond to the processes of steps S303 to S313 of FIG. 36.

Here, when the image data of the still image is encoded, since the image data has no concept of time (there is a single picture), in step S326, the predicted image is generated by the intra prediction.

Further, in the process of step S321, the syntax element is analyzed in the state in which the value of the syntax element related to the inter-image process is restricted. The details of this process will be described later.

When the process of step S331 ends, the decoding process ends.

<Flow of Syntax Element Analysis Process>

Next, an exemplary flow of the syntax element analysis process performed in step S321 of FIG. 37 will be described with reference to a flowchart of FIG. 38.

When the syntax element analysis process starts, in step S351, the syntax element analyzing unit 332 determines that the parameter vps_max_sub_layers_minus1 related to the sub layer of the video parameter set (VPS) and the parameter sps_max_sub_layers_minus1 related to the sub layer of the sequence parameter set (SPS) are 0.

In step S352, the syntax element analyzing unit 332 determines that the syntax element general_profile_idc of the profile tier level (profile_tier_level( )) is the value indicating the still picture profile.

In step S353, the syntax element analyzing unit 332 determines other syntax elements of the profile tier level (profile_tier_level( )).

In step S354, the syntax element analyzing unit 332 determines that the value of the syntax element vps_num_hrd_parameters related to the virtual reference decoder in the video parameter set (VPS) is 0.

In step S355, the syntax element analyzing unit 332 determines that the value of the syntax element restricted_ref_pic_lists_flag related to the P slice and the B slice in the sequence parameter set (SPS) is 0.

In step S356, the syntax element analyzing unit 332 determines that the value of the syntax element num_short_term_ref_pic_sets related to the short term in the sequence parameter set (SPS) is 0.

In step S357, the syntax element analyzing unit 332 determines that the value of the syntax element long_term_ref_pics_present_flag related to the long term in the sequence parameter set (SPS) is 0.

In step S358, the syntax element analyzing unit 332 determines that the value of the syntax element sps_temporal_mvp_enable_flag related to the motion vector in the sequence parameter set (SPS) is 0.

In step S359, the syntax element analyzing unit 332 determines that both the value of the syntax element num_ref_idx_10_default_active minus1 related to L0 and the value of the syntax element num_ref_idx_11_default_active minus1 related to L1 in the picture parameter set (PPS) are 0 or 1.

In step S360, the syntax element analyzing unit 332 determines that the value of the syntax element lists_modification_present_flag of the picture parameter set (PPS) indicating whether or not the syntax element ref_pic_list_modification is present in the current slice header is 0.

In step S361, the syntax element analyzing unit 332 determines that the value of the syntax element log 2_parallel_merge_level_minus2 of the picture parameter set (PPS) designating the parallel process level of the merge mode and the skip mode in the prediction process is 0.

In step S362, the syntax element analyzing unit 332 determines that the value of the syntax element scaling_list_pred_mode_flag related to the prediction mode of the scaling list (scaling_list_data ( )) is 0, and determines that the value of the syntax element scaling_list_pred_matrix_id_delta related to the prediction matrix of the scaling list (scaling_list_data ( )) is 0 or 1.

In step S363, the syntax element analyzing unit 332 determines that the value of the syntax element slice_type related to the slice type in the slice header (slice_header( )) is the value indicating the I slice.

In step S364, the syntax element analyzing unit 332 determines that the NAL unit type (nal_unit_type) for the VCL is IDR_W_LP or IDR_N_LP.

In step S365, the syntax element analyzing unit 332 determines other syntax elements. For example, in step S365, the syntax element analyzing unit 332 may determine that the value of the syntax element (flag) weighted_pred_flag related to the weighted prediction of the P slice or the syntax element (flag) weighted_bipred_flag related to the weighted prediction of the B slice in the picture parameter set (PPS) is 0. When the process of step S365 ends, the process returns to FIG. 37.

Of course, the processing order of the above-described respective steps is arbitrary, and the processing order of the respective steps may be changed, and processes of a plurality of steps may be performed in parallel. Particularly, as described above in <0-1> to <0-3>, the processing order of steps S351 to S353 is arbitrary.

Further, since the restrictions of the values of the syntax elements are independent of one another, the analysis need not be performed in the state in which all values of a group of syntax elements are restricted, and the analysis may be performed in a state in which only the values of some syntax elements are restricted. In other words, among the above-described steps in the syntax element analysis process of FIG. 38, only the processes of some steps may be performed.

Figure 38:
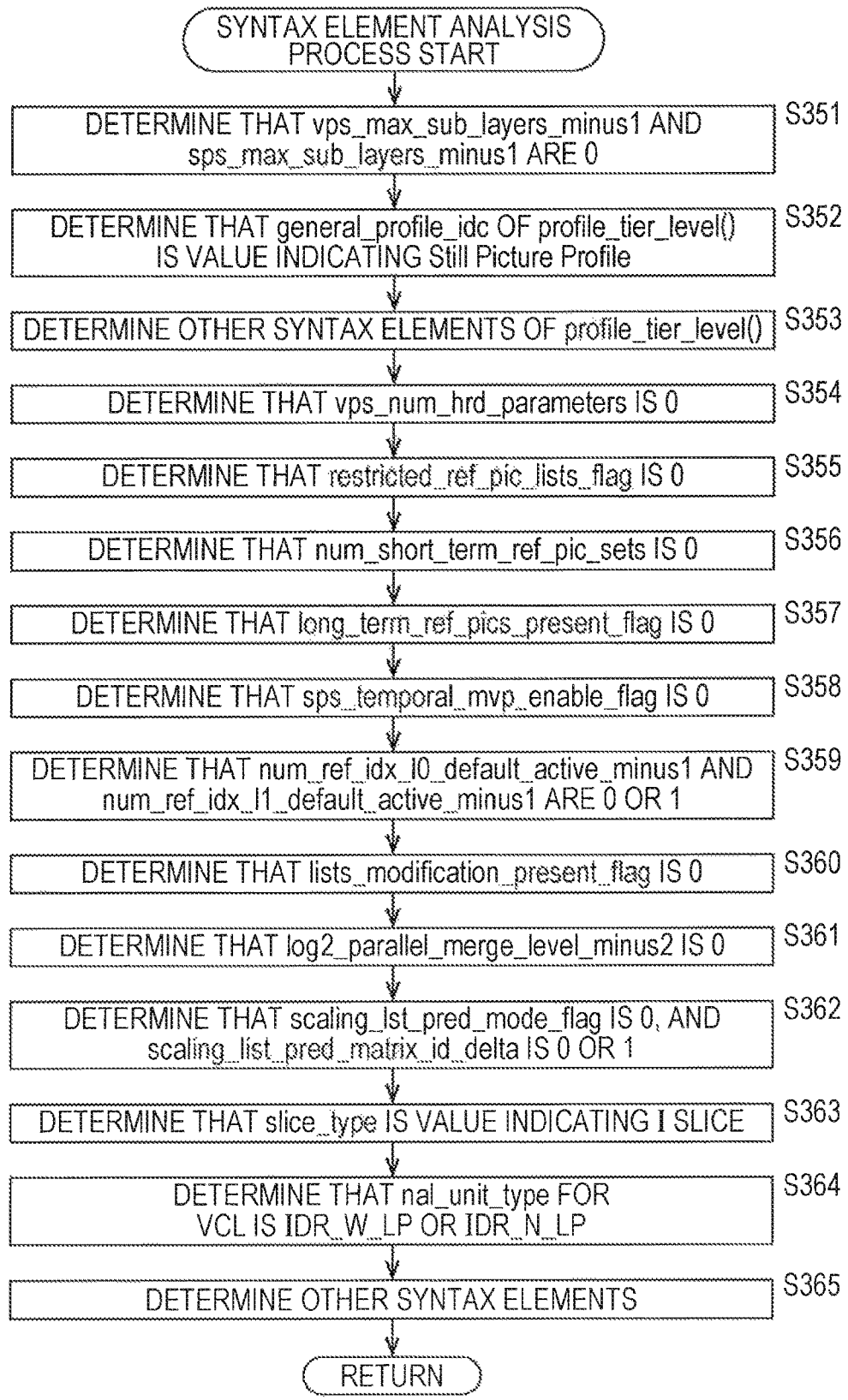
FIG. 38 is a flowchart for describing an exemplary flow of a syntax element analysis process.

Further, since the syntax elements whose value is restricted are not limited to the above-described examples, a process of performing the analysis in a state in which a value of a syntax element that is not mentioned above is restricted may be added in the syntax element analysis process of FIG. 38.

By performing the respective processes as described above, the image decoding device 300 can suppress an unnecessary load increase when the encoded data encoded based on the profile for encoding the still image is decoded.

4. Fourth Embodiment

Image Decoding Device

Further, the image decoding device may inspect whether or not the value of the syntax has been properly set for the profile set in the encoded data.

Figure 39:
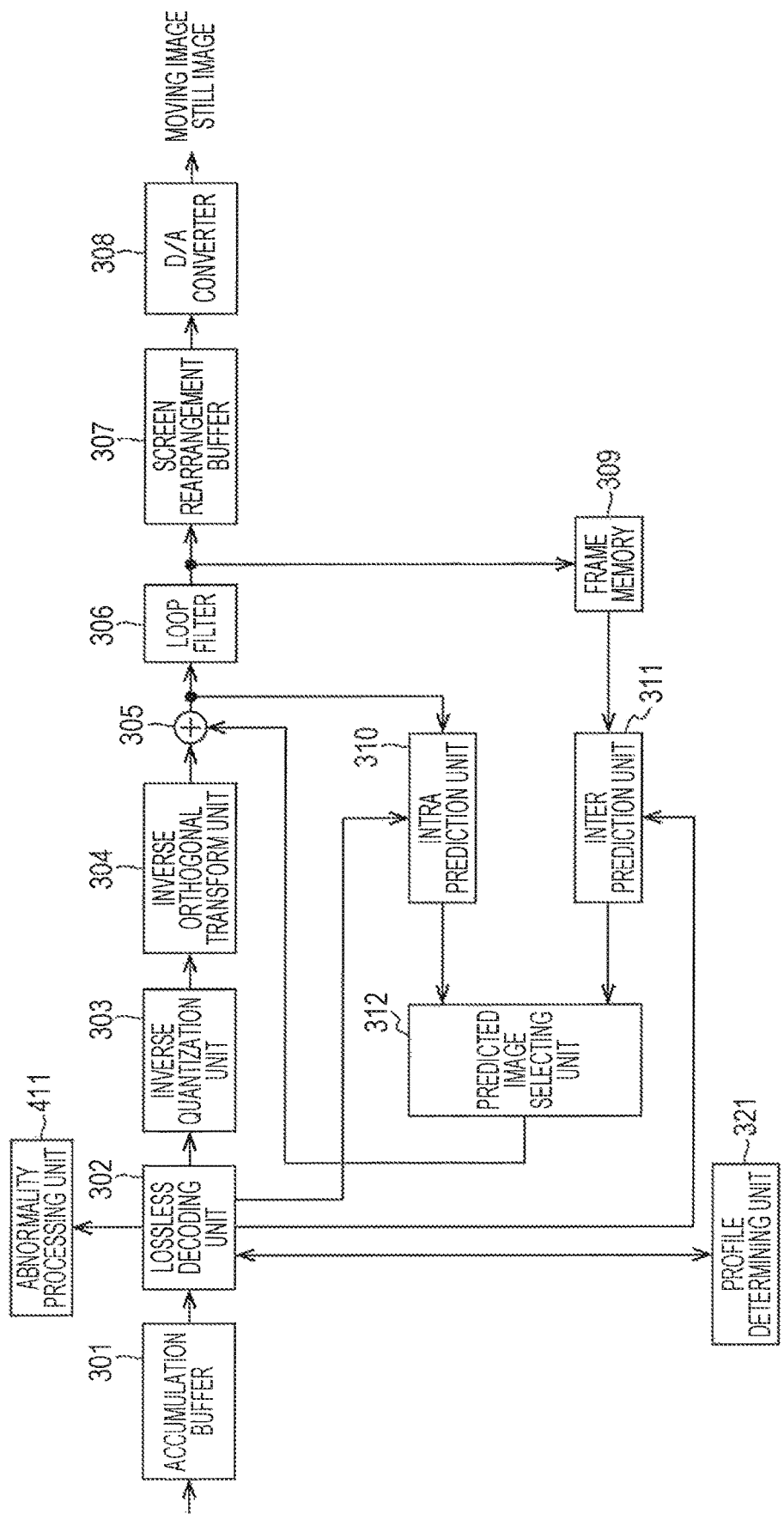
FIG. 39 is a block diagram illustrating another exemplary configuration of an image decoding device.

FIG. 39 is a block diagram illustrating an exemplary configuration of an image decoding device as an example of an image processing device to which the present technology is applied in this case. An image decoding device 400 illustrated in FIG. 39 is an image decoding device corresponding to the image coding device 100 or the image coding device 200, similarly to the image decoding device 300, and decodes encoded data in which image data of a moving image and a still image are encoded using the prediction process of the HEVC or a prediction process of a scheme based on the HEVC.

The image decoding device 400 has basically the same configuration as the image decoding device 300 and performs the same process. The image decoding device 400 includes an abnormality processing unit 411 in addition to the configuration of the image decoding device 300.

The lossless decoding unit 302 inspects whether or not the syntax element has been properly set for the profile determined by the profile determining unit 321. When an abnormality is detected by the inspection, that is, when a setting of a syntax element is improper, for example, when an unnecessary syntax element is set, a notification of the abnormality is given to the abnormality processing unit 411.

When the occurrence of abnormality is notified from the lossless decoding unit 302, the abnormality processing unit 411 performs a predetermined abnormality process. For example, the abnormality processing unit 411 causes a warning image to be displayed on a monitor or causes a warning sound to be output from a speaker or the like. The content of the abnormality process is arbitrary. For example, for the sake of safety, the abnormality processing unit 411 may control the respective components of the image decoding device 400 such that the decoding process is stopped or forcibly shut down.

<Lossless Decoding Unit>

Figure 40:
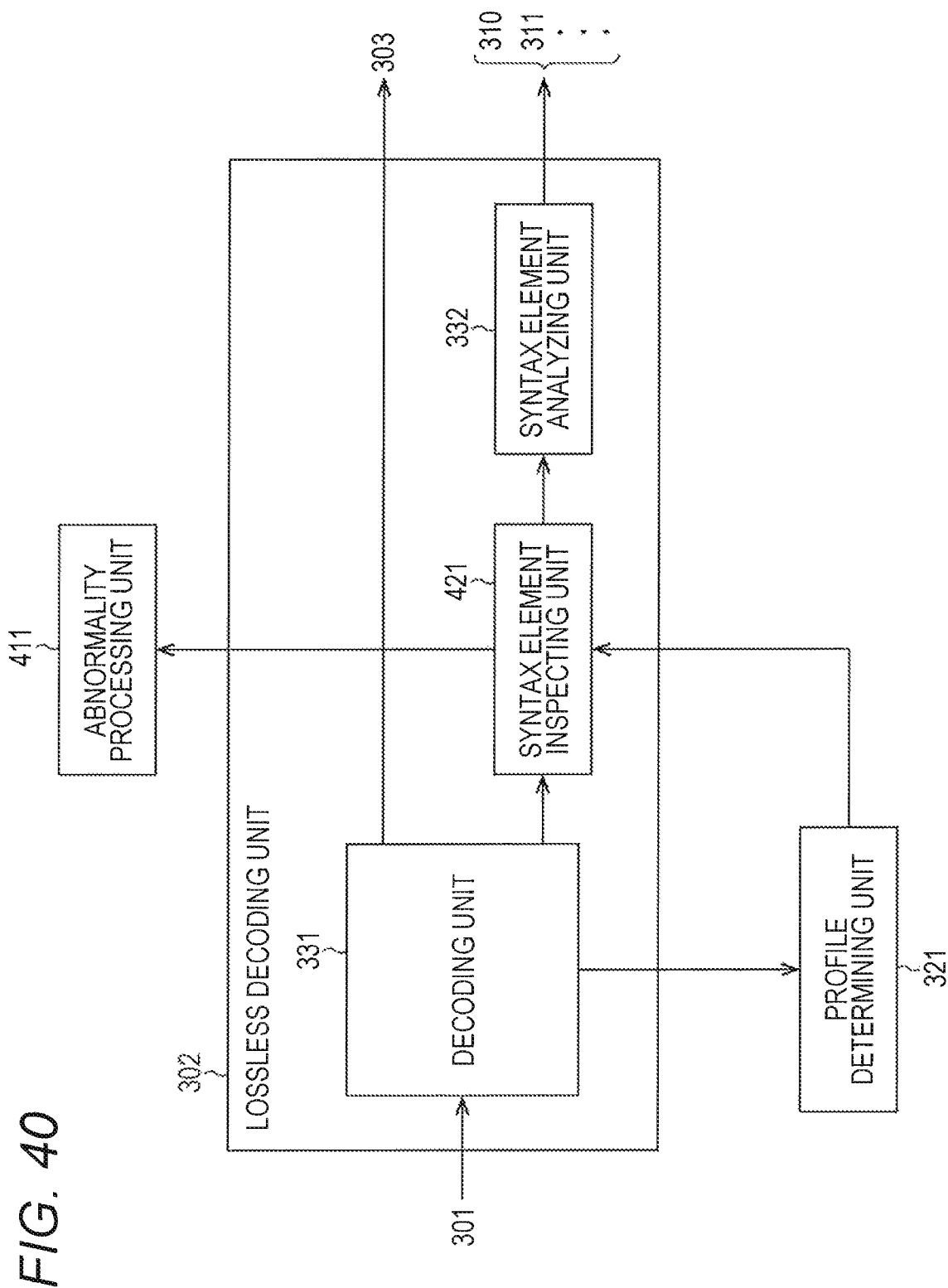
FIG. 40 is a block diagram illustrating another exemplary configuration of a lossless decoding unit.

FIG. 40 is a block diagram illustrating an exemplary main configuration of the lossless decoding unit 302 of FIG. 39 that is related to syntax element analysis. As illustrated in FIG. 40, in this case, the lossless decoding unit 302 includes a syntax element inspecting unit 421 in addition to the configuration of FIG. 35.

The profile determining unit 321 determines a set profile based on information supplied from the decoding unit 331 as described above, and supplies information designating the profile to the syntax element inspecting unit 421.

Further, the decoding unit 331 supplies the syntax elements obtained by decoding the encoded data to the syntax element inspecting unit 421.

The syntax element inspecting unit 421 inspects values of various kinds of syntax elements supplied from the decoding unit 331 according to the determination result supplied from the profile determining unit 321. When the syntax elements are normal, the syntax element inspecting unit 421 supplies the inspected syntax elements to the syntax element analyzing unit 332.

Further, when an abnormality is detected by the syntax element inspection, for example, when a wrong syntax element is set or when a wrong value is set to a syntax element, the syntax element inspecting unit 421 notifies the abnormality processing unit 411 of the detection of the abnormality.

The abnormality processing unit 411 performs the abnormality process according to the notification as described above.

As a result, the image decoding device 400 can detect whether or not the setting of the syntax element is proper and perform the decoding process more safely. Further, the image decoding device 400 can use the detection result for inspection and analysis of the encoded data. In other words, it is possible to encourage, for example, re-creation of encoded data as necessary using the image decoding device 400 as an encoded data analyzer.

Further, the image decoding device 400 can decode both the encoded data of the still image and the encoded data of the moving image through a single circuit.

<Flow of Coding Process>

Next, an exemplary flow of the decoding process performed by the image decoding device 400 in this case will be described with reference to flowcharts of FIGS. 41 and 42.

Figure 41:
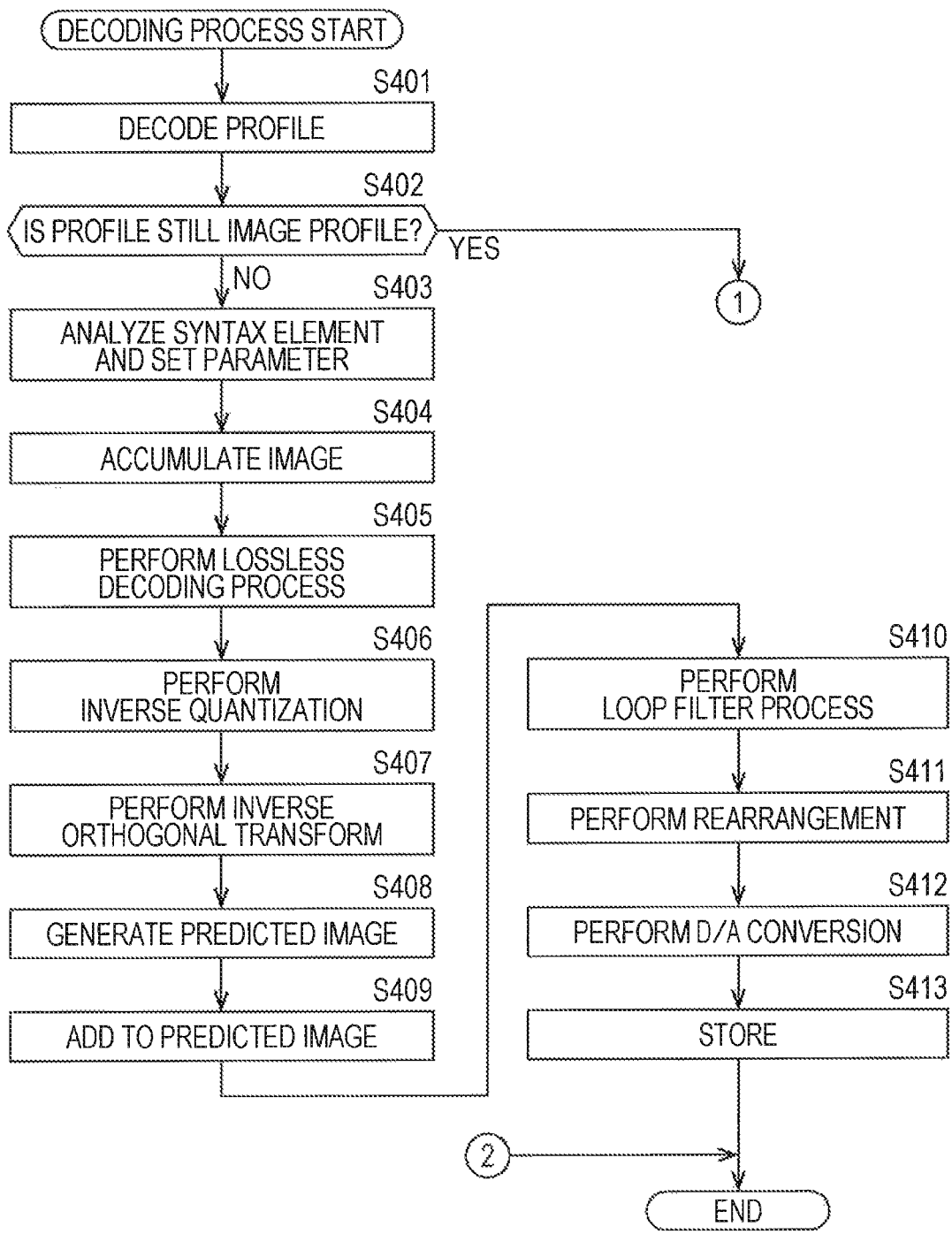
FIG. 41 is a flowchart for describing another exemplary flow of a decoding process.

When the decoding process starts, the image decoding device 400 performs the same process as in steps S301 to S313 of FIG. 36 in steps S401 to 3413 of FIG. 41. When the process of step S413 ends, the decoding process ends.

Figure 42:
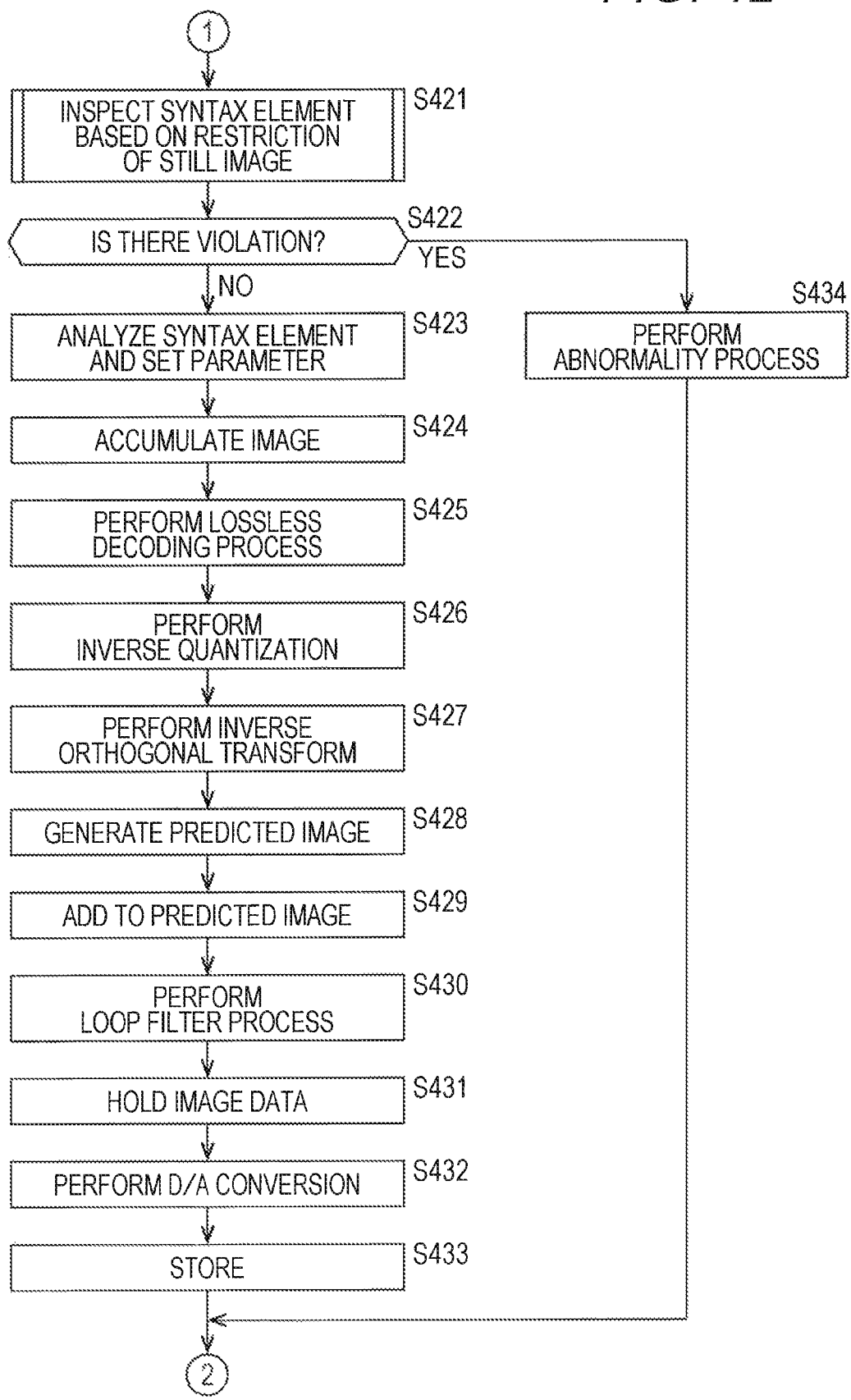
FIG. 42 is a flowchart for describing another exemplary flow of a decoding process, subsequently to FIG. 41.

Further, when the still image profile is determined to have been set in step S402, the process proceeds to step S421 of FIG. 42.

In step S421 of FIG. 42, the syntax element inspecting unit 421 of the lossless decoding unit 302 inspects the syntax elements based on the restriction made by the still image profile.

In step S422, the syntax element inspecting unit 421 determines whether or not there is a violation in the syntax element based on the inspection result of step S421. When it is determined that there is no violation, the process proceeds to step S423.

In steps S423 to S433 of FIG. 42, the same process as in steps S321 to S331 of FIG. 37 is performed. When the process of step S433 ends, the decoding process ends.

Further, when it is determined in step S422 of FIG. 42 that there is a violation, the process proceeds to step S434.

In step S434, the abnormality processing unit 411 performs the abnormality process. When the process of step S434 ends, the decoding process ends.

<Flow of Syntax Element Analysis Process>

Next, an exemplary flow of the syntax element inspection process performed in step S421 of FIG. 42 will be described with reference to a flowchart of FIG. 43.

When the syntax element inspection process starts, in step S451, the syntax element inspecting unit 421 determines whether or not the parameter vps_max_sub_layers_minus1 related to the sub layer of the video parameter set (VPS) and the parameter sps_max_sub_layers_minus1 related to the sub layer of the sequence parameter set (SPS) are 0. When the determination result is true, that is, when the parameter vps_max_sub_layers_minus1 related to the sub layer of the video parameter set (VPS) and the parameter sps_max_sub_layers_minus1 related to the sub layer of the sequence parameter set (SPS) are determined to be 0, the process proceeds to step S452.

In step S452, the syntax element inspecting unit 421 determines whether or not the syntax element general_profile_idc of the profile tier level (profile_tier_level( )) has the value indicating the still picture profile. When the determination result is true, that is, when the syntax element general_profile_idc of the profile tier level (profile_tier_level( )) is determined to have the value indicating the still picture profile, the process proceeds to step S453.

In step S453, the syntax element inspecting unit 421 determines whether or not the value of the syntax element vps_num_hrd_parameters related to the virtual reference decoder in the video parameter set (VPS) is 0. When the determination result is true, that is, when the value of the syntax element vps_num_hrd_parameters related to the virtual reference decoder in the video parameter set (VPS) is determined to be 0, the process proceeds to step S454.

In step S454, the syntax element inspecting unit 421 determines whether or not the value of the syntax element restricted_ref_pic_lists_flag related to the P slice and the B slice in the sequence parameter set (SPS) is 0. When the determination result is true, that is, when the value of the syntax element restricted_ref_pic_lists_flag related to the P slice and the B slice in the sequence parameter set (SPS) is determined to be 0, the process proceeds to step S455.

In step S455, the syntax element inspecting unit 421 determines whether or not the value of the syntax element num_short_term_ref_pic_sets related to the short term in the sequence parameter set (SPS) is 0. When the determination result is true, that is, when the value of the syntax element num_short_term_ref_pic_sets related to the short term in the sequence parameter set (SPS) is determined to be 0, the process proceeds to step S456.

In step S456, the syntax element inspecting unit 421 determines whether or not the value of the syntax element long_term_ref_pics_present_flag related to the long term in the sequence parameter set (SPS) is 0. When the determination result is true, that is, when the value of the syntax element long_term_ref_pics_present_flag related to the long term in the sequence parameter set (SPS) is determined to be 0, the process proceeds to step S457.

In step S457, the syntax element inspecting unit 421 determines whether or not the value of the syntax element sps_temporal_mvp_enable_flag related to the motion vector in the sequence parameter set (SPS) is 0. When the determination result is true, that is, when the value of the syntax element sps_temporal_mvp_enable_flag related to the motion vector in the sequence parameter set (SPS) is determined to be 0, the process proceeds to step S458.

In step S458, the syntax element inspecting unit 421 determines whether or not both the value of the syntax element num_ref_idx_l0_default_active minus1 related to L0 and the value of the syntax element num_ref_idx_l1_default_active minus1 related to L1 in the picture parameter set (PPS) are 0 or 1. When the determination result is true, that is, when both the value of the syntax element num_ref_idx_l0 default_active minus1 related to L0 and the value of the syntax element num_ref_idx_l1_default_active minus1 related to L1 in the picture parameter set (PPS) are determined to be 0 or 1, the process proceeds to step S459.

In step S459, the syntax element inspecting unit 421 determines whether or not the value of the syntax element lists_modification_present_flag of the picture parameter set (PPS) indicating whether or not the syntax element ref_pic_list_modification is present in the current slice header is 0. When the determination result is true, that is, when the value of the syntax element lists_modification_present_flag of the picture parameter set (PPS) indicating whether or not the syntax element ref_pic_list_modification is present in the current slice header is determined to be 0, the process proceeds to step S460.

In step S460, the syntax element inspecting unit 421 determines whether or not the value of the syntax element log 2_parallel_merge_level_minus2 of the picture parameter set (PPS) designating the parallel process level of the merge mode and the skip mode in the prediction process is 0. When the determination result is true, that is, when the value of the syntax element log 2_parallel_merge_level_minus2 of the picture parameter set (PPS) designating the parallel process level of the merge mode and the skip mode in the prediction process is determined to be 0, the process proceeds to step S461.

In step S461, the syntax element inspecting unit 421 determines whether or not the value of the syntax element scaling_list_pred_mode_flag related to the prediction mode of the scaling list (scaling_list_data ( )) is 0 and whether or not the value of the syntax element scaling_list_pred_matrix_id_delta related to the prediction matrix of the scaling list (scaling_list_data ( )) is 0 or 1. When the determination result is true, that is, when the value of the syntax element scaling_list_pred_mode_flag related to the prediction mode of the scaling list (scaling_list_data ( )) is determined to be 0, and the value of the syntax element scaling_list_pred_matrix_id_delta related to the prediction matrix of the scaling list (scaling_list_data ( )) is determined to be 0 or 1, the process proceeds to step S462.

In step S462, the syntax element inspecting unit 421 determines whether or not the value of the syntax element slice_type related to the slice type in the slice header (slice_header( )) is the value indicating the I slice. When the determination result is true, that is, when the value of the syntax element slice_type related to the slice type in the slice header (slice_header( )) is determined to be the value indicating the I slice, the process proceeds to step S463.

In step S463, the syntax element inspecting unit 421 determines whether or not the NAL unit type (nal_unit_type) for the VCLJ is IDR_W_LP or IDR_N_LP. When the determination result is true, that is, when the NAL unit type (nal_unit_type) for the VCL is determined to be IDR_W_LP or IDR_N_LP, the process proceeds to step S464.

In step S464, the syntax element inspecting unit 421 determines that the syntax element is normal. When the process of step S464 ends, the syntax element inspection process ends, and the process returns to FIG. 42.

Figure 43:
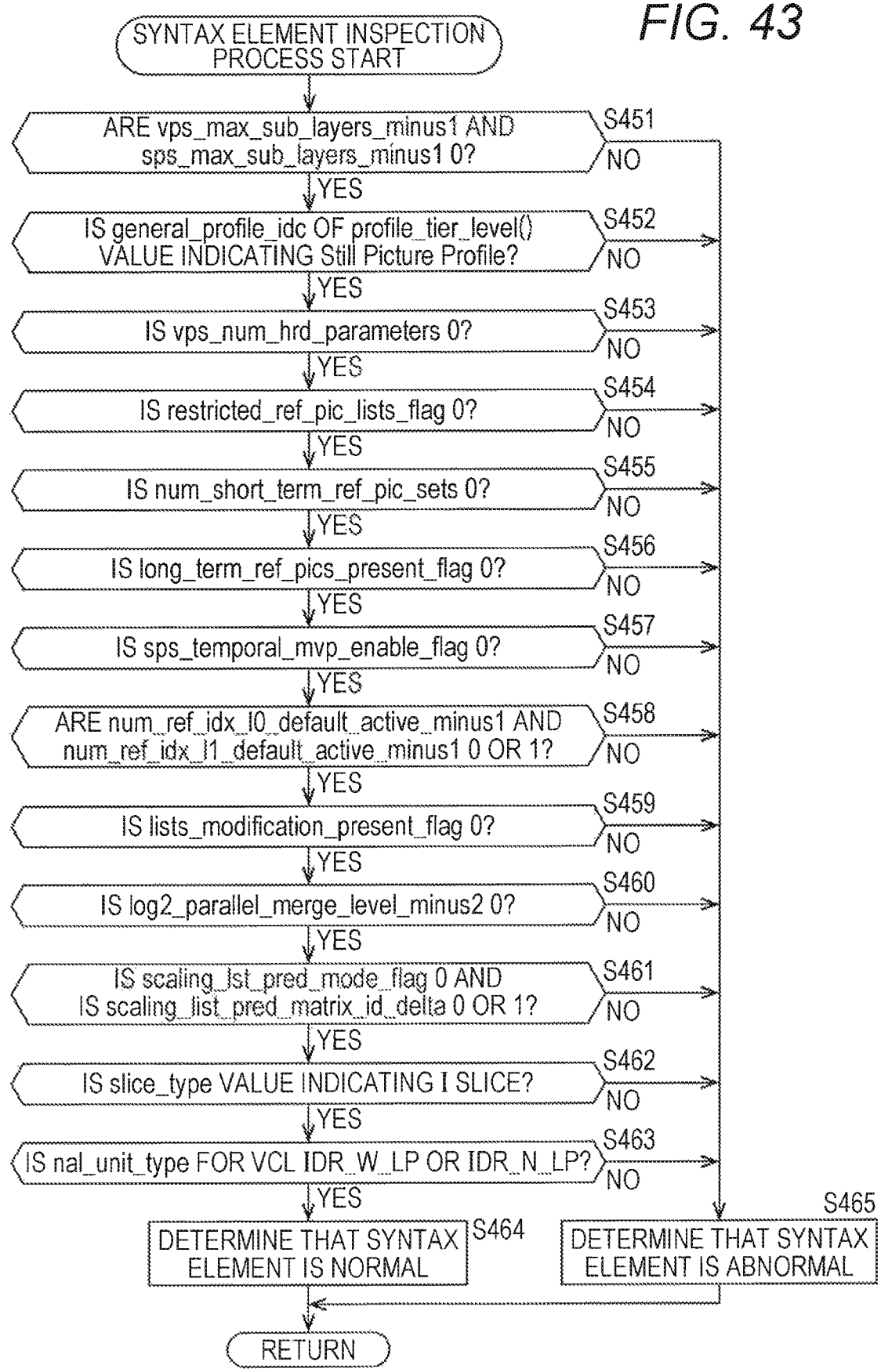
FIG. 43 is a flowchart for describing an exemplary flow of a syntax element inspection process.

Further, when the determination result is determined to be false in any of steps S451 to S463 of FIG. 43, the process proceeds to step S465.

In step S465, the syntax element inspecting unit 421 determines that the syntax element is abnormal. When the process of step S465 ends, the syntax element inspection process ends, and the process returns to FIG. 42.

Of course, the processing order of the above-described respective steps is arbitrary, and the processing order of the respective steps may be changed, and processes of a plurality of steps may be performed in parallel.

Further, since the conditions (the restrictions of the values of the syntax elements) of the respective inspections are independent of one another, all of a group of syntax elements described above need not be inspected, and only some syntax elements may be inspected. In other words, among the above-described steps in the syntax element inspection process of FIG. 43, only the processes of some steps may be performed.

In addition, an inspection of a syntax element that is not included in the above example may be added.

By performing the respective processes as described above, the image decoding device 400 can detect whether or not the setting of the syntax element is proper and perform the decoding process more safely.

As described above, the present technology can be applied to all image coding devices and image decoding devices that encode and decode images.

For example, the present technology can be applied to an image coding device and an image decoding device used when image information (bitstream) compressed by orthogonal transform such as discrete cosine transform and motion compensation as in MPEG and H.26x is received via a network medium such as satellite broadcasting, a cable television, the Internet, or a mobile telephone. Further, the present technology can be applied to an image coding device and an image decoding device used when processing is performed on a storage medium such as an optical disk, a magnetic disk, or a flash memory. Furthermore, the present technology can be applied even to an intra prediction device included in the image coding device, the image decoding device, or the like.

5. Fifth Embodiment

Application to Multi-View Image Coding and Multi-View Image Decoding

Figure 44:
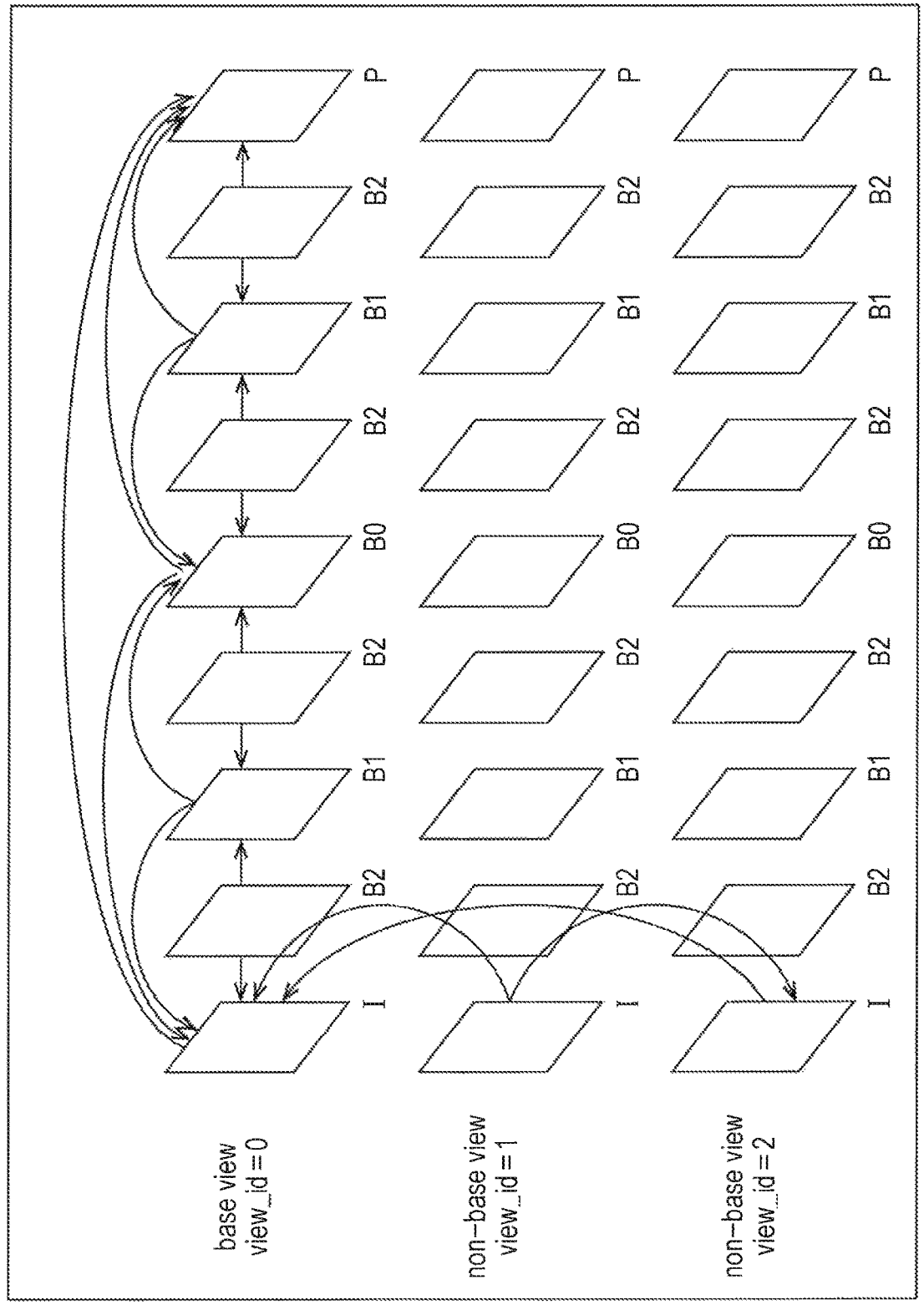
FIG. 44 is a diagram illustrating an exemplary multi-view image coding scheme.

A series of processes described above can be applied to multi-view image coding and multi-view image decoding. FIG. 44 illustrates an exemplary multi-view image coding scheme.

As illustrated in FIG. 44, a multi-view image includes images of a plurality of views. A plurality of views of the multi-view image includes a base view in which encoding and decoding are performed using an image of its own view without using an image of another view and a non-base view in which encoding and decoding are performed using an image of another view. As a non-base view, an image of a base view may be used, and an image of another non-base view may be used.

When the multi-view image of FIG. 44 is encoded or decoded, an image of each view is encoded or decoded, but the methods according to the first to fourth embodiments may be applied to encoding or decoding of each view. As a result, it is possible to suppress a reduction in coding efficiency of each view.

Further, the flags or the parameters used in the methods according to the first to fourth embodiments may be shared in encoding and decoding of each view. As a result, it is possible to suppress transmission of redundant information and reduce an amount of information to be transmitted (a coding amount) (that is, it is possible to suppress a reduction in coding efficiency).

More specifically, for example, the syntax elements of the sequence parameter set, the profile tier level, the picture parameter set, and the slice header may be shared in encoding and decoding of each view.

Of course, any other necessary information may be also shared in encoding and decoding of each view.

<Multi-View Image Coding Device>

Figure 45:
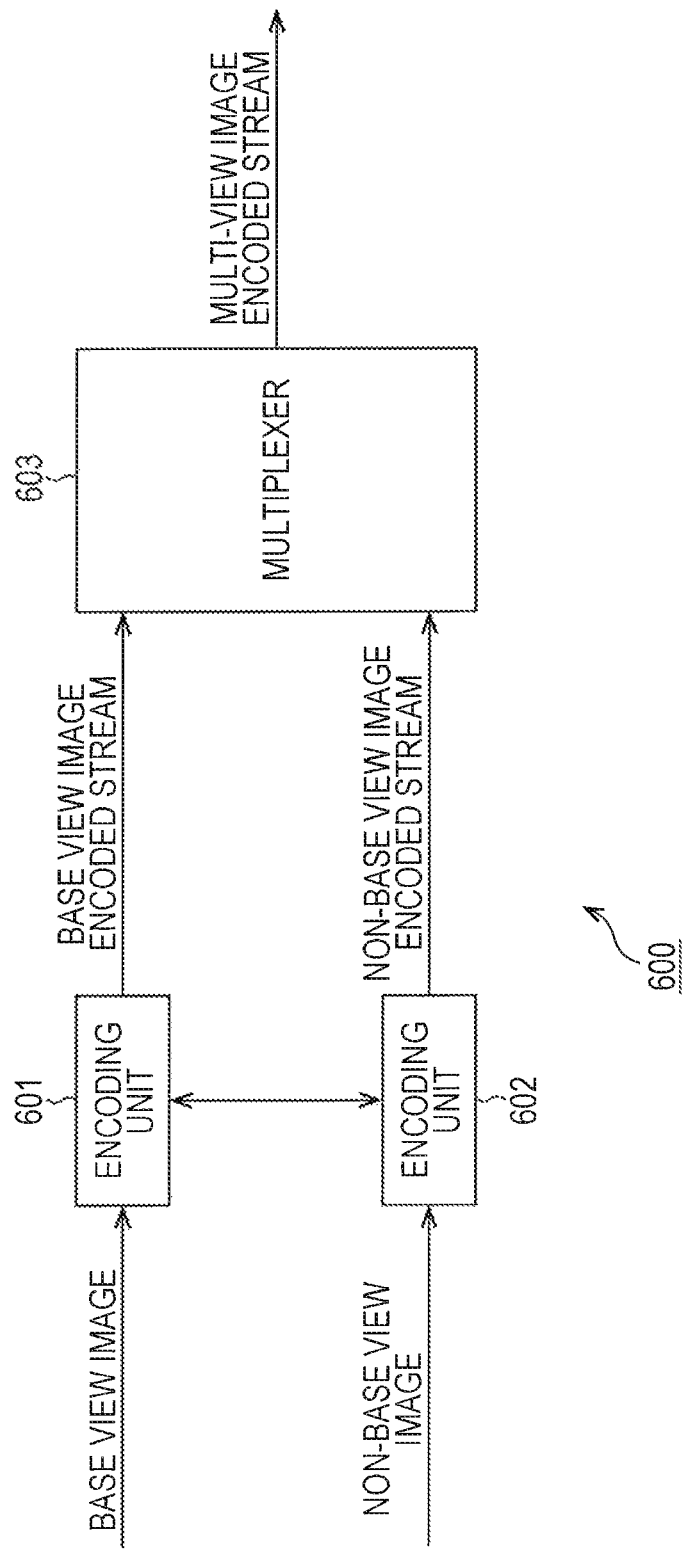
FIG. 45 is a diagram illustrating an exemplary main configuration of a multi-view image coding device to which the present technology is applied.

FIG. 45 is a diagram illustrating a multi-view image coding device that performs the multi-view image coding. As illustrated in FIG. 45, a multi-view image coding device 600 includes an encoding unit 601, an encoding unit 602, and a multiplexer 603.

The encoding unit 601 encodes a base view image, and generates an encoded base view image stream. The encoding unit 602 encodes a non-base view image, and generates an encoded non-base view image stream. The multiplexer 603 multiplexes the encoded base view image stream generated in the encoding unit 601 and the encoded non-base view image stream generated in the encoding unit 602, and generates an encoded multi-view image stream.

The image coding device 100 (FIG. 25) or the image coding device 200 (FIG. 31) can be applied to the encoding unit 601 and the encoding unit 602 of the multi-view image coding device 600. In other words, when the coding process is performed based on the profile for encoding the still image in encoding of each view, it is possible to restrict the value of the syntax element related to the inter-image process, and it is possible to suppress a reduction in coding efficiency of each view. Further, the encoding unit 601 and the encoding unit 602 can perform encoding using the same flag or the same parameter (for example, the syntax element related to the inter-image process or the like) (that is, can share the flag or the parameter), and thus it is possible to suppress a reduction in coding efficiency.

<Multi-View Image Decoding Device>

Figure 46:
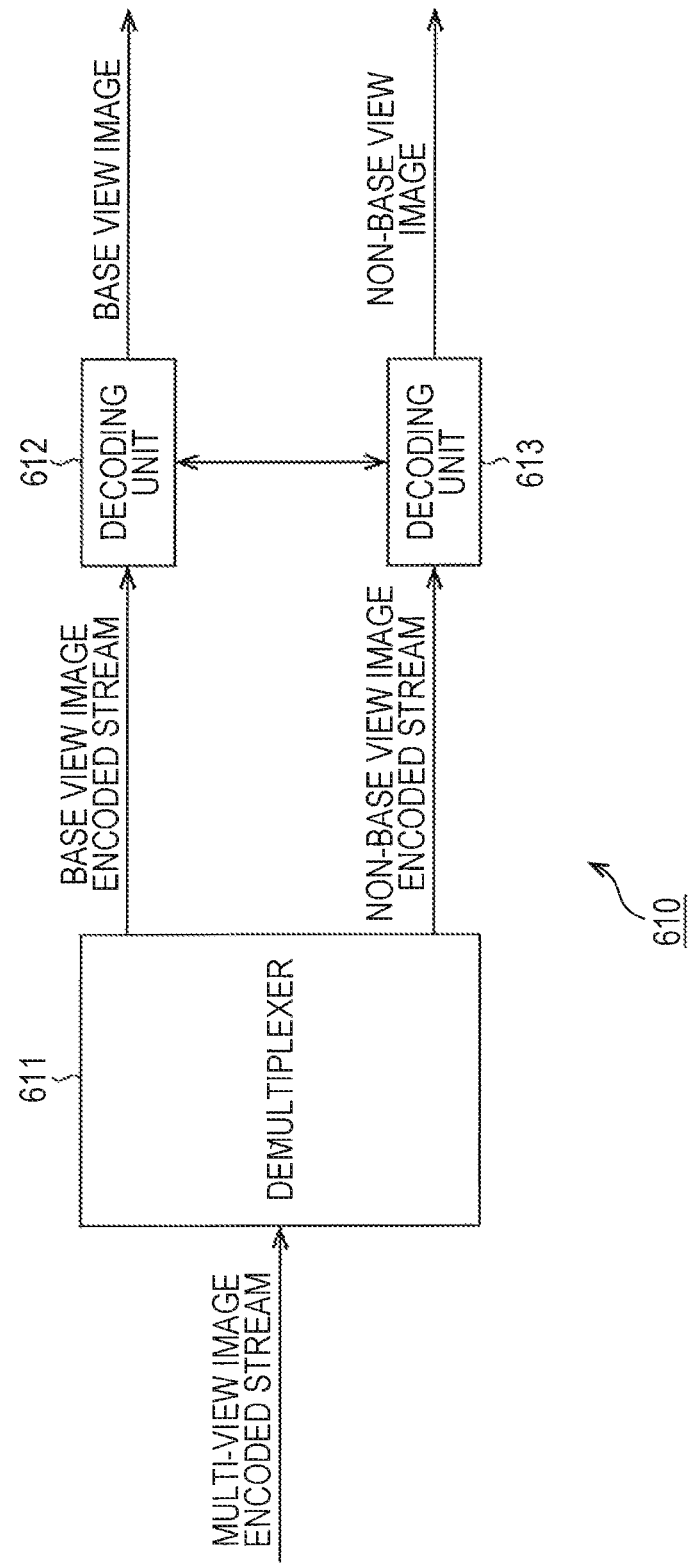
FIG. 46 is a diagram illustrating an exemplary main configuration of a multi-view image decoding device to which the present technology is applied.

FIG. 46 is a diagram illustrating a multi-view image decoding device that decodes the multi-view image. As illustrated in FIG. 46, a multi-view image decoding device 610 includes a demultiplexer 611, a decoding unit 612, and a decoding unit 613.

The demultiplexer 611 demultiplexes the encoded multi-view image stream obtained by multiplexing the encoded base view image stream and the encoded non-base view image stream, and extracts the encoded base view image stream and the encoded non-base view image stream. The decoding unit 612 decodes the encoded base view image stream extracted by the demultiplexer 611, and obtains the base view image. The decoding unit 613 decodes the encoded non-base view image stream extracted by the demultiplexer 611, and obtains the non-base view image.

The image decoding device 300 (FIG. 34) or the image decoding device 400 (FIG. 39) can be applied to the decoding unit 612 and the decoding unit 613 of the multi-view image decoding device 610. In other words, when the coding process is performed based on the profile for encoding the still image in encoding of each view, the received syntax element related to the inter-image process can be analyzed in the state in which the value is restricted. Further, the decoding unit 612 and the decoding unit 613 can perform decoding using the same flag or the same parameter (for example, the syntax element related to the inter-image process or the like) (that is, can share the flag or the parameter), and thus it is possible to suppress a reduction in coding efficiency.

6. Sixth Embodiment

Application to Scalable Image Coding and Scalable Image Decoding

Figure 47:
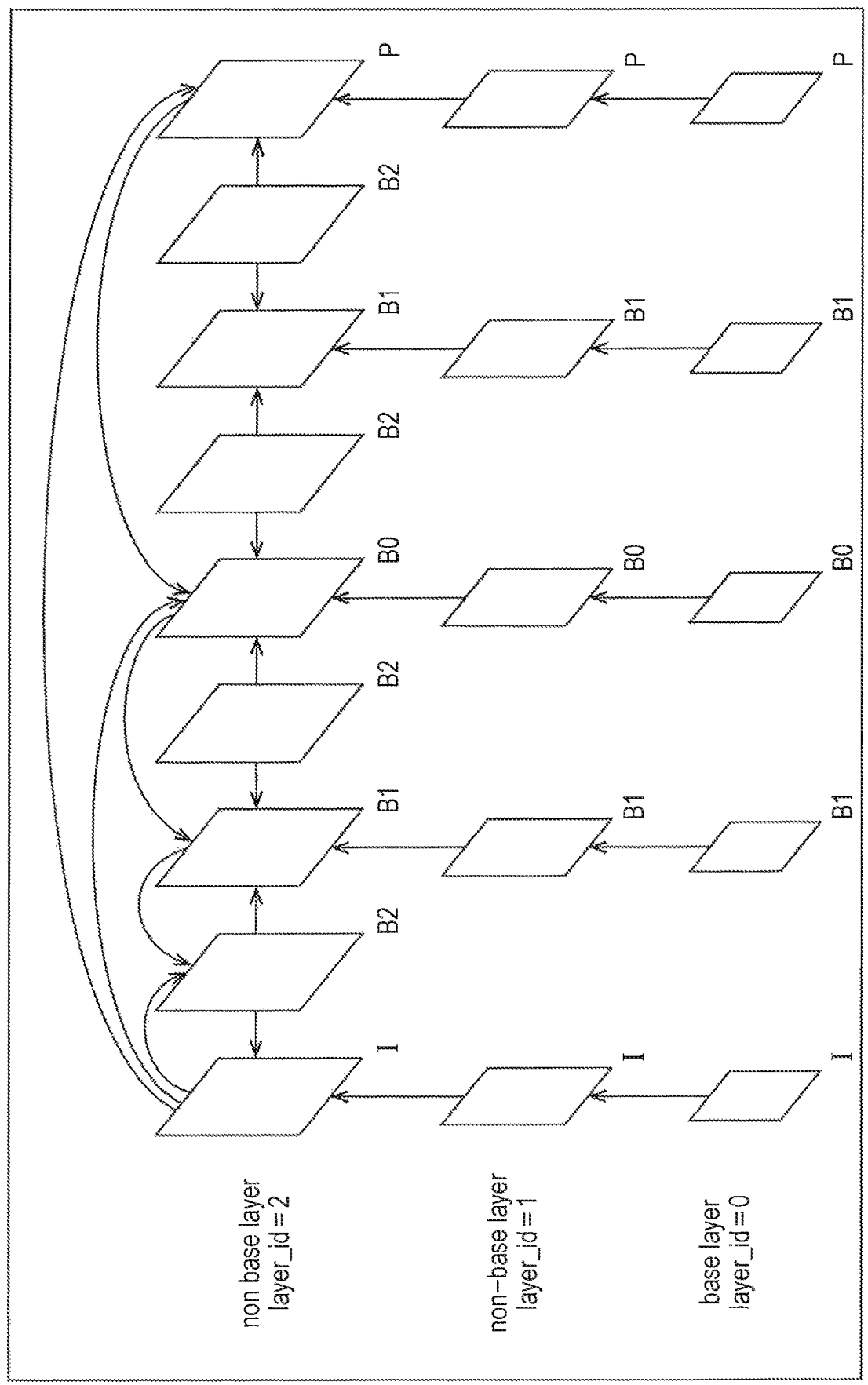
FIG. 47 is a diagram illustrating an exemplary scalable image coding scheme.

A series of processes described above can be applied to scalable image coding and scalable image decoding (scalable coding and scalable decoding). FIG. 47 illustrates an exemplary scalable image coding scheme.

In the scalable image coding (scalable coding), an image is divided (hierarchized) into a plurality of layers so that a predetermined parameter has a scalability function, and image data is encoded for each layer. Scalable image decoding (scalable decoding) is decoding corresponding to the scalable image coding.

As illustrated in FIG. 47, in hierarchization of image, one image is divided into a plurality of images (layers) based on a predetermined parameter having a scalability function. In other words, hierarchized images (scalable images) include images of a plurality of layers that differ in the value of the predetermined parameter from one another. The plurality of layers of the scalable images include a base layer in which encoding and decoding are performed using only an image of its own layer without using an image of another layer and a non-base layer (which is also referred to as an "enhancement layer") in which encoding and decoding are performed using an image of another layer. As the non-base layer, an image of the base layer may be used, and an image of any other non-base layer may be used.

Generally, the non-base layer is configured with data (differential data) of a differential image between its own image and an image of another layer so that the redundancy is reduced. For example, when one image is hierarchized into two layers, that is, a base layer and a non-base layer (which is also referred to as an "enhancement layer"), an image of a quality lower than an original image is obtained when only data of the base layer is used, and an original image (that is, a high quality image) is obtained when both data of the base layer and data of the non-base layer are combined.

As an image is hierarchized as described above, images of various qualities can be obtained depending on the situation. For example, for a terminal having a low processing capability such as a mobile telephone, image compression information of only the base layer is transmitted, and a moving image of low spatial and temporal resolutions or a low quality is reproduced, and for a terminal having a high processing capability such as a television or a personal computer, image compression information of the enhancement layer as well as the base layer is transmitted, and a moving image of high spatial and temporal resolutions or a high quality is reproduced. In other words, without performing the transcoding process, image compression information according to a capability of a terminal or a network can be transmitted from a server.

When a scalable image is encoded or decoded as in the example of FIG. 47, an image of each layer is encoded or decoded, but the methods according to the first to fourth embodiments may be applied to encoding or decoding of each layer. As a result, it is possible to suppress a reduction in coding efficiency of each layer.

Further, in encoding and decoding of each layer, the flag or the parameter used in the methods according to the first to fourth embodiments may be shared. As a result, it is possible to suppress transmission of redundant information and reduce an amount of information to be transmitted (a coding amount) (that is, it is possible to suppress a reduction in coding efficiency).

More specifically, for example, the syntax element of the sequence parameter set, the profile tier level, the picture parameter set, and the slice header may be shared in encoding and decoding of each layer.

Of course, any other necessary information may be also shared in encoding and decoding of each layer.

<Scalable Parameter>

Figure 48:
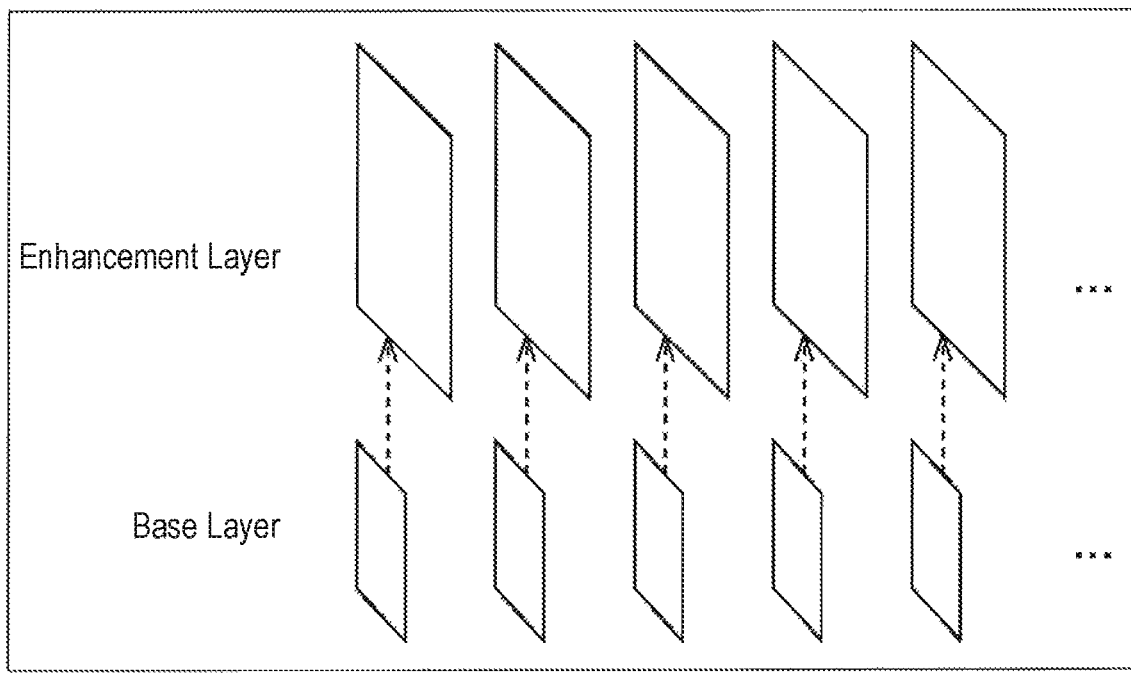
FIG. 48 is a diagram for describing an exemplary spatial scalable coding.

In the scalable image coding and the scalable image decoding (the scalable coding and the scalable decoding), a parameter having a scalability function is arbitrary. For example, a spatial resolution illustrated in FIG. 48 may be used as the parameter (spatial scalability). In the case of the spatial scalability, respective layers have different resolutions. In other words, each picture is hierarchized into two layers, that is, a base layer of a resolution spatially lower than that of an original image and an enhancement layer that is combined with an image of the base layer to obtain an original image (an original spatial resolution) as illustrated in FIG. 48. Of course, the number of layers is an example, and each picture can be hierarchized into an arbitrary number of layers.

Figure 49:
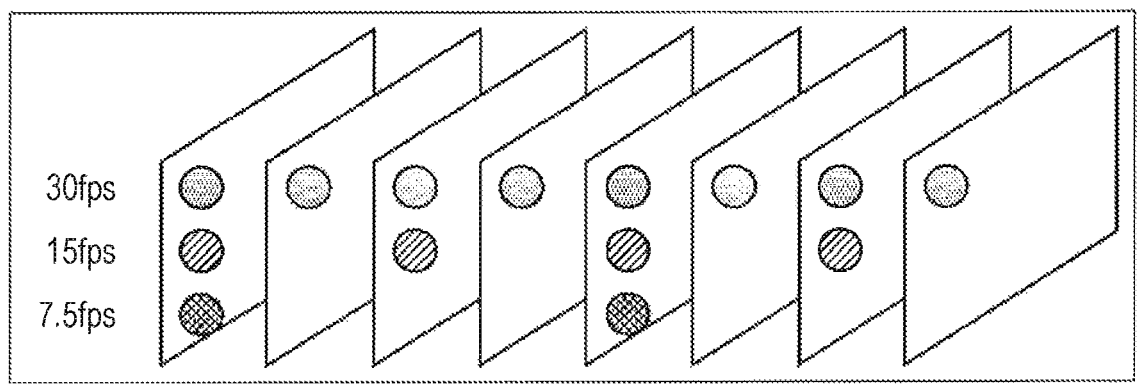
FIG. 49 is a diagram for describing an exemplary temporal scalable coding.

As another parameter having such scalability, for example, there is a temporal resolution as illustrated in FIG. 49 (temporal scalability). In the case of the temporal scalability, respective layers have different frame rates. In other words, in this case, each picture is hierarchized into layers having different frame rates, a moving image of a high frame rate can be obtained by combining a layer of a high frame rate with a layer of a low frame rate, and an original moving image (an original frame rate) can be obtained by combining all the layers as illustrated in FIG. 49. The number of layers is an example, and each picture can be hierarchized into an arbitrary number of layers.

Figure 50:
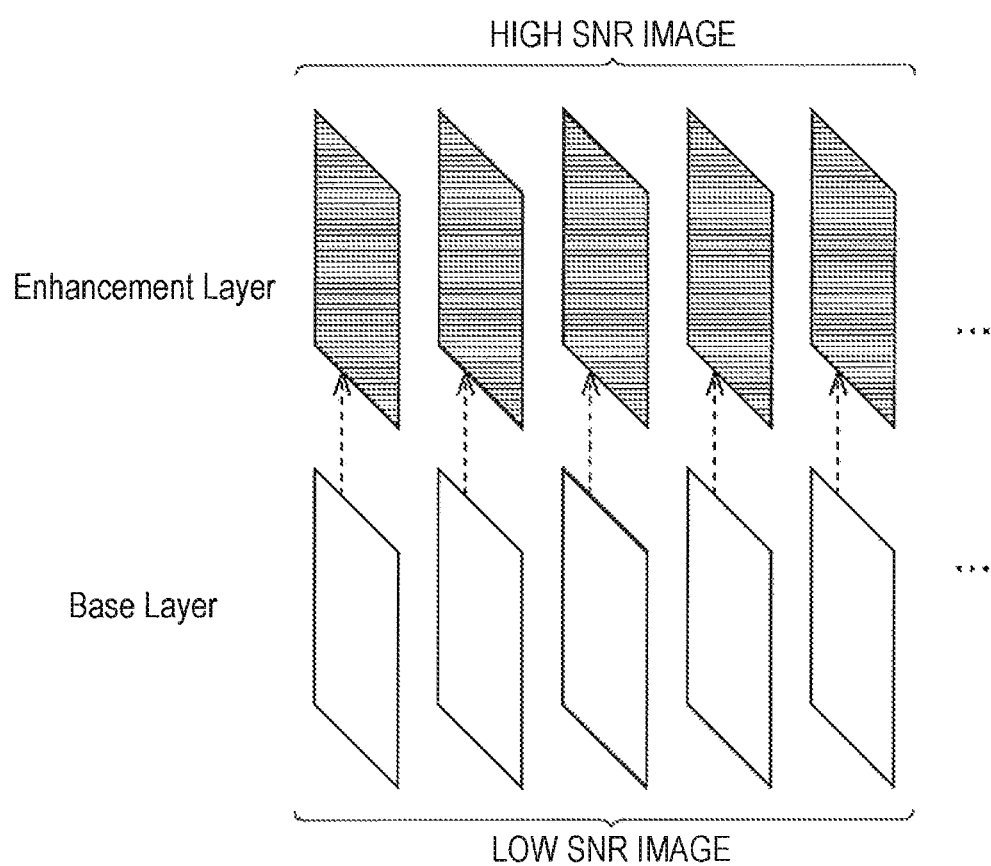
FIG. 50 is a diagram for describing an exemplary scalable coding of a signal to noise ratio.

Further, as another parameter having such scaiability, for example, there is a signal-to-noise ratio (SNR) (SNR scalability). In the case of the SNR scalability, respective layers having different SN ratios. In other words, in this case, each picture is hierarchized into two layers, that is, a base layer of a SNR lower than that of an original image and an enhancement layer that is combined with an image of the base layer to obtain an original image (an original SNR) as illustrated in FIG. 50. In other words, for base layer image compression information, information related to an image of a low PSNR is transmitted, and a high PSNR image can be reconstructed by combining the information with enhancement layer image compression information. Of course, the number of layers is an example, and each picture can be hierarchized into an arbitrary number of layers.

A parameter other than the above-described examples may be applied as a parameter having scalability. For example, there is bit-depth scalability in which the base layer includes an 8-bit image, and a 10-bit image can be obtained by adding the enhancement layer to the base layer.

Further, there is chroma scalability in which the base layer includes a component image of a 4:2:0 format, and a component image of a 4:2:2 format can be obtained by adding the enhancement layer to the base layer.

<Scalable Image Coding Device>

Figure 51:
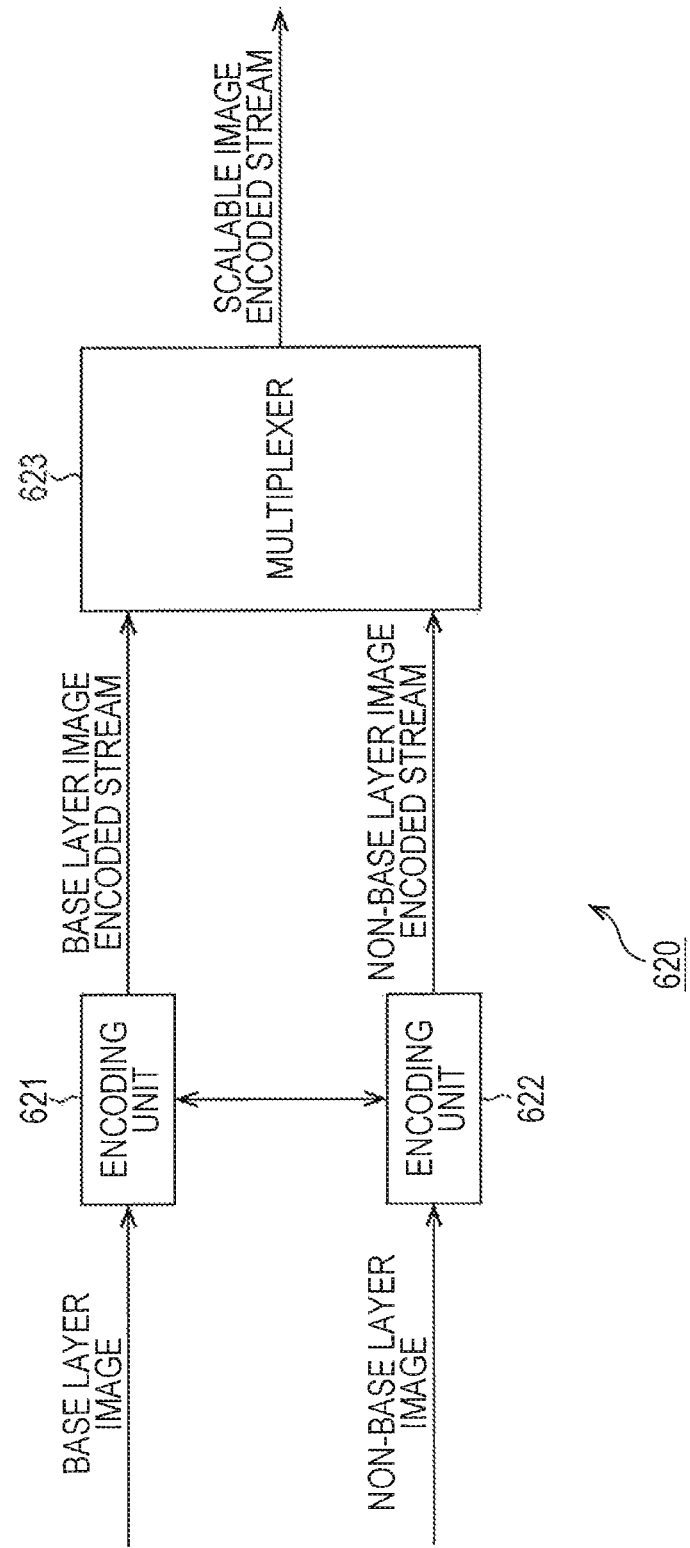
FIG. 51 is a diagram illustrating an exemplary main configuration of a scalable image coding device to which the present technology is applied.

FIG. 51 is a diagram illustrating a scalable image coding device that performs the scalable image coding. As illustrated in FIG. 51, a scalable image coding device 620 includes an encoding unit 621, an encoding unit 622, and a multiplexer 623.

The encoding unit 621 encodes a base layer image, and generates an encoded base layer image stream. The encoding unit 622 encodes a non-base layer image, and generates an encoded non-base layer image stream. The multiplexer 623 multiplexes the encoded base layer image stream generated in the encoding unit 621 and the encoded non-base layer image stream generated in the encoding unit 622, and generates an encoded scalable image stream.

The image coding device 100 (FIG. 25) or the image coding device 200 (FIG. 31) can be applied to the encoding unit 621 and the encoding unit 622 of the scalable image coding device 620. In other words, when the coding process is performed based on the profile for encoding the still image in encoding of each layer, it is possible to restrict the value of the syntax element related to the inter-image process, and it is possible to suppress a reduction in coding efficiency of each layer. Further, for example, the encoding unit 621 and the encoding unit 622 can control the filter process of the intra prediction using the same flag or the same parameter (for example, the syntax element related to the inter-image process or the like) (that is, can share the flag or the parameter), and thus it is possible to suppress a reduction in coding efficiency.

<Scalable Image Decoding Device>

Figure 52:
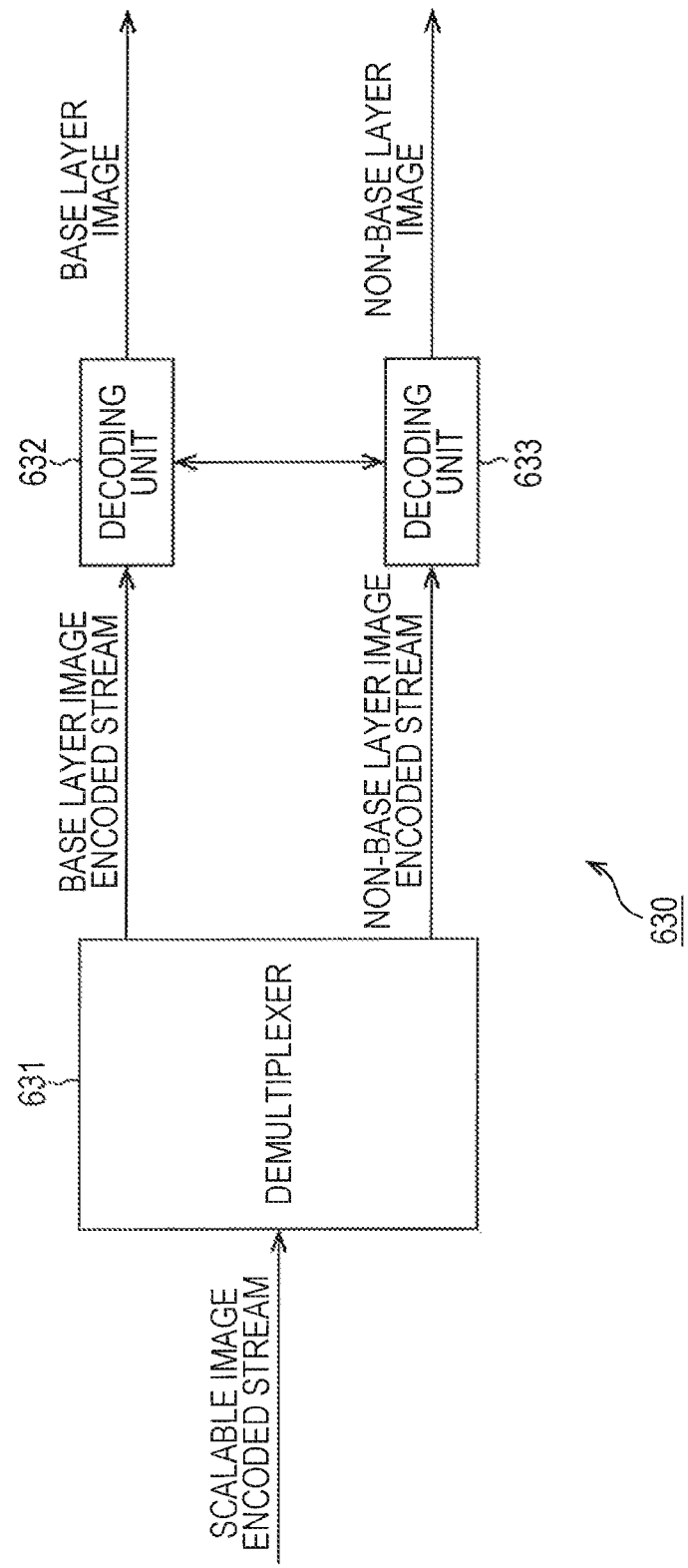
FIG. 52 is a diagram illustrating an exemplary main configuration of a scalable image decoding device to which the present technology is applied.

FIG. 52 is a diagram illustrating a scalable image decoding device that performs the scalable image decoding. As illustrated in FIG. 52, a scalable image decoding device 630 includes a demultiplexer 631, a decoding unit 632, and a decoding unit 633.

The demultiplexer 631 demultiplexes the encoded scalable image stream obtained by multiplexing the encoded base layer image stream and the encoded non-base layer image stream, and extracts the encoded base layer image stream and the encoded non-base layer image stream. The decoding unit 632 decodes the encoded base layer image stream extracted by the demultiplexer 631, and obtains the base layer image. The decoding unit 633 decodes the encoded non-base layer image stream extracted by the demultiplexer 631, and obtains the non-base layer image.

The image decoding device 300 (FIG. 34) or the image decoding device 400 (FIG. 39) can be applied to the decoding unit 632 and the decoding unit 633 of the scalable image decoding device 630. In other words, when the coding process is performed based on the profile for encoding the still image in decoding of each layer, it is possible to analyze the received syntax elements related to the inter-image process in the state in which the value is restricted, and it is possible to suppress a reduction in coding efficiency of each layer. Further, the decoding unit 612 and the decoding unit 613 can perform decoding using the same flag or the same parameter (for example, the syntax elements related to the inter-image process or the like) (that is, can share the flag or the parameter), and thus it is possible to suppress a reduction in coding efficiency.

For example, the present technology can be applied to an image coding device and an image decoding device used when image information (bitstream) compressed by orthogonal transform such as discrete cosine transform and motion compensation as in MPEG and H.26x is received via a network medium such as satellite broadcasting, a cable television, the Internet, or a mobile telephone. Further, the present technology can be applied to an image coding device and an image decoding device used when processing is performed on a storage medium such as an optical disk, a magnetic disk, or a flash memory. Furthermore, the present technology can be applied even to a quantization device or an inverse quantization device included in the image coding device, the image decoding device, or the like.

7. Seventh Embodiment

Computer

A series of processes described above may be executed by hardware or software. When the series of processes are executed by software, a program configuring the software is installed in a computer. Here, examples of the computer includes a computer incorporated into dedicated hardware and a general purpose personal computer that includes various programs installed therein and is capable of executing various kinds of functions.

Figure 53:
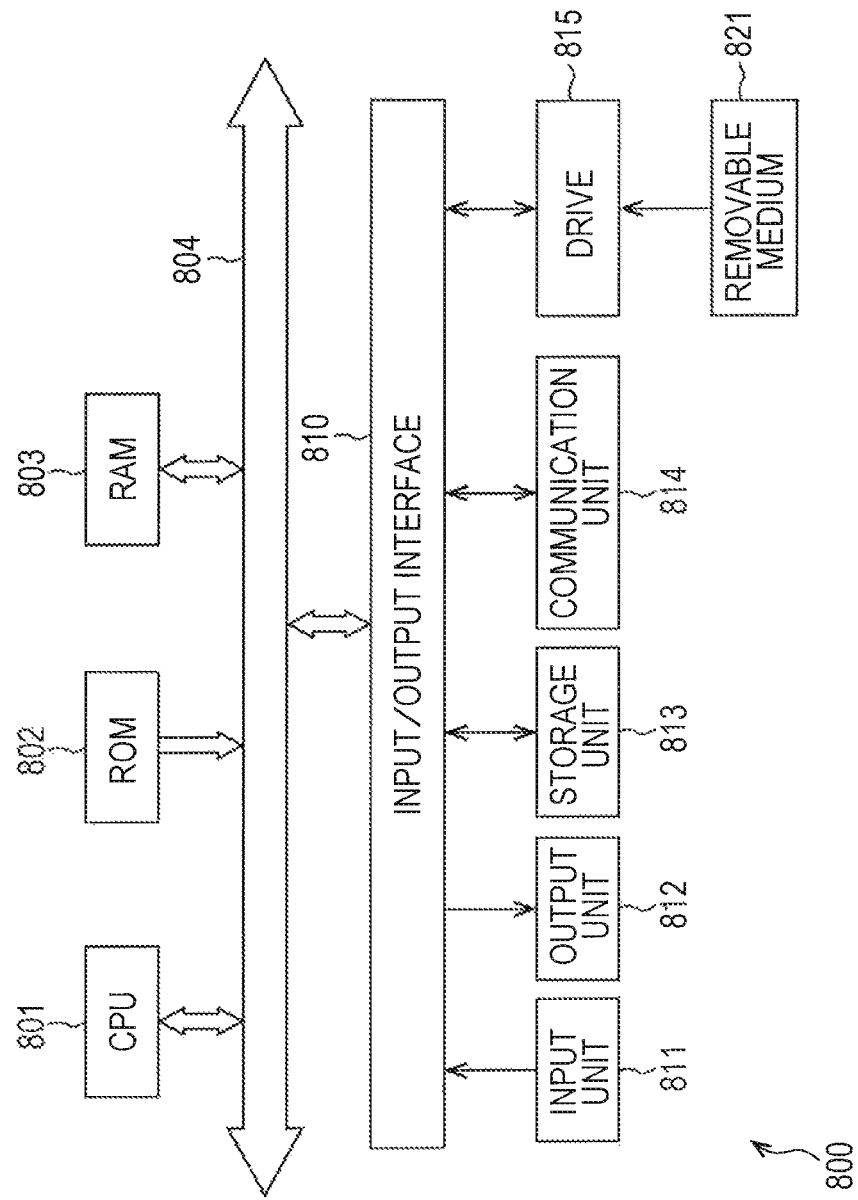
FIG. 53 is a block diagram illustrating an exemplary main configuration of a computer.

FIG. 53 is a block diagram illustrating an exemplary hardware configuration of a computer that executes the above-described series of processes by a program.

In a computer 800 illustrated in FIG. 53, a central processing unit (CPU) 801, a read only memory (ROM) 802, and a random access memory (RAM) 803 are connected with one another via a bus 804.

An input/output (I/O) interface 810 is also connected to the bus 804. An input unit 811, an output unit 812, a storage unit 813, a communication unit 814, and a drive 815 are connected to the input/output interface 810.

For example, the input unit 811 includes a keyboard, a mouse, a microphone, a touch panel, an input terminal, and the like. For example, the output unit 812 includes a display, a speaker, an output terminal, and the like. For example, the storage unit 813 includes a hard disk, a RAM disk, a non-volatile memory, and the like. For example, the communication unit 814 includes a network interface. The drive 815 drives a removable medium 821 such as a magnetic disk, an optical disk, a magneto optical disk, or a semiconductor memory.

In the computer having the above configuration, the CPU 801 executes the above-described series of processes, for example, by loading the program stored in the storage unit 813 onto the RAM 803 through the input/output interface 810 and the bus 804 and executing the program. The RAM 803 also appropriately stores, for example, data necessary when the CPU 801 executes various kinds of processes.

For example, the program executed by the computer (the CPU 801) may be recorded in the removable medium 821 as a package medium or the like and applied. Further, the program may be provided through a wired or wireless transmission medium such as a local area network (LAN), the Internet, or digital satellite broadcasting.

In the computer, the removable medium 821 is mounted to the drive 815, and then the program may be installed in the storage unit 813 through the input/output interface 810. Further, the program may be received by the communication unit 814 via a wired or wireless transmission medium and then installed in the storage unit 813. In addition, the program may be installed in the ROM 802 or the storage unit 813 in advance.

Further, the program may be a program in which the processes are chronologically performed in the order described in the present specification or may be a program in which the processes are performed in parallel or at necessary timings such as called timings.

Further, in the present specification, steps describing a program recorded in a recording medium include not only processes chronologically performed according to a described order but also processes that are not necessarily chronologically processed but performed in parallel or individually.

In addition, in the present specification, a system means a set of two or more configuration elements (devices, modulates (parts), or the like) regardless of whether or not all configuration elements are arranged in a single housing. Thus, both a plurality of devices that are accommodated in separate housings and connected via a network and a single device in which a plurality of modules are accommodated in a single housing are systems.

Further, a configuration described as one device (or processing unit) may be divided into a plurality of devices (or processing units). Conversely, a configuration described as a plurality of devices (or processing units) may be integrated into one device (or processing unit). Further, a configuration other than the above-described configuration may be added to a configuration of each device (or each processing unit). In addition, when a configuration or an operation in an entire system is substantially the same, a part of a configuration of a certain device (or processing unit) may be included in a configuration of another device (or another processing unit).

The preferred embodiments of the present disclosure have been described above in detail with reference to the accompanying drawings, whilst the technical scope of the present disclosure is not limited to the above examples. A person skilled in the art of the present disclosure may find various alterations and modifications within the scope of the appended claims, and it should be understood that they will naturally come under the technical scope of the present disclosure.

For example, the present technology may have a configuration of cloud computing in which a plurality of devices share and process a one function together via a network.

Further, the steps described in the above flowcharts may be executed by a single device or may be shared and executed by a plurality of devices.

Furthermore, when a plurality of processes are included in a single step, the plurality of processes included in the single step may be executed by a single device or may be shared and executed by a plurality of devices.

The image coding devices and the image decoding devices according to the above embodiments can be applied to satellite broadcasting, cable broadcasting such as cable televisions, transmitters or receivers in delivery on the Internet or delivery to terminals by cellular communications, recording devices that record images in a medium such as an optical disk, a magnetic disk, or a flash memory, or various electronic devices such as reproducing devices that reproduce images from a storage medium. Four application examples will be described below.

8. Application Examples

First Application Example

Television Receiver

Figure 54:
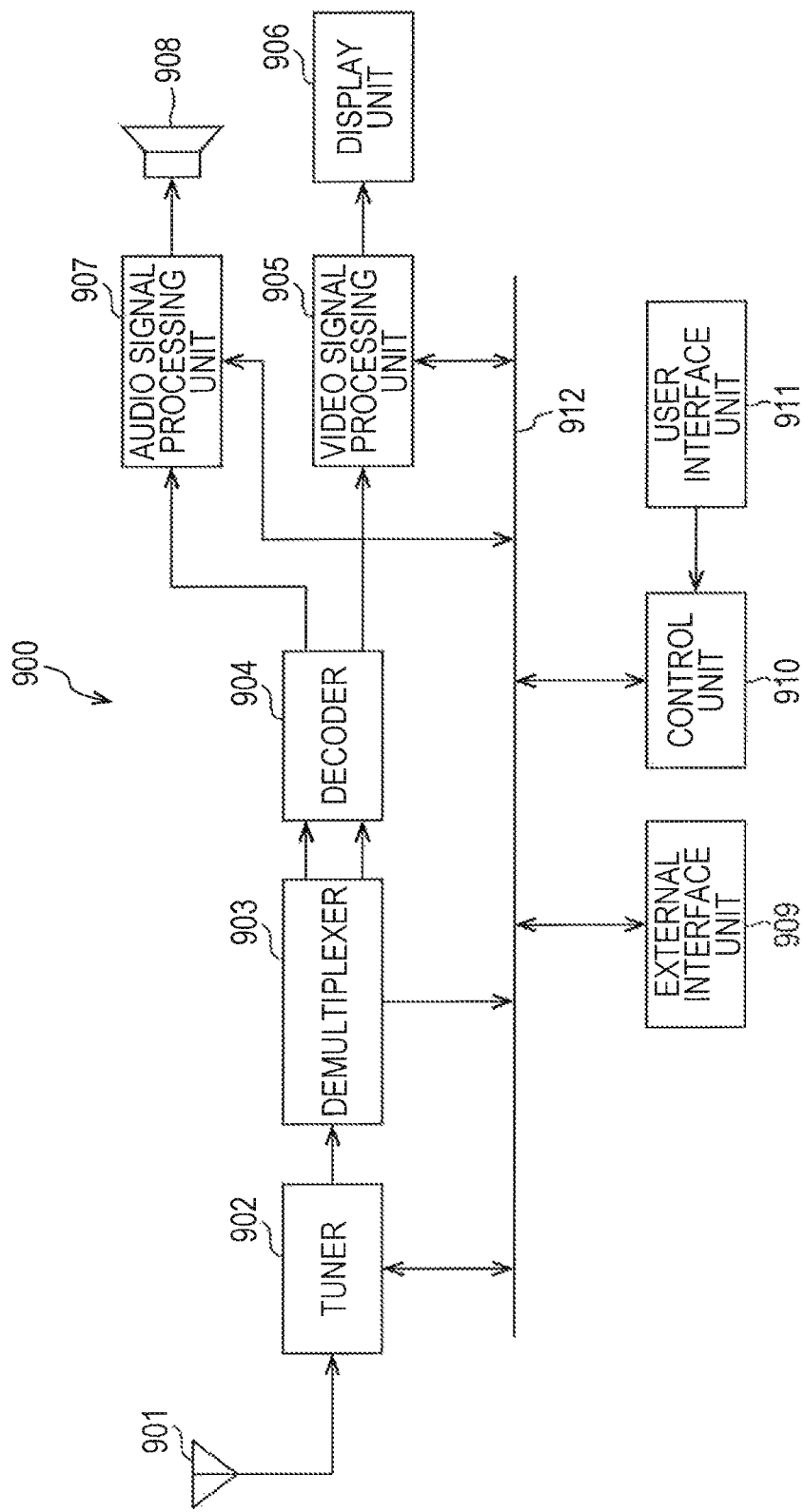
FIG. 54 is a block diagram illustrating an exemplary schematic configuration of a television device.

FIG. 54 illustrates an exemplary schematic configuration of a television device to which the above embodiment is applied. A television device 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcast signal received through the antenna 901, and demodulates an extracted signal. Further, the tuner 902 outputs an encoded bitstream obtained by the demodulation to the demultiplexer 903. In other words, the tuner 902 receives an encoded stream including an encoded image, and serves as a transmitting unit in the television device 900.

The demultiplexer 903 demultiplexes a video stream and an audio stream of a program of a viewing target from an encoded bitstream, and outputs each demultiplexed stream to the decoder 904. Further, the demultiplexer 903 extracts auxiliary data such as an electronic program guide (EPG) from the encoded bitstream, and supplies the extracted data to the control unit 910. Further, when the encoded bitstream has been scrambled, the demultiplexer 903 may perform descrambling.

The decoder 904 decodes the video stream and the audio stream input from the demultiplexer 903. The decoder 904 outputs video data generated by the decoding process to the video signal processing unit 905. Further, the decoder 904 outputs audio data generated by the decoding process to the audio signal processing unit 907.

The video signal processing unit 905 reproduces the video data input from the decoder 904, and causes a video to be displayed on the display unit 906. Further, the video signal processing unit 905 may causes an application screen supplied via a network to be displayed on the display unit 906. The video signal processing unit 905 may perform an additional process such as a noise reduction process on the video data according to a setting. The video signal processing unit 905 may generate an image of a graphical user interface (GUI) such as a menu, a button, or a cursor and cause the generated image to be superimposed on an output image.

The display unit 906 is driven by a drive signal supplied from the video signal processing unit 905, and displays a video or an image on a video plane of a display device (for example, a liquid crystal display (LCD), a plasma display, or an organic electroluminescence display (OELD) (an organic EL display)).

The audio signal processing unit 907 performs a reproduction process such as D/A conversion and amplification on the audio data input from the decoder 904, and outputs a sound through the speaker 908. The audio signal processing unit 907 may perform an additional process such as a noise reduction process on the audio data.

The external interface 909 is an interface for connecting the television device 900 with an external device or a network. For example, the video stream or the audio stream received through the external interface 909 may be decoded by the decoder 904. In other words, the external interface 909 also undertakes a transmitting unit of the television device 900 that receives an encoded stream including an encoded image.

The control unit 910 includes a processor such as a CPU and a memory such as a RAM or a ROM. For example, the memory stores a program executed by the CPU, program data, EPG data, and data acquired via a network. For example, the program stored in the memory is read and executed by the CPU when the television device 900 is activated. The CPU executes the program, and controls an operation of the television device 900, for example, according to an operation signal input from the user interface 911.

The user interface 911 is connected with the control unit 910. For example, the user interface 911 includes a button and a switch used when the user operates the television device 900 and a receiving unit receiving a remote control signal. The user interface 911 detects the user's operation through the components, generates an operation signal, and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 with one another.

In the television device 900 having the above configuration, the decoder 904 has the function of the image decoding device 300 (FIG. 34) or the image decoding device 400 (FIG. 39) according to the above embodiment. Thus, when an image is decoded in the television device 900, it is possible to suppress a reduction in coding efficiency.

Second Application Example

Mobile Telephone

Figure 55:
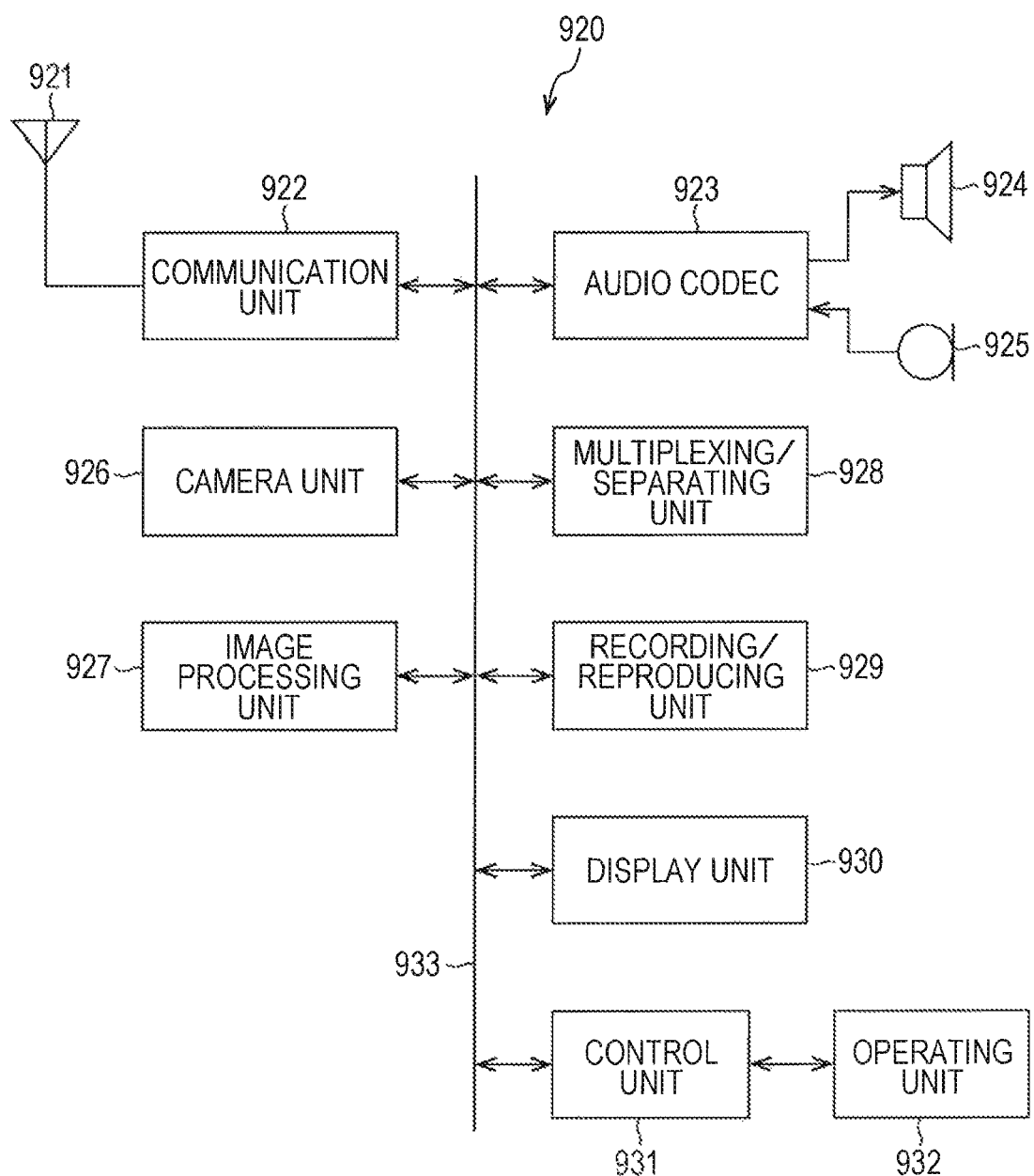
FIG. 55 is a block diagram illustrating an exemplary schematic configuration of a mobile telephone.

FIG. 55 illustrates an exemplary schematic configuration of a mobile telephone to which the above embodiments are applied. A mobile telephone 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operating unit 932, and a bus 933.

The antenna 921 is connected to the communication unit 922. The speaker 924 and the microphone 925 are connected to the audio codec 923. The operating unit 932 is connected to the control unit 931. The bus 933 connects the communication unit 922, the audio codec 923, the camera unit 926, the image processing unit 927, the multiplexing/separating unit 928, the recording/reproducing unit 929, the display unit 930, and the control unit 931 with one another.

The mobile telephone 920 performs operations such as transmission and reception of an audio signal, transmission and reception of an electronic mail or image data, image imaging, and data recording in various operation modes such as a voice call mode, a data communication mode, a shooting mode, and a video phone mode.

In the voice call mode, an analog audio signal generated by the microphone 925 is supplied to the audio codec 923. The audio codec 923 converts the analog audio signal into audio data, and performs A/D conversion and compression on the converted audio data. Then, the audio codec 923 outputs the compressed audio data to the communication unit 922. The communication unit 922 encodes and modulates the audio data, and generates a transmission signal. Then, the communication unit 922 transmits the generated transmission signal to a base station (not illustrated) through the antenna 921. Further, the communication unit 922 amplifies a wireless signal received through the antenna 921, performs frequency transform, and acquires a reception signal. Then, the communication unit 922 demodulates and decodes the reception signal, generates audio data, and outputs the generated audio data to the audio codec 923. The audio codec 923 decompresses the audio data, performs D/A conversion, and generates an analog audio signal. Then, the audio codec 923 supplies the generated audio signal to the speaker 924 so that a sound is output.

Further, in the data communication mode, for example, the control unit 931 generates text data configuring an electronic mail according to the user's operation performed through the operating unit 932. The control unit 931 causes a text to be displayed on the display unit 930. The control unit 931 generates electronic mail data according to a transmission instruction given from the user through the operating unit 932, and outputs the generated electronic mail data to the communication unit 922. The communication unit 922 encodes and modulates the electronic mail data, and generates a transmission signal. Then, the communication unit 922 transmits the generated transmission signal to base station (not illustrated) through the antenna 921. Further, the communication unit 922 amplifies a wireless signal received through the antenna 921, performs frequency transform, and acquires a reception signal. Then, the communication unit 922 demodulates and decodes the reception signal, restores electronic mail data, and outputs the restored electronic mail data to the control unit 931. The control unit 931 causes content of the electronic mail to be displayed on the display unit 930, and stores the electronic mail data in a storage medium of the recording/reproducing unit 929.

The recording/reproducing unit 929 includes an arbitrary readable/writable storage medium. For example, the storage medium may be a built-in storage medium such as a RAM or a flash memory or a removable storage medium such as a hard disk, a magnetic disk, a magneto optical disk, an optical disk, a universal serial bus (USB) memory, or a memory card.

In the shooting mode, for example, the camera unit 926 images a subject, generates image data, and outputs the generated image data to the image processing unit 927. The image processing unit 927 encodes the image data input from the camera unit 926, and stores the encoded stream in a storage medium of the recording/reproducing unit 929.

In the video phone mode, for example, the multiplexing/separating unit 928 multiplexes the video stream encoded by the image processing unit 927 and the audio stream input from the audio codec 923, and outputs the multiplexed stream to the communication unit 922. The communication unit 922 encodes and modulates the stream, and generates a transmission signal. Then, the communication unit 922 transmits the generated transmission signal to a base station (not illustrated) through the antenna 921. Further, the communication unit 922 amplifies a wireless signal received through the antenna 921, performs frequency transform, and acquires a reception signal. The transmission signal and the reception signal may include an encoded bitstream. Then, the communication unit 922 demodulates and decodes the reception signal, and restores a stream, and outputs the restored stream to the multiplexing/separating unit 928. The multiplexing/separating unit 928 separates a video stream and an audio stream from the input stream, and outputs the video stream and the audio stream to the image processing unit 927 and the audio codec 923, respectively. The image processing unit 927 decodes the video stream, and generates video data. The video data is supplied to the display unit 930, and a series of images are displayed by the display unit 930. The audio codec 923 decompresses the audio stream, performs D/A conversion, and generates an analog audio signal. Then, the audio codec 923 supplies the generated audio signal to the speaker 924 so that a sound is output.

In the mobile telephone 920 having the above configuration, the image processing unit 927 has the function of the image coding device 100 (FIG. 25), the image coding device 200 (FIG. 31), the image decoding device 300 (FIG. 34), or the image decoding device 400 (FIG. 39) according to the above embodiment. Thus, when the mobile telephone 920 encodes and decodes an image, it is possible to suppress a reduction in coding efficiency.

Third Application Example

Recording/Reproducing Device

Figure 56:
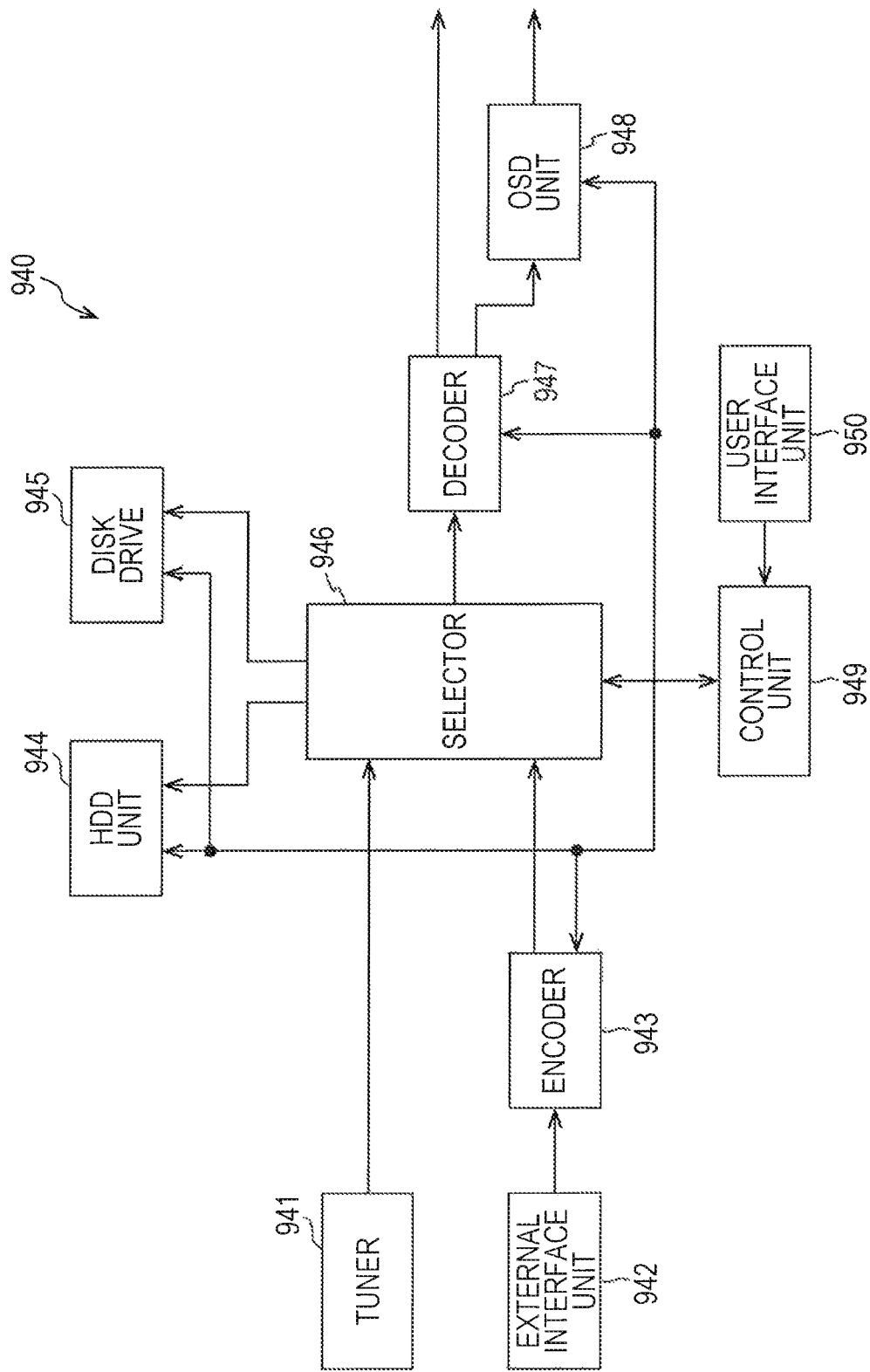
FIG. 56 is a block diagram illustrating an exemplary schematic configuration of a recording/reproducing device.

FIG. 56 illustrates an exemplary schematic configuration of a recording/reproducing device to which the above embodiment is applied. For example, a recording/reproducing device 940 encodes audio data and video data of a received broadcast program, and records the encoded data in a recording medium. For example, the recording/reproducing device 940 may encode audio data and video data acquired from another device and record the encoded data in a recording medium. For example, the recording/reproducing device 940 reproduces data recorded in a recording medium through a monitor and a speaker according to the user's instruction. At this time, the recording/reproducing device 940 decodes the audio data and the video data.

The recording/reproducing device 940 includes a tuner 941, an external interface 942, an encoder 943, a hard disk drive (HDD) 944, a disk drive 945, a selector 946, a decoder 947, an on-screen display (OSD) 948, a control unit 949, and a user interface 950.

The tuner 941 extracts a signal of a desired channel from a broadcast signal received through an antenna (not illustrated), and demodulates the extracted signal. Then, the tuner 941 outputs an encoded bitstream obtained by the demodulation to the selector 946. In other words, the tuner 941 undertakes a transmitting unit in the recording/reproducing device 940.

The external interface 942 is an interface for connecting the recording/reproducing device 940 with an external device or a network. For example, the external interface 942 may be an IEEE1394 interface, a network interface, a USB interface, or a flash memory interface. For example, video data and audio data received via the external interface 942 are input to the encoder 943. In other words, the external interface 942 undertakes a transmitting unit in the recording/reproducing device 940.

When video data and audio data input from the external interface 942 are not encoded, the encoder 943 encodes the video data and the audio data. Then, the encoder 943 outputs an encoded bitstream to the selector 946.

The HDD 944 records an encoded bitstream in which content data such as a video or a sound is compressed, various kinds of programs, and other data in an internal hard disk. The HDD 944 reads the data from the hard disk when a video or a sound is reproduced.

The disk drive 945 records or reads data in or from a mounted recording medium. For example, the recording medium mounted in the disk drive 945 may be a DVD disk (DVD-Video, DVD-RAM, DVD-R, DVD-RW, DVD+R, DVD+RW, or the like), a Blu-ray (a registered trademark) disk, or the like.

When a video or a sound is recorded, the selector 946 selects an encoded bitstream input from the tuner 941 or the encoder 943, and outputs the selected encoded bitstream to the HDD 944 or the disk drive 945. Further, when a video or a sound is reproduced, the selector 946 outputs an encoded bitstream input from the HDD 944 or the disk drive 945 to the decoder 947.

The decoder 947 decodes the encoded bitstream, and generates video data and audio data. Then, the decoder 947 outputs the generated video data to the OSD 948. The decoder 947 outputs the generated audio data to an external speaker.

The OSD 948 reproduces the video data input from the decoder 947, and displays a video. For example, the OSD 948 may cause an image of a GUI such as a menu, a button, or a cursor to be superimposed on a displayed video.

The control unit 949 includes a processor such as a CPU and a memory such as a RAM or a ROM. The memory stores a program executed by the CPU, program data, and the like. For example, the program stored in the memory is read and executed by the CPU when the recording/reproducing device 940 is activated. The CPU executes the program, and controls an operation of the recording/reproducing device 940, for example, according to an operation signal input from the user interface 950.

The user interface 950 is connected with the control unit 949. For example, the user interface 950 includes a button and a switch used when the user operates the recording/reproducing device 940 and a receiving unit receiving a remote control signal. The user interface 950 detects the user's operation through the components, generates an operation signal, and outputs the generated operation signal to the control unit 949.

In the recording/reproducing device 940 having the above configuration, the encoder 943 has the function of the image coding device 100 (FIG. 25) or the image coding device 200 (FIG. 31) according to the above embodiment. The decoder 947 has the function of the image decoding device 300 (FIG. 34) or the image decoding device 400 (FIG. 39) according to the above embodiment. Thus, when the recording/reproducing device 940 encodes and decodes an image, it is possible to suppress a reduction in coding efficiency.

Fourth Application Example

Imaging Device

Figure 57:
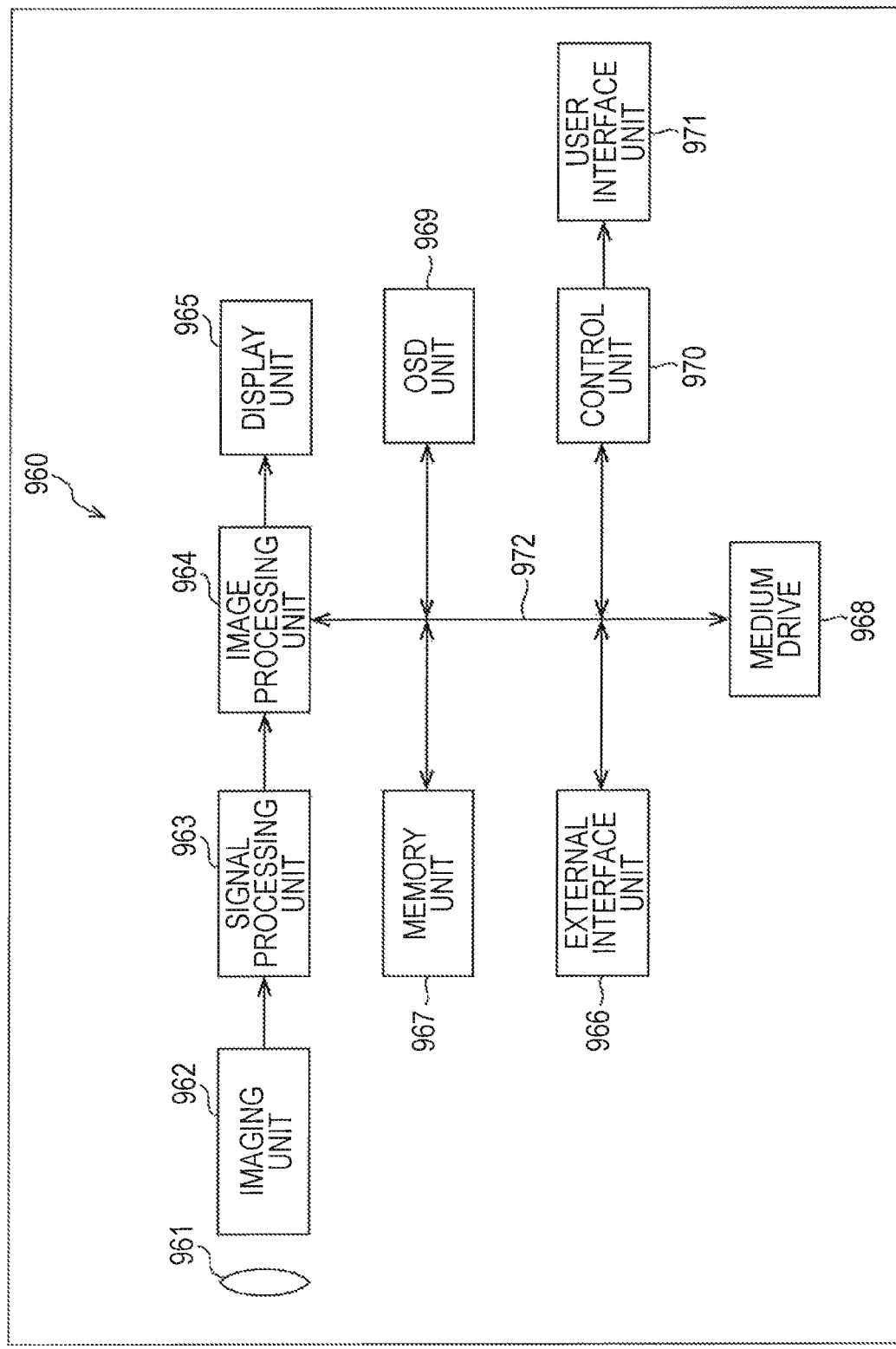
FIG. 57 is a block diagram illustrating an exemplary schematic configuration of an imaging device.

FIG. 57 illustrates an exemplary schematic configuration of an imaging device to which the above embodiment is applied. An imaging device 960 images a subject, generates an image, encodes image data, and records the image data in a recording medium.

The imaging device 960 includes an optical block 961, an imaging unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 connects the image processing unit 964, the external interface 966, the memory 967, the medium drive 968, the OSD 969, and the control unit 970 with one another.

The optical block 961 includes a focus lens, a diaphragm mechanism, and the like. The optical block 961 forms an optical image of a subject on an imaging plane of the imaging unit 962. The imaging unit 962 includes a charge coupled device (CCD) image sensor or a complementary metal oxide semiconductor (CMOS) image sensor, or the like, and converts the optical image formed on the imaging plane into an image signal serving as an electric signal by photoelectric conversion. Then, the imaging unit 962 outputs the image signal to the signal processing unit 963.

The signal processing unit 963 performs various kinds of camera signal processes such as knee correction, gamma correction, and color correction on the image signal input from the imaging unit 962. The signal processing unit 963 outputs the image data that has been subjected to the camera signal processes to the image processing unit 964.

The image processing unit 964 encodes the image data input from the signal processing unit 963, and generates encoded data. Then, the image processing unit 964 outputs the generated encoded data to the external interface 966 or the medium drive 968. Further, the image processing unit 964 decodes encoded data input from the external interface 966 or the medium drive 968, and generates image data. Then, the image processing unit 964 outputs the generated image data to the display unit 965. The image processing unit 964 may output the image data input from the signal processing unit 963 to the display unit 965 so that an image is displayed. The image processing unit 964 may cause display data acquired from the OSD 969 to be superimposed on an image output to the display unit 965.

The OSD 969 generates an image of a GUI such as a menu, a button, or a cursor, and outputs the generated image to the image processing unit 964.

For example, the external interface 966 is configured as an USB I/O terminal. For example, the external interface 966 connects the imaging device 960 with a printer when an image is printed. Further, a drive is connected to the external interface 966 as necessary. For example, a removable medium such as a magnetic disk or an optical disk may be mounted in the drive, and a program read from the removable medium may be installed in the imaging device 960. Further, the external interface 966 may be configured as a network interface connected to a network such as an LAN or the Internet. In other words, the external interface 966 undertakes a transmitting unit in the imaging device 960.

The recording medium mounted in the medium drive 968 may be an arbitrary readable/writable removable medium such as a magnetic disk, a magneto optical disk, an optical disk, or a semiconductor memory. Further, a recording medium may be fixedly mounted in the medium drive 968, and for example, a non-transitory storage unit such as a built-in hard disk drive or a solid state drive (SSD) may be configured.

The control unit 970 includes a processor such as a CPU and a memory such as a RAM or a ROM. For example, the memory stores a program executed by the CPU, program data, and the like. For example, the program stored in the memory is read and executed by the CPU when the imaging device 960 is activated. The CPU executes the program, and controls an operation of the imaging device 960, for example, according to an operation signal input from the user interface 971.

The user interface 971 is connected with the control unit 970. For example, the user interface 971 includes a button, a switch, or the like which is used when the user operates the imaging device 960. The user interface 971 detects the user's operation through the components, generates an operation signal, and outputs the generated operation signal to the control unit 970.

In the imaging device 960 having the above configuration, the image processing unit 964 has the function of the image coding device 100 (FIG. 25), the image coding device 200 (FIG. 31), the image decoding device 300 (FIG. 34), or the image decoding device 400 (FIG. 39) according to the above embodiment. Thus, when the imaging device 960 encodes and decodes an image, it is possible to suppress a decrease in an image quality.

9. Application Examples of Scalable Coding

First System

Next, concrete application examples of scalable encoded data generated by scalable (image) coding will be described. The scalable coding is used for selection of data to be transmitted, for example, as illustrated in FIG. 58.

Figure 58:
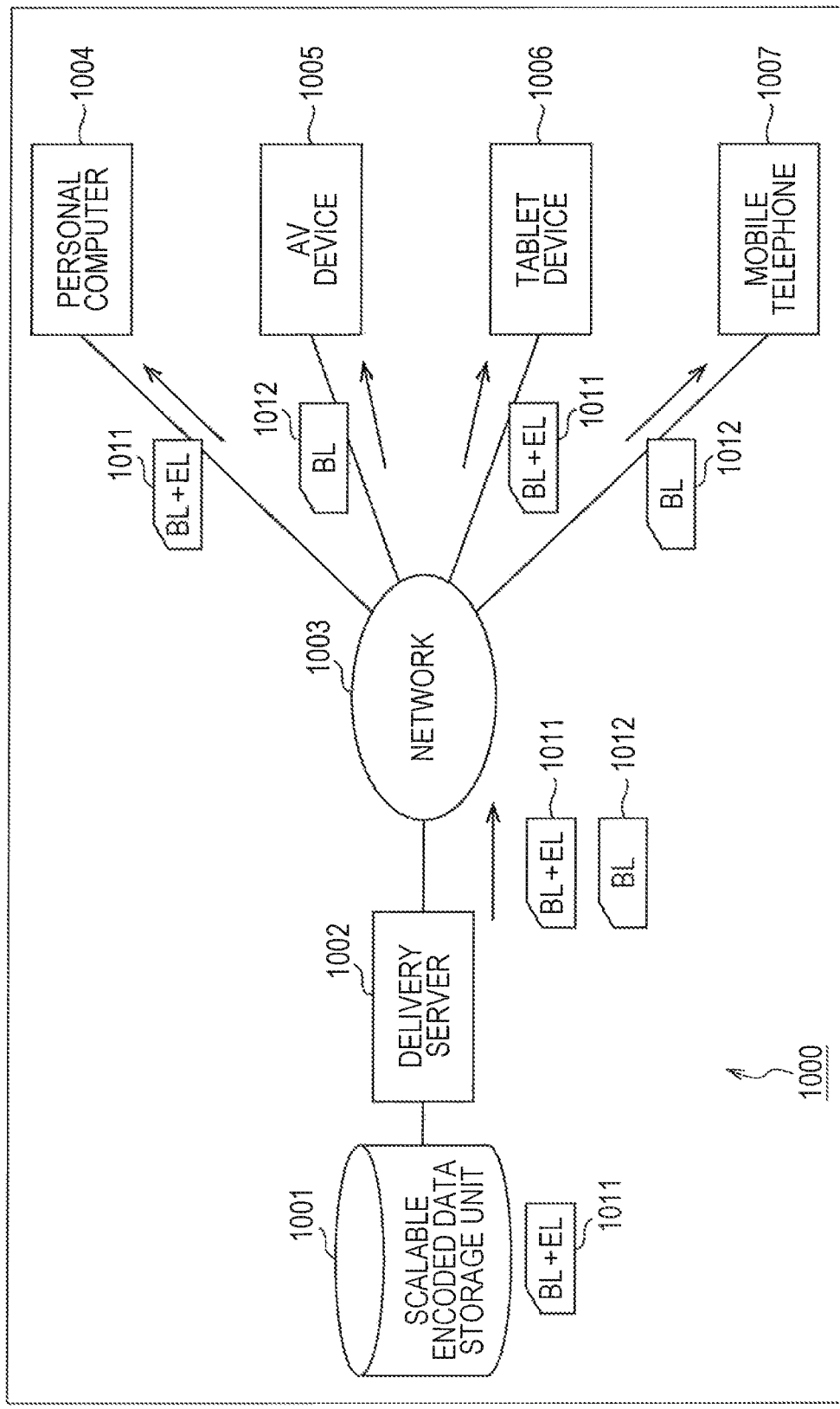
FIG. 58 is a block diagram illustrating a utilization example of scalable coding.

In a data transmission system 1000 illustrated in FIG. 58, a delivery server 1002 reads scalable encoded data stored in a scalable encoded data storage unit 1001, and delivers the scalable encoded data to terminal devices such as a personal computer 1004, an AV device 1005, a tablet device 1006, and a mobile telephone 1007 via a network 1003.

At this time, the delivery server 1002 selects an appropriate high-quality encoded data according to the capabilities of the terminal devices, a communication environment, or the like, and transmits the selected high-quality encoded data. Although the delivery server 1002 transmits unnecessarily high-quality data, the terminal devices do not necessarily obtain a high-quality image, and a delay or an overflow may occur. Further, a communication band may be unnecessarily occupied, and a load of a terminal device may be unnecessarily increased. On the other hand, although the delivery server 1002 transmits unnecessarily low-quality data, the terminal devices are unlikely to obtain an image of a sufficient quality. Thus, the delivery server 1002 reads scalable encoded data stored in the scalable encoded data storage unit 1001 as encoded data of a quality appropriate for the capability of the terminal device or a communication environment, and then transmits the read data.

For example, the scalable encoded data storage unit 1001 is assumed to store scalable encoded data (BL+EL) 1011 that is encoded by the scalable coding. The scalable encoded data (BL+EL) 1011 is encoded data including both of a base layer and an enhancement layer, and both an image of the base layer and an image of the enhancement layer can be obtained by decoding the scalable encoded data (BL+EL) 1011.

The delivery server 1002 selects an appropriate layer according to the capability of a terminal device to which data is transmitted, a communication environment, or the like, and reads data of the selected layer. For example, for the personal computer 1004 or the tablet device 1006 having a high processing capability, the delivery server 1002 reads the high-quality scalable encoded data (BL+EL) 1011 from the scalable encoded data storage unit 1001, and transmits the scalable encoded data (BL+EL) 1011 without change. On the other hand, for example, for the AV device 1005 or the mobile telephone 1007 having a low processing capability, the delivery server 1002 extracts data of the base layer from the scalable encoded data (BL+EL) 1011, and transmits a scalable encoded data (BL) 1012 that is data of the same content as the scalable encoded data (BL+EL) 1011 but lower in quality than the scalable encoded data (BL+EL) 1011.

As described above, an amount of data can be easily adjusted using scalable encoded data, and thus it is possible to prevent the occurrence of a delay or an overflow and prevent a load of a terminal device or a communication medium from being unnecessarily increased. Further, the scalable encoded data (BL+EL) 1011 is reduced in redundancy between layers, and thus it is possible to reduce an amount of data to be smaller than when individual data is used as encoded data of each layer. Thus, it is possible to more efficiently use a memory area of the scalable encoded data storage unit 1001.

Further, various devices such as the personal computer 1004 to the mobile telephone 1007 can be applied as the terminal device, and thus the hardware performance of the terminal devices differs according to each device. Further, since various applications can be executed by the terminal devices, software has various capabilities. Furthermore, all communication line networks including either or both of a wired network and a wireless network such as the Internet or an LAN, can be applied as the network 1003 serving as a communication medium, and thus various data transmission capabilities are provided. In addition, a change may be made by another communication or the like.

In this regard, the delivery server 1002 may be configured to perform communication with a terminal device serving as a transmission destination of data before starting data transmission and obtain information related to a capability of a terminal device such as hardware performance of a terminal device or a performance of an application (software) executed by a terminal device and information related to a communication environment such as an available bandwidth of the network 1003. Then, the delivery server 1002 may select an appropriate layer based on the obtained information.

Further, the extraction of the layer may be performed in a terminal device. For example, the personal computer 1004 may decode the transmitted scalable encoded data (BL+EL) 1011 and display the image of the base layer or the image of the enhancement layer.

Further, for example, the personal computer 1004 may extract the scalable encoded data (BL) 1012 of the base layer from the transmitted scalable encoded data (BL+EL) 1011, store the scalable encoded data (BL) 1012 of the base layer, transfer the scalable encoded data (BL) 1012 of the base layer to another device, decode the scalable encoded data (BL) 1012 of the base layer, and display the image of the base layer.

Of course, the number of the scalable encoded data storage units 1001, the number of the delivery servers 1002, the number of the networks 1003, and the number of terminal devices are arbitrary. The above description has been made in connection with the example in which the delivery server 1002 transmits data to the terminal devices, but the application example is not limited to this example. The data transmission system 1000 can be applied to any system in which when encoded data generated by the scalable coding is transmitted to a terminal device, an appropriate layer is selected according to a capability of a terminal devices or a communication environment, and the encoded data is transmitted.

In the data transmission system 1000 of FIG. 58, the present technology is applied, similarly to the application to the scalable coding and the scalable decoding described above with reference to FIGS. 47 to 52, and thus the same effects as the effects described above with reference to FIGS. 47 to 52 can be obtained.

Second System

Figure 59:
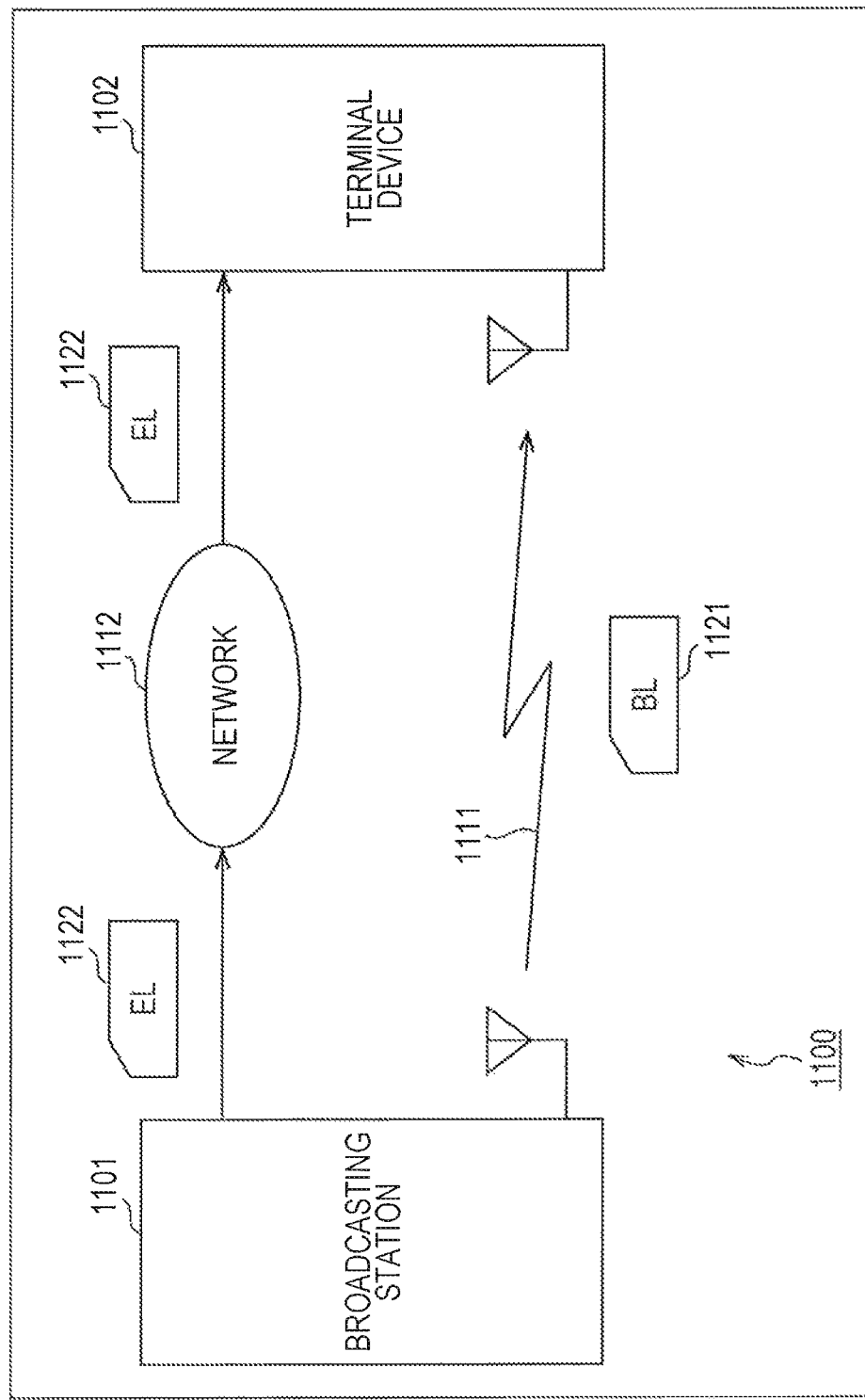
FIG. 59 is a block diagram illustrating another utilization example of scalable coding.

The scalable coding is used for transmission using a plurality of communication media, for example, as illustrated in FIG. 59.

In a data transmission system 1100 illustrated in FIG. 59, a broadcasting station 1101 transmits scalable encoded data (BL) 1121 of a base layer through terrestrial broadcasting 1111. Further, the broadcasting station 1101 transmits scalable encoded data (EL) 1122 of an enhancement layer (for example, packetizes the scalable encoded data (EL) 1122 and then transmits resultant packets) via an arbitrary network 1112 configured with a communication network including either or both of a wired network and a wireless network.

A terminal device 1102 has a reception function of receiving the terrestrial broadcasting 1111 broadcast by the broadcasting station 1101, and receives the scalable encoded data (BL) 1121 of the base layer transmitted through the terrestrial broadcasting 1111. The terminal device 1102 further has a communication function of performing communication via the network 1112, and receives the scalable encoded data (EL) 1122 of the enhancement layer transmitted via the network 1112.

The terminal device 1102 decodes the scalable encoded data (BL) 1121 of the base layer acquired through the terrestrial broadcasting 1111, for example, according to the user's instruction or the like, obtains the image of the base layer, stores the obtained image, and transmits the obtained image to another device.

Further, the terminal device 1102 combines the scalable encoded data (BL) 1121 of the base layer acquired through the terrestrial broadcasting 1111 with the scalable encoded data (EL) 1122 of the enhancement layer acquired through the network 1112, for example, according to the user's instruction or the like, obtains the scalable encoded data (BL+EL), decodes the scalable encoded data (BL+EL) to obtain the image of the enhancement layer, stores the obtained image, and transmits the obtained image to another device.

As described above, it is possible to transmit scalable encoded data of respective layers, for example, through different communication media. Thus, it is possible to distribute a load, and it is possible to prevent the occurrence of a delay or an overflow.

Further, it may be possible to select a communication medium used for transmission for each layer according to the situation. For example, the scalable encoded data (BL) 1121 of the base layer having a relative large amount of data may be transmitted through a communication medium having a large bandwidth, and the scalable encoded data (EL) 1122 of the enhancement layer having a relative small amount of data may be transmitted through a communication medium having a small bandwidth. Further, for example, a communication medium for transmitting the scalable encoded data (EL) 1122 of the enhancement layer may be switched between the network 1112 and the terrestrial broadcasting 1111 according to an available bandwidth of the network 1112. Of course, the same applies to data of an arbitrary layer.

As control is performed as described above, it is possible to further suppress an increase in a load in data transmission.

Of course, the number of layers is an arbitrary, and the number of communication media used for transmission is also arbitrary. Further, the number of the terminal devices 1102 serving as a data delivery destination is also arbitrary. The above description has been described in connection with the example of broadcasting from the broadcasting station 1101, and the application example is not limited to this example. The data transmission system 1100 can be applied to any system in which encoded data generated by the scalable coding is divided into two or more in units of layers and transmitted through a plurality of lines.

In the data transmission system 1100 of FIG. 59, the present technology is applied, similarly to the application to the scalable coding and the scalable decoding described above with reference to FIGS. 47 to 52, and thus the same effects as the effects described above with reference to FIGS. 47 to 52 can be obtained.

Third System

Figure 60:
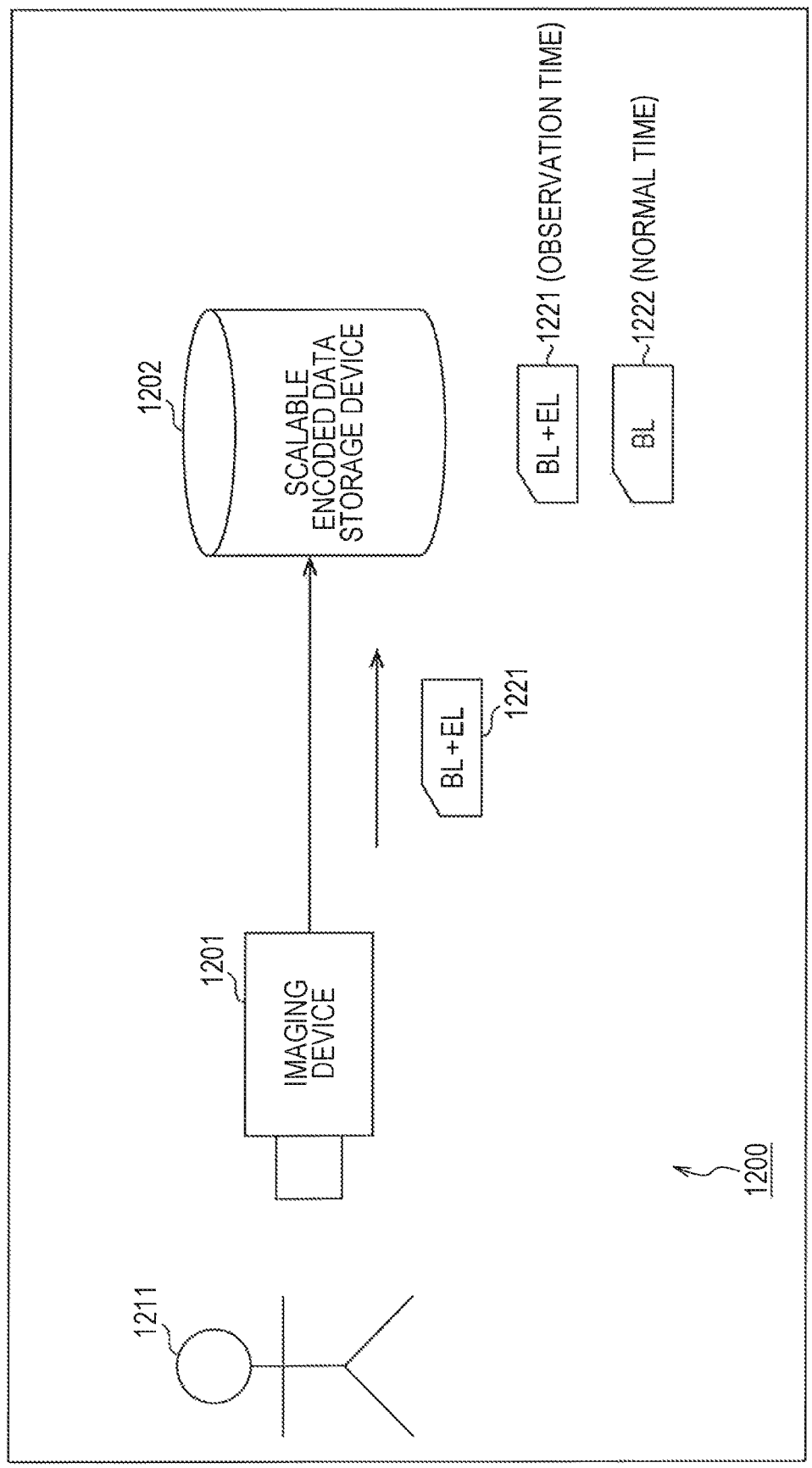
FIG. 60 is a block diagram illustrating still another utilization example of scalable coding.

The scalable coding is used for storage of encoded data, for example, as illustrated in FIG. 60.

In an imaging system 1200 illustrated in FIG. 60, an imaging device 1201 performs scalable coding on image data obtained by imaging a subject 1211, and provides scalable encoded data (BL+EL) 1221 to a scalable encoded data storage device 1202.

The scalable encoded data storage device 1202 stores the scalable encoded data (BL+EL) 1221 provided from the imaging device 1201 in a quality according to the situation. For example, during a normal time, the scalable encoded data storage device 1202 extracts data of the base layer from the scalable encoded data (BL+EL) 1221, and stores the extracted data as scalable encoded data (BL) 1222 of the base layer having a small amount of data in a low quality. On the other hand, for example, during an observation time, the scalable encoded data storage device 1202 stores the scalable encoded data (BL+EL) 1221 having a large amount of data in a high quality without change.

Accordingly, the scalable encoded data storage device 1202 can store an image in a high quality only when necessary, and thus it is possible to suppress an increase in an amount of data and improve use efficiency of a memory area while suppressing a reduction in a value of an image caused by quality deterioration.

For example, the imaging device 1201 is assumed to be a monitoring camera. When a monitoring target (for example, an intruder) is not shown on a photographed image (during a normal time), content of the photographed image is likely to be inconsequential, and thus a reduction in an amount of data is prioritized, and image data (scalable encoded data) is stored in a low quality. On the other hand, when a monitoring target is shown on a photographed image as the subject 1211 (during an observation time), content of the photographed image is likely to be consequential, and thus an image quality is prioritized, and image data (scalable encoded data) is stored in a high quality.

It may be determined whether it is the normal time or the observation time, for example, by analyzing an image through the scalable encoded data storage device 1202. Further, the imaging device 1201 may perform the determination and transmit the determination result to the scalable encoded data storage device 1202.

Further, a determination criterion as to whether it is the normal time or the observation time is arbitrary, and content of an image serving as the determination criterion is arbitrary. Of course, a condition other than content of an image may be a determination criterion. For example, switching may be performed according to the magnitude or a waveform of a recorded sound, switching may be performed at predetermined time intervals, or switching may be performed according an external instruction such as the user's instruction.

The above description has been described in connection with the example in which switching is performed between two states of the normal time and the observation time, but the number of states is arbitrary. For example, switching may be performed among three or more states such as a normal time, a low-level observation time, an observation time, a high-level observation time, and the like. Here, an upper limit number of states to be switched depends on the number of layers of scalable encoded data.

Further, the imaging device 1201 may decide the number of layers for the scalable coding according to a state. For example, during the normal time, the imaging device 1201 may generate the scalable encoded data (BL) 1222 of the base layer having a small amount of data in a low quality and provide the scalable encoded data (BL) 1222 of the base layer to the scalable encoded data storage device 1202. Further, for example, during the observation time, the imaging device 1201 may generate the scalable encoded data (BL+EL) 1221 of the base layer having a large amount of data in a high quality and provide the scalable encoded data (BL+EL) 1221 of the base layer to the scalable encoded data storage device 1202.

The above description has been made in connection with the example of a monitoring camera, but the purpose of the imaging system 1200 is arbitrary and not limited to a monitoring camera.

In the imaging system 1200 of FIG. 60, the present technology is applied, similarly to the application to the scalable coding and the scalable decoding described above with reference to FIGS. 47 to 52, and thus the same effects as the effects described above with reference to FIGS. 47 to 52 can be obtained.

Further, the present technology can be also applied to a HTTP streaming such as MPEG DASH in which appropriate encoded data is selected from among a plurality of encoded data having different resolutions that are prepared in advance and used. In other words, a plurality of encoded data can share information related to encoding or decoding.

10. Eighth Embodiment

Other Embodiments

The above embodiments have been described in connection with the example of the device, the system, or the like according to the present technology, but the present technology is not limited to the above examples and may be implemented as any component mounted in the device or the device configuring the system, for example, a processor serving as a system large scale integration (LSI) or the like, a module using a plurality of processors or the like, a unit using a plurality of modules or the like, a set (that is, some components of the device) in which any other function is further added to a unit, or the like.

<Video Set>

Figure 61:
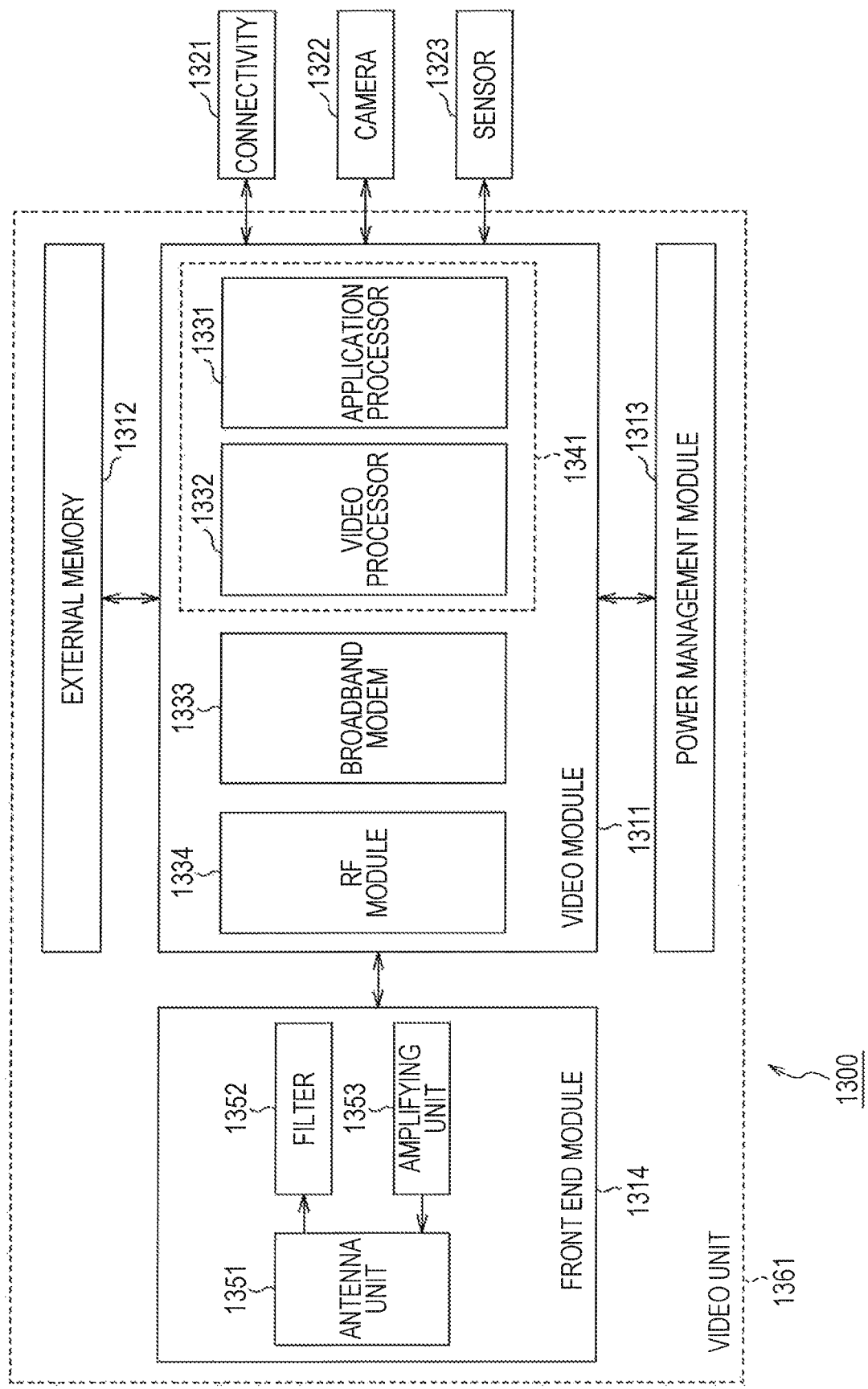
FIG. 61 is a block diagram illustrating an exemplary schematic configuration of a video set.

An example in which the present technology is implemented as a set will be described with reference to FIG. 61. FIG. 61 illustrates an exemplary schematic configuration of a video set to which the present technology is applied.

In recent years, functions of electronic devices have become diverse, and when some components are implemented as sale, provision, or the like in development or manufacturing, there are many cases in which a plurality of components having relevant functions are combined and implemented as a set having a plurality of functions as well as cases in which an implementation is performed as a component having a single function.

A video set 1300 illustrated in FIG. 61 is a multi-functionalized configuration in which a device having a function related to image encoding and/or image decoding is combined with a device having any other function related to the function.

The video set 1300 includes a module group such as a video module 1311, an external memory 1312, a power management module 1313, and a front end module 1314 and a device having relevant functions such as a connectivity 1321, a camera 1322, and a sensor 1323 as illustrated in FIG. 61.

A module is a part having multiple functions into which several relevant part functions are integrated. A concrete physical configuration is arbitrary, but, for example, it is configured such that a plurality of processors having respective functions, electronic circuit elements such as a resistor and a capacitor, and other devices are arranged and integrated on a wiring substrate. Further, a new module may be obtained by combining another module or a processor with a module.

In the case of the example of FIG. 61, the video module 1311 is a combination of components having functions related to image processing, and includes an application processor 1331, a video processor 1332, a broadband modem 1333, and a radio frequency (RF) module 1334.

A processor is one in which a configuration having a predetermined function is integrated into a semiconductor chip through System On a Chip (SoC), and also refers to, for example, a system LSI or the like. The configuration having the predetermined function may be a logic circuit (hardware configuration), may be a CPU, a ROM, a RAM, and a program (software configuration) executed using the CPU, the ROM, and the RAM, and may be a combination of a hardware configuration and a software configuration. For example, a processor may include a logic circuit, a CPU, a ROM, a RAM, and the like, some functions may be implemented through the logic circuit (hardware configuration), and the other functions may be implemented through a program (software configuration) executed by the CPU.

The application processor 1331 of FIG. 61 is a processor that executes an application related to image processing. An application executed by the application processor 1331 can not only perform a calculation process but also control components inside and outside the video module 1311 such as the video processor 1332 as necessary in order to implement a predetermined function.

The video processor 1332 is a processor having a function related to image encoding and/or image decoding.

The broadband modem 1333 performs digital modulation on data (digital signal) to be transmitted through wired and/or wireless broadband conmmunication that is performed via broadband line such as the Internet or a public telephone line network and converts the data into an analog signal, or performs demodulation on an analog signal received through the broadband communication and converts the analog signal into data (a digital signal). For example, the broadband modem 1333 processes arbitrary information such as image data processed by the video processor 1332, a stream including encoded image data, an application program, or setting data.

The RF module 1334 is a module that performs a frequency transform process, a modulation/demodulation process, an amplification process, a filtering process, and the like on an RF signal transceived through an antenna. For example, the RF module 1334 performs, for example, frequency transform on a baseband signal generated by the broadband modem 1333, and generates an RF signal. Further, for example, the RF module 1334 performs, for example, frequency transform on an RF signal received through the front end module 1314, and generates a baseband signal.

Further, as indicated by a dotted line 1341 in FIG. 61, the application processor 1331 and the video processor 1332 may be integrated into a single processor.

The external memory 1312 is installed outside the video module 1311, and is a module having a storage device used by the video module 1311. The storage device of the external memory 1312 can be implemented by any physical configuration, but is commonly used to store large capacity data such as image data of frame units, and thus it is desirable to implement the storage device of the external memory 1312 using a relative cheap large-capacity semiconductor memory such as a dynamic random access memory (DRAM).

The power management module 1313 manages and controls power supply to the video module 1311 (the respective components in the video module 1311).

The front end module 1314 is a module that provides a front end function (a circuit of a transceiving end at an antenna side) to the RF module 1334. The front end module 1314 includes, for example, an antenna unit 1351, a filter 1352, and an amplifying unit 1353 as illustrated in FIG. 61.

The antenna unit 1351 includes an antenna that transceives a radio signal and a peripheral configuration of the antenna. The antenna unit 1351 transmits a signal provided from the amplifying unit 1353 as a radio signal, and provides a received radio signal to the filter 1352 as an electrical signal (RF signal). The filter 1352 performs, for example, a filtering process on an RF signal received through the antenna unit 1351, and provides a processed RF signal to the RF module 1334. The amplifying unit 1353 amplifies the RF signal provided from the RF module 1334, and provides the amplified RF signal to the antenna unit 1351.

The connectivity 1321 is a module having a function related to a connection with the outside. A physical configuration of the connectivity 1321 is arbitrary. For example, the connectivity 1321 includes a configuration having a communication function other than a communication standard supported by the broadband modem 1333, an external I/O terminal, or the like.

For example, the connectivity 1321 may include a module having a communication function based on a wireless communication standard such as Bluetooth (a registered trademark), IEEE 802.11 (for example, Wireless Fidelity (Wi-Fi) (a registered trademark)), Near Field Communication (NFC), InfraRed Data Association (IrDA), an antenna that transceives a signal satisfying the standard, or the like. Further, for example, the connectivity 1321 may include a module having a communication function based on a wired communication standard such as Universal Serial Bus (USB), or High-Definition Multimedia Interface (HDMI) (a registered trademark) or a terminal that satisfies the standard. Furthermore, for example, the connectivity 1321 may include any other data (signal) transmission function or the like such as an analog I/O terminal.

Further, the connectivity 1321 may include a device of a transmission destination of data (signal). For example, the connectivity 1321 may include a drive (including a hard disk, an SSD, a Network Attached Storage (NAS), or the like as well as a drive of a removable medium) that reads/writes data from/in a recording medium such as a magnetic disk, an optical disk, a magneto optical disk, or a semiconductor memory. Furthermore, the connectivity 1321 may include an output device (a monitor, a speaker, or the like) that outputs an image or a sound.

The camera 1322 is a module having a function of photographing a subject and obtaining image data of the subject. For example, image data obtained by the photographing of the camera 1322 is provided to and encoded by the video processor 1332.

The sensor 1323 is a module having an arbitrary sensor function such as a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, an inclination sensor, a magnetic identification sensor, a shock sensor, or a temperature sensor. For example, data detected by the sensor 1323 is provided to the application processor 1331 and used by an application or the like.

A configuration described above as a module may be implemented as a processor, and a configuration described as a processor may be implemented as a module.

In the video set 1300 having the above configuration, the present technology can be applied to the video processor 1332 as will be described later. Thus, the video set 1300 can be implemented as a set to which the present technology is applied.

Exemplary Configuration of Video Processor

Figure 62:
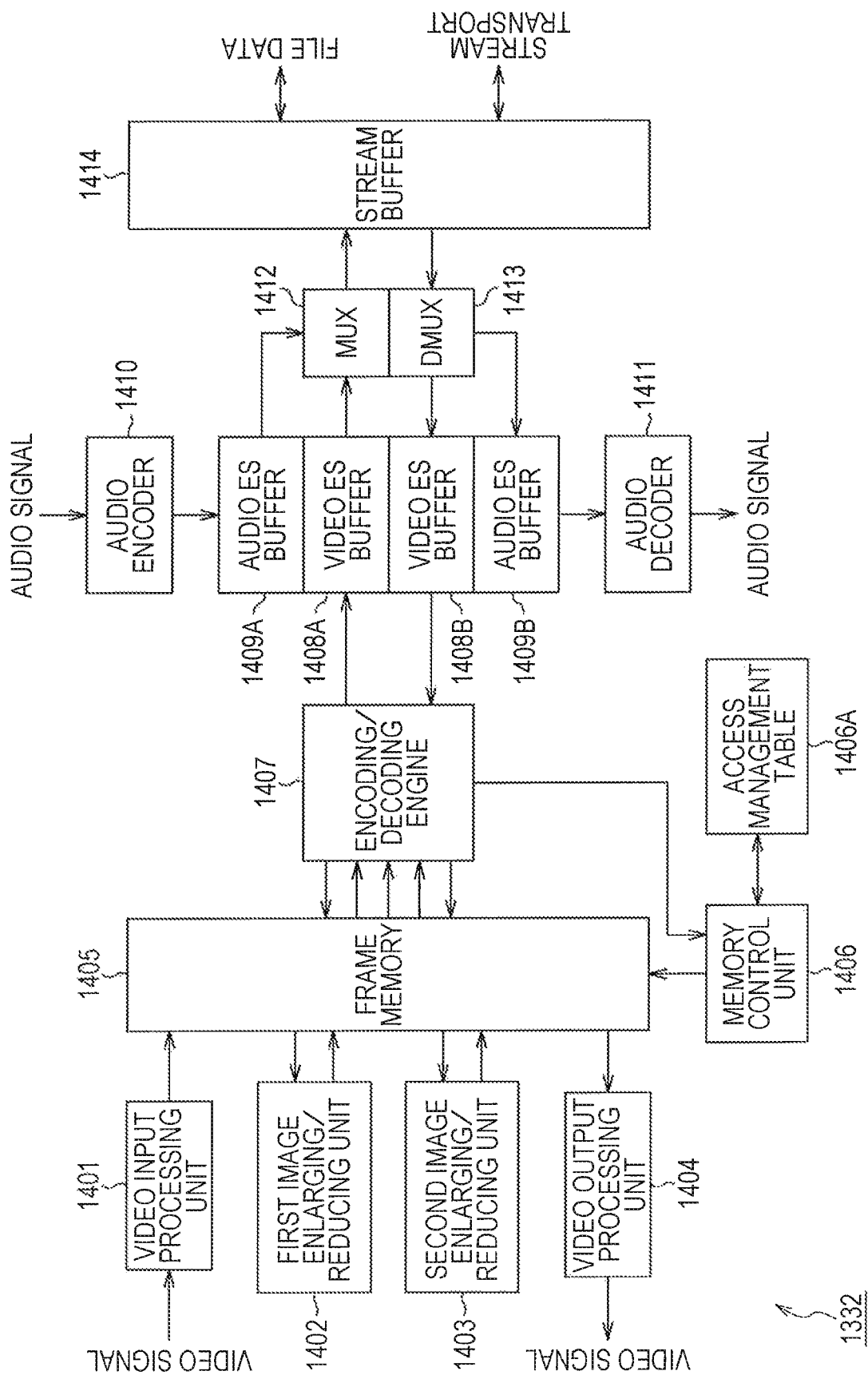
FIG. 62 is a block diagram illustrating an exemplary schematic configuration of a video processor.

FIG. 62 illustrates an exemplary schematic configuration of the video processor 1332 (FIG. 61) to which the present technology is applied.

In the case of the example of FIG. 62, the video processor 1332 has a function of receiving an input of a video signal and an audio signal and encoding the video signal and the audio signal according to a predetermined scheme and a function of decoding encoded video data and audio data, and reproducing and outputting a video signal and an audio signal.

The video processor 1332 includes a video input processing unit 1401, a first image enlarging/reducing unit 1402, a second image enlarging/reducing unit 1403, a video output processing unit 1404, a frame memory 1405, and a memory control unit 1406 as illustrated in FIG. 62. The video processor 1332 further includes an encoding/decoding engine 1407, video elementary stream (ES) buffers 1408A and 1408B, and audio ES buffers 1409A and 1409B. The video processor 1332 further includes an audio encoder 1410, an audio decoder 1411, a multiplexer (multiplexer (MUX)) 1412, a demultiplexer (demultiplexer (DMUX)) 1413, and a stream buffer 1414.

For example, the video input processing unit 1401 acquires a video signal input from the connectivity 1321 (FIG. 61) or the like, and converts the video signal into digital image data. The first image enlarging/reducing unit 1402 performs, for example, a format conversion process and an image enlargement/reduction process on the image data. The second image enlarging/reducing unit 1403 performs an image enlargement/reduction process on the image data according to a format of a destination to which the image data is output through the video output processing unit 1404 or performs the format conversion process and the image enlargement/reduction process which are identical to those of the first image enlarging/reducing unit 1402 on the image data. The video output processing unit 1404 performs format conversion and conversion into an analog signal on the image data, and outputs a reproduced video signal to, for example, the connectivity 1321 (FIG. 61) or the like.

The frame memory 1405 is an image data memory that is shared by the video input processing unit 1401, the first image enlarging/reducing unit 1402, the second image enlarging/reducing unit 1403, the video output processing unit 1404, and the encoding/decoding engine 1407. The frame memory 1405 is implemented as, for example, a semiconductor memory such as a DPRAM.

The memory control unit 1406 receives a synchronous signal from the encoding/decoding engine 1407, and controls writing/reading access to the frame memory 1405 according to an access schedule for the frame memory 1405 written in an access management table 1406A. The access management table 1406A is updated through the memory control unit 1406 according to processing executed by the encoding/decoding engine 1407, the first image enlarging/reducing unit 1402, the second image enlarging/reducing unit 1403, or the like.

The encoding/decoding engine 1407 performs an encoding process of encoding image data and a decoding process of decoding a video stream that is data obtained by encoding image data. For example, the encoding/decoding engine 1407 encodes image data read from the frame memory 1405, and sequentially writes the encoded image data in the video ES buffer 1408A as a video stream. Further, for example, the encoding/decoding engine 1407 sequentially reads the video stream from the video ES buffer 1408B, sequentially decodes the video stream, and sequentially writes the decoded image data in the frame memory 1405. The encoding/decoding engine 1407 uses the frame memory 1405 as a working area at the time of the encoding or the decoding. Further, the encoding/decoding engine 1407 outputs the synchronous signal to the memory control unit 1406, for example, at a timing at which processing of each macroblock starts.

The video ES buffer 1408A buffers the video stream generated by the encoding/decoding engine 1407, and then provides the video stream to the multiplexer (MUX) 1412. The video ES buffer 1408B buffers the video stream provided from the demultiplexer (DMUX) 1413, and then provides the video stream to the encoding/decoding engine 1407.

The audio ES buffer 1409A buffers an audio stream generated by the audio encoder 1410, and then provides the audio stream to the multiplexer (MUX) 1412. The audio ES buffer 1409B buffers an audio stream provided from the demultiplexer (DMUX) 1413, and then provides the audio stream to the audio decoder 1411.

For example, the audio encoder 1410 converts an audio signal input from, for example, the connectivity 1321 (FIG. 61) or the like into a digital signal, and encodes the digital signal according to a predetermined scheme such as an MPEG audio scheme or an AudioCode number 3 (AC3) scheme. The audio encoder 1410 sequentially writes the audio stream that is data obtained by encoding the audio signal in the audio ES buffer 1409A. The audio decoder 1411 decodes the audio stream provided from the audio ES buffer 1409B, performs, for example, conversion into an analog signal, and provides a reproduced audio signal to, for example, the connectivity 1321 (FIG. 61) or the like.

The multiplexer (MUX) 1412 performs multiplexing of the video stream and the audio stream. A multiplexing method (that is, a format of a bitstream generated by multiplexing) is arbitrary. Further, at the time of multiplexing, the multiplexer (MUX) 1412 may add predetermined header information or the like to the bitstream. In other words, the multiplexer (MUX) 1412 may convert a stream format by multiplexing. For example, the multiplexer (MUX) 1412 multiplexes the video stream and the audio stream to be converted into a transport stream that is a bitstream of a transfer format. Further, for example, the multiplexer (MUX) 1.412 multiplexes the video stream and the audio stream to be converted into data (file data) of a recording file format.

The demultiplexer (DMUX) 1413 demultiplexes the bitstream obtained by multiplexing the video stream and the audio stream by a method corresponding to the multiplexing performed by the multiplexer (MUX) 1412. In other words, the demultiplexer (DMUX) 1413 extracts the video stream and the audio stream (separates the video stream and the audio stream) from the bitstream read from the stream buffer 1414. In other words, the demultiplexer (DMUX) 1413 can perform conversion (inverse conversion of conversion performed by the multiplexer (MUX) 1412) of a format of a stream through the demultiplexing. For example, the demultiplexer (DMUX) 1413 can acquire the transport stream provided from, for example, the connectivity 1321 or the broadband modem 1333 (both FIG. 61) through the stream buffer 1414 and convert the transport stream into a video stream and an audio stream through the demultiplexing. Further, for example, the demultiplexer (DMUX) 1.413 can acquire file data read from various kinds of recording media by, for example, the connectivity 1321 (FIG. 61) through the stream buffer 1414 and converts the file data into a video stream and an audio stream by the demultiplexing.

The stream buffer 1414 buffers the bitstream. For example, the stream buffer 1414 buffers the transport stream provided from the multiplexer (MUX) 1412, and provides the transport stream to, for example, the connectivity 1321 or the broadband modem 1333 (both FIG. 61) at a predetermined timing or based on an external request or the like.

Further, for example, the stream buffer 1414 buffers file data provided from the multiplexer (MUX) 1412, provides the file data to, for example, the connectivity 1321 (FIG. 61) or the like at a predetermined timing or based on an external request or the like, and causes the file data to be recorded in various kinds of recording media.

Furthermore, the stream buffer 1414 buffers the transport stream acquired through, for example, the connectivity 1321 or the broadband modem 1333 (both FIG. 61), and provides the transport stream to the demultiplexer (DMUX) 1413 at a predetermined timing or based on an external request or the like.

Further, the stream buffer 1414 buffers file data read from various kinds of recording media in, for example, the connectivity 1321 (FIG. 61) or the like, and provides the file data to the demultiplexer (DMUX) 1413 at a predetermined timing or based on an external request or the like.

Next, an operation of the video processor 1332 having the above configuration will be described. The video signal input to the video processor 1332, for example, from the connectivity 1321 (FIG. 61) or the like is converted into digital image data according to a predetermined scheme such as a 4:2:2Y/Cb/Cr scheme in the video input processing unit 1401 and sequentially written in the frame memory 1405. The digital image data is read out to the first image enlarging/reducing unit 1402 or the second image enlarging/reducing unit 1403, subjected to a format conversion process of performing a format conversion into a predetermined scheme such as a 4:2:0Y/Cb/Cr scheme and an enlargement/reduction process, and written in the frame memory 1405 again. The image data is encoded by the encoding/decoding engine 1407, and written in the video ES buffer 1408A as a video stream.

Further, an audio signal input to the video processor 1332 from the connectivity 1321 (FIG. 61) or the like is encoded by the audio encoder 1410, and written in the audio ES buffer 1409A as an audio stream.

The video stream of the video ES buffer 1408A and the audio stream of the audio ES buffer 1409A are read out to and multiplexed by the multiplexer (MUX) 1412, and converted into a transport stream, file data, or the like. The transport stream generated by the multiplexer (MUX) 1412 is buffered in the stream buffer 1414, and then output to an external network through, for example, the connectivity 1321 or the broadband modem 1333 (both FIG. 61). Further, the file data generated by the multiplexer (MUX) 1412 is buffered in the stream buffer 1414, then output to, for example, the connectivity 1321 (FIG. 61) or the like, and recorded in various kinds of recording media.

Further, the transport stream input to the video processor 1332 from an external network through, for example, the connectivity 1321 or the broadband modem 1333 (both FIG. 61) is buffered in the stream buffer 1414 and then demultiplexed by the demultiplexer (DMUX) 1413. Further, the file data that is read from various kinds of recording media in, for example, the connectivity 1321 (FIG. 61) or the like and then input to the video processor 1332 is buffered in the stream buffer 1414 and then demultiplexed by the demultiplexer (DMUX) 1413. In other words, the transport stream or the file data input to the video processor 1332 is demultiplexed into the video stream and the audio stream through the demultiplexer (DMUX) 1413.

The audio stream is provided to the audio decoder 1411 through the audio ES buffer 1409B and decoded, and so an audio signal is reproduced. Further, the video stream is written in the video ES buffer 1408B, sequentially read out to and decoded by the encoding/decoding engine 1407, and written in the frame memory 1405. The decoded image data is subjected to the enlargement/reduction process performed by the second image enlarging/reducing unit 1403, and written in the frame memory 1405. Then, the decoded image data is read out to the video output processing unit 1404, subjected to the format conversion process of performing format conversion to a predetermined scheme such as a 4:2:2Y/Cb/Cr scheme, and converted into an analog signal, and so a video signal is reproduced.

When the present technology is applied to the video processor 1332 having the above configuration, it is preferable that the above embodiments of the present technology be applied to the encoding/decoding engine 1407. In other words, for example, the encoding/decoding engine 1407 preferably has the functions of the image coding device and the image decoding device according to the embodiments. Accordingly, the video processor 1332 can obtain the same effects as the effects described above with reference to FIGS. 1 to 43.

Further, in the encoding/decoding engine 1407, the present technology (that is, the functions of the image encoding devices or the image decoding devices according to the above embodiment) may be implemented by either or both of hardware such as a logic circuit or software such as an embedded program.

<Another Exemplary Configuration of Video Processor>

Figure 63:
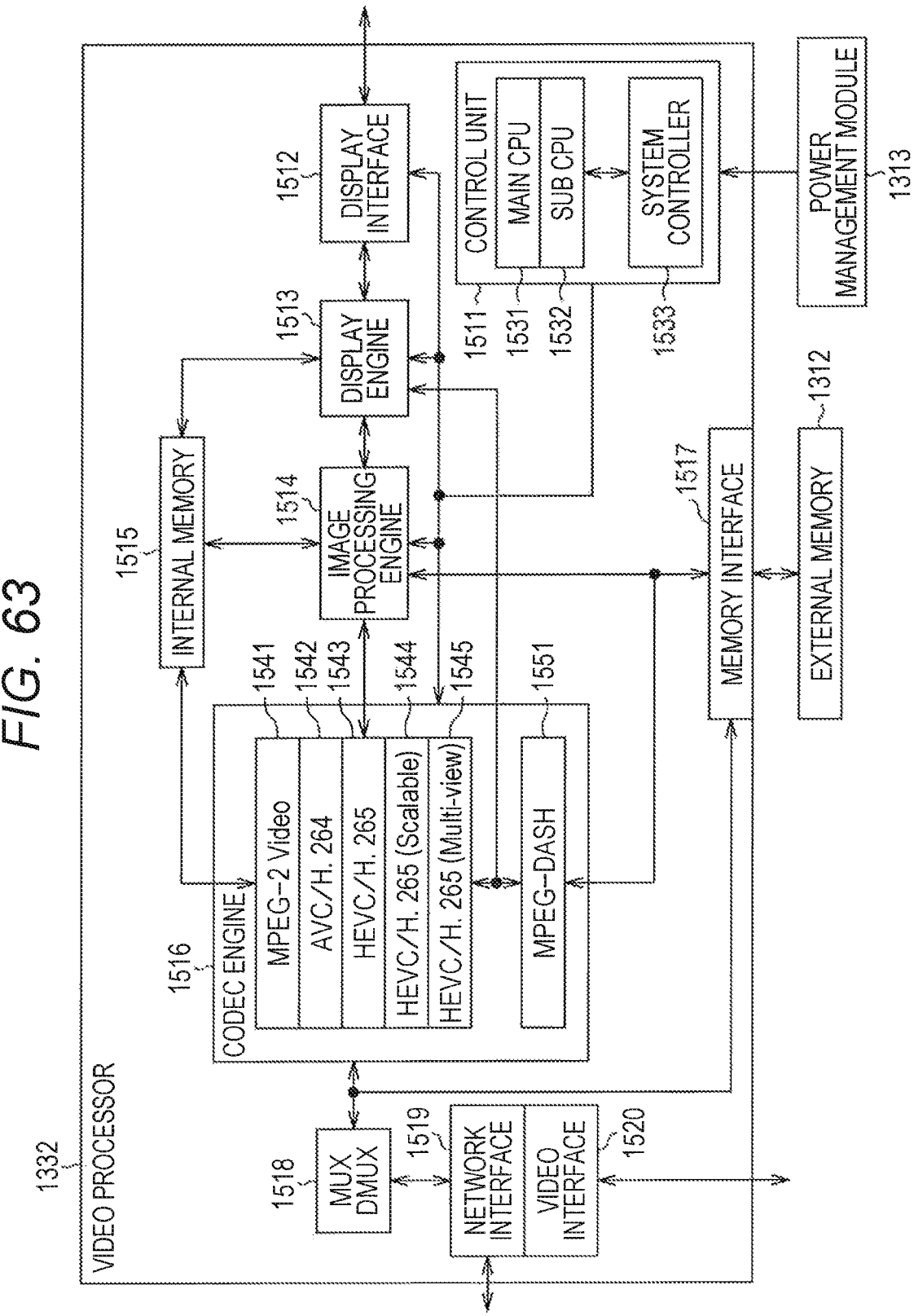
FIG. 63 is a block diagram illustrating another exemplary schematic configuration of a video processor.

FIG. 63 illustrates another exemplary schematic configuration of the video processor 1332 (FIG. 61) to which the present technology is applied. In the case of the example of FIG. 63, the video processor 1332 has a function of encoding and decoding video data according to a predetermined scheme.

More specifically, the video processor 1332 includes a control unit 1511, a display interface 1512, a display engine 1513, an image processing engine 1514, and an internal memory 1515 as illustrated in FIG. 63. The video processor 1332 further includes a codec engine 1516, a memory interface 1517, a multiplexer/demultiplexer (MUX DMUX) 1518, a network interface 1519, and a video interface 1520.

The control unit 1511 controls an operation of each processing unit in the video processor 1332 such as the display interface 1512, the display engine 1513, the image processing engine 1514, and the codec engine 1516.

The control unit 1511 includes, for example, a main CPU 1531, a sub CPU 1532, and a system controller 1533 as illustrated in FIG. 63. The main CPU 1531 executes, for example, a program for controlling an operation of each processing unit in the video processor 1332. The main CPU 1531 generates a control signal, for example, according to the program, and provides the control signal to each processing unit (that is, controls an operation of each processing unit). The sub CPU 1532 plays a supplementary role of the main CPU 1531. For example, the sub CPU 1532 executes a child process or a subroutine of a program executed by the main CPU 1531. The system controller 1533 controls operations of the main CPU 1531 and the sub CPU 1532, for example, designates a program executed by the main CPU 1531 and the sub CPU 1532.

The display interface 1512 outputs image data to, for example, the connectivity 1321 (FIG. 61) or the like under control of the control unit 1511. For example, the display interface 1512 converts image data of digital data into an analog signal, and outputs the analog signal to, for example, the monitor device of the connectivity 1321 (FIG. 61) as a reproduced video signal or outputs the image data of the digital data to, for example, the monitor device of the connectivity 1321 (FIG. 61).

The display engine 1513 performs various kinds of conversion processes such as a format conversion process, a size conversion process, and a color gamut conversion process on the image data under control of the control unit 1511 to comply with, for example, a hardware specification of the monitor device that displays the image.

The image processing engine 1514 performs predetermined image processing such as a filtering process for improving an image quality on the image data under control of the control unit 1511.

The internal memory 1515 is a memory that is installed in the video processor 1332 and shared by the display engine 1513, the image processing engine 1514, and the codec engine 1516. The internal memory 1515 is used for data transfer performed among, for example, the display engine 1513, the image processing engine 1514, and the codec engine 1516. For example, the internal memory 1515 stores data provided from the display engine 1513, the image processing engine 1514, or the codec engine 1516, and provides the data to the display engine 1513, the image processing engine 1514, or the codec engine 1516 as necessary (for example, according to a request). The internal memory 1515 can be implemented by any storage device, but since the internal memory 1515 is mostly used for storage of small-capacity data such as image data of block units or parameters, it is desirable to implement the internal memory 1515 using a semiconductor memory that is relatively small in capacity (for example, compared to the external memory 1312) and fast in response speed such as a static random access memory (SRAM).

The codec engine 1516 performs processing related to encoding and decoding of image data. An encoding/decoding scheme supported by the codec engine 1516 is arbitrary, and one or more schemes may be supported by the codec engine 1516. For example, the codec engine 1516 may have a codec function of supporting a plurality of encoding/ decoding schemes and perform encoding of image data or decoding of encoded data using a scheme selected from among the schemes.

In the example illustrated in FIG. 63, the codec engine 1516 includes, for example, an MPEG-2 Video 1541, an AVC/H.264 1542, a HEVC/H.265 1543, a HEVC/H.265 (Scalable) 1544, a HEVC/H.265 (Multi-view) 1545, and an MPEG-DASH 1551 as functional blocks of processing related to a codec.

The MPEG-2 Video 1541 is a functional block of encoding or decoding image data according to an MPEG-2 scheme. The AVC/H.264 1542 is a functional block of encoding or decoding image data according to an AVC scheme. The HEVC/H.265 1543 is a functional block of encoding or decoding image data according to a HEVC scheme. The HEVC/H.265 (Scalable) 1544 is a functional block of performing scalable encoding or scalable decoding on image data according to a HEVC scheme. The HEVC/ H.265 (Multi-view) 1545 is a functional block of performing multi-view encoding or multi-view decoding on image data according to a HEVC scheme.

The MPEG-DAS 1551 is a functional block of transmitting and receiving image data according to an MPEG-Dynamic Adaptive Streaming over HTTP (MPEG-DASH). The MPEG-DASH is a technique of streaming a video using a HyperText Transfer Protocol (HTTP), and has a feature of selecting appropriate one from among a plurality of pieces of encoded data that differ in a previously prepared resolution or the like in units of segments and transmitting a selected one. The MPEG-DASH 1551 performs generation of a stream complying with a standard, transmission control of the stream, and the like, and uses the MPEG-2 Video 1541 to the HEVC/H.265 (Multi-view) 1545 for encoding and decoding of image data.

The memory interface 1517 is an interface for the external memory 1312. Data provided from the image processing engine 1514 or the codec engine 1516 is provided to the external memory 1312 through the memory interface 1517. Further, data read from the external memory 1312 is provided to the video processor 1332 (the image processing engine 1514 or the codec engine 1516) through the memory interface 1517.

The multiplexer/demultiplexer (MUX DMUX) 1518 performs multiplexing and demultiplexing of various kinds of data related to an image such as a bitstream of encoded data, image data, and a video signal. The multiplexing/demultiplexing method is arbitrary. For example, at the time of multiplexing, the multiplexer/demultiplexer (MUX DMUX) 1518 can not only combine a plurality of pieces of data into one but also add predetermined header information or the like to the data. Further, at the time of demultiplexing, the multiplexer/demultiplexer (MUX DMUX) 1518 can not only divide one piece of data into a plurality of pieces of data but also add predetermined header information or the like to each divided data. In other words, the multiplexer/demultiplexer (MUX DMUX) 1518 can convert a data format through multiplexing and demultiplexing. For example, the multiplexer/demultiplexer (MUX DMUX) 1518 can multiplex a bitstream to be converted into a transport stream serving as a bitstream of a transfer format or data (file data) of a recording file format. Of course, inverse conversion can be also performed through demultiplexing.

The network interface 1519 is an interface for, for example, the broadband modem 1333 or the connectivity 1321 (both FIG. 61). The video interface 1520 is an interface for, for example, the connectivity 1321 or the camera 1322 (both FIG. 61).

Next, an exemplary operation of the video processor 1332 will be described. For example, when the transport stream is received from the external network through, for example, the connectivity 1321 or the broadband modem 1333 (both FIG. 61), the transport stream is provided to the multiplexer/demultiplexer (MUX DMUX) 1518 through the network interface 1519, demultiplexed, and then decoded by the codec engine 1516. Image data obtained by the decoding of the codec engine 1516 is subjected to predetermined image processing performed, for example, by the image processing engine 1514, subjected to predetermined conversion performed by the display engine 1513, and provided to, for example, the connectivity 1321 (FIG. 61) or the like through the display interface 1512, and so the image is displayed on the monitor. Further, for example, image data obtained by the decoding of the codec engine 1516 is encoded by the codec engine 1516 again, multiplexed by the multiplexer/demultiplexer (MUX DMUX) 1518 to be converted into file data, output to, for example, the connectivity 1321 (FIG. 61) or the like through the video interface 1520, and then recorded in various kinds of recording media.

Furthermore, for example, file data of encoded data obtained by encoding image data read from a recording medium (not illustrated) through the connectivity 1321 (FIG. 61) or the like is provided to the multiplexer/demultiplexer (MUX DMUX) 1518 through the video interface 1520, and demultiplexed, and decoded by the codec engine 1516. Image data obtained by the decoding of the codec engine 1516 is subjected to predetermined image processing performed by the image processing engine 1514, subjected to predetermined conversion performed by the display engine 1513, and provided to, for example, the connectivity 1321 (FIG. 61) or the like through the display interface 1512, and so the image is displayed on the monitor. Further, for example, image data obtained by the decoding of the codec engine 1516 is encoded by the codec engine 1516 again, multiplexed by the multiplexer/demultiplexer (MUX DMUX) 1518 to be converted into a transport stream, provided to, for example, the connectivity 1321 or the broadband modem 1333 (both FIG. 61) through the network interface 1519, and transmitted to another device (not illustrated).

Further, transfer of image data or other data between the processing units in the video processor 1332 is performed, for example, using the internal memory 1515 or the external memory 1312. Furthermore, the power management module 1313 controls, for example, power supply to the control unit 1511.

When the present technology is applied to the video processor 1332 having the above configuration, it is desirable to apply the above embodiments of the present technology to the codec engine 1516. In other words, for example, it is preferable that the codec engine 1516 have a functional block of implementing the image coding device and the image decoding device according to the embodiments. Furthermore, for example, the video processor 1332 can have the same effects as the effects described above with reference to FIGS. 1 to 43.

Further, in the codec engine 1516, the present technology (that is, the functions of the image encoding devices or the image decoding devices according to the above embodiment) may be implemented by either or both of hardware such as a logic circuit or software such as an embedded program.

The two exemplary configurations of the video processor 1332 have been described above, but the configuration of the video processor 1332 is arbitrary and may have any configuration other than the above two exemplary configurations. Further, the video processor 1332 may be configured with a single semiconductor chip or may be configured with a plurality of semiconductor chips. For example, the video processor 1332 may be configured with a three-dimensionally stacked LSI in which a plurality of semiconductors are stacked. Further, the video processor 1332 may be implemented by a plurality of LSIs.

Application Examples to Devices

The video set 1300 may be incorporated into various kinds of devices that process image data. For example, the video set 1300 may be incorporated into the television device 900 (FIG. 54), the mobile telephone 920 (FIG. 55), the recording/reproducing device 940 (FIG. 56), the imaging device 960 (FIG. 57), or the like. As the video set 1300 is incorporated, the devices can have the same effects as the effects described above with reference to FIGS. 1 to 43.

Further, the video set 1300 may be also incorporated into a terminal device such as the personal computer 1004, the AV device 1005, the tablet device 1006, or the mobile telephone 1007 in the data transmission system 1000 of FIG. 58, the broadcasting station 1101 or the terminal device 1102 in the data transmission system 1100 of FIG. 59, or the imaging device 1201 or the scalable encoded data storage device 1202 in the imaging system 1200 of FIG. 60. As the video set 1300 is incorporated, the devices can have the same effects as the effects described above with reference to FIGS. 1 to 43.

Further, even each component of the video set 1300 can be implemented as a component to which the present technology is applied when the component includes the video processor 1332. For example, only the video processor 1332 can be implemented as a video processor to which the present technology is applied. Further, for example, the processors indicated by the dotted line 1341 as described above, the video module 1311, or the like can be implemented as, for example, a processor or a module to which the present technology is applied. Further, for example, a combination of the video module 1311, the external memory 1312, the power management module 1313, and the front end module 1314 can be implemented as a video unit 1361 to which the present technology is applied. These configurations can have the same effects as the effects described above with reference to FIGS. 1 to 43.

In other words, a configuration including the video processor 1332 can be incorporated into various kinds of devices that process image data, similarly to the case of the video set 1300. For example, the video processor 1332, the processors indicated by the dotted line 1341, the video module 1311, or the video unit 1361 can be incorporated into the television device 900 (FIG. 54), the mobile telephone 920 (FIG. 55), the recording/reproducing device 940 (FIG. 56), the imaging device 960 (FIG. 57), the terminal device such as the personal computer 1004, the AV device 1005, the tablet device 1006, or the mobile telephone 1007 in the data transmission system 1000 of FIG. 58, the broadcasting station 1101 or the terminal device 1102 in the data transmission system 1100 of FIG. 59, the imaging device 1201 or the scalable encoded data storage device 1202 in the imaging system 1200 of FIG. 60, or the like. Further, as the configuration to which the present technology is applied, the devices can have the same effects as the effects described above with reference to FIGS. 1 to 43, similarly to the video set 1300.

11. Ninth Embodiment

Application Example of MPEG-DASH

The present technology can be also applied to a system of selecting an appropriate data from among a plurality of pieces of encoded data having different resolutions that are prepared in advance in units of segments and using the selected data, for example, a content reproducing system of HTTP streaming or a wireless communication system of the Wi-Fi standard such as MPEG DASH which will be described later.

<Overview of Content Reproducing System>

First, a content reproducing system to which the present technology is applicable will be schematically described with reference to FIGS. 64 to 66.

A basic configuration that is common in the embodiments will be described below with reference to FIGS. 64 and 65.

Figure 64:
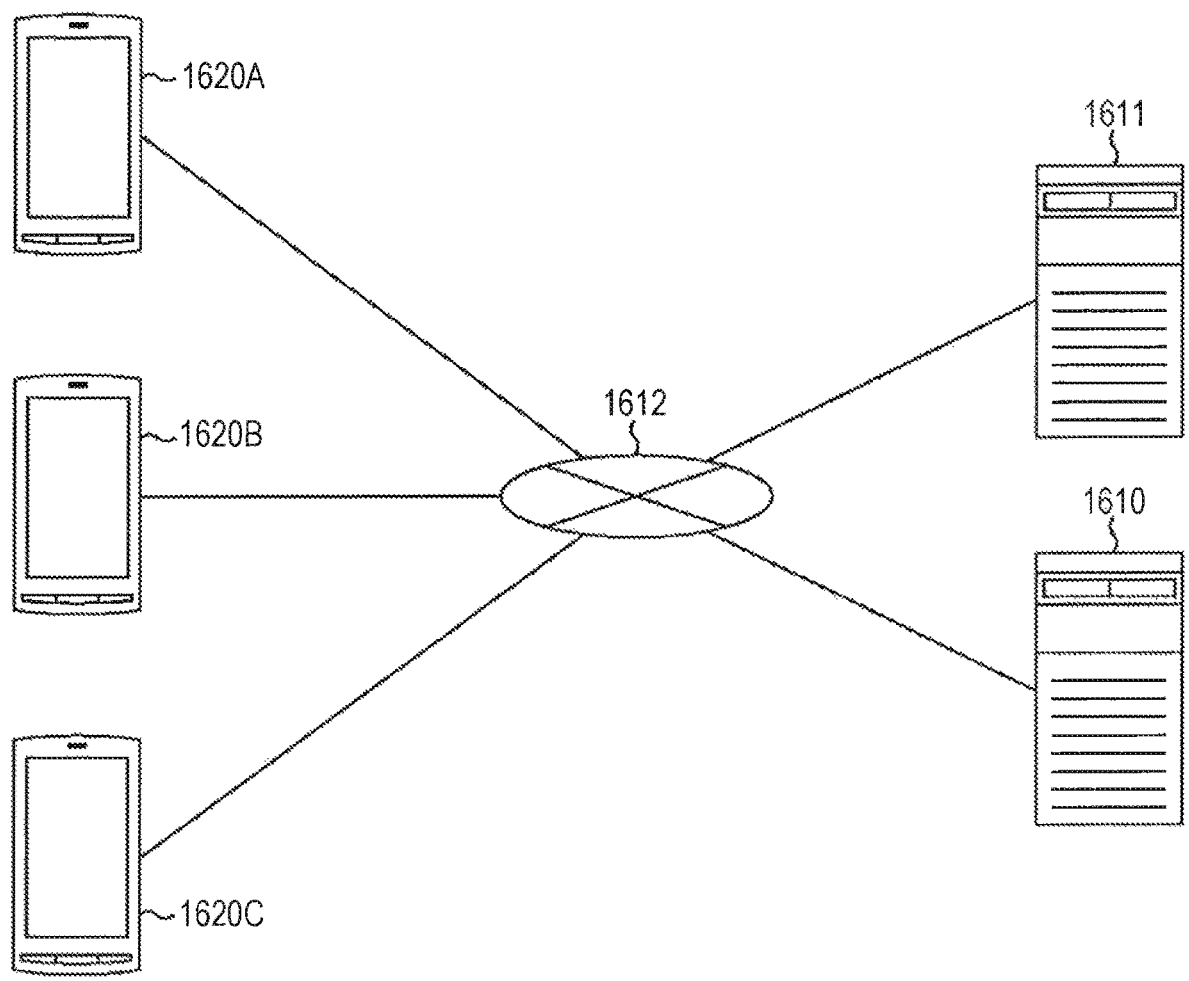
FIG. 64 is an explanatory diagram illustrating a configuration of a content reproducing system.

FIG. 64 is an explanatory diagram illustrating a configuration of a content reproducing system. The content reproducing system includes content servers 1610 and 1611, a network 1612, and a content reproducing device 1620 (a client device) as illustrated in FIG. 64.

The content servers 1610 and 1611 are connected with the content reproducing device 1620 via the network 1612. The network 1612 is a wired or wireless transmission path of information transmitted from a device connected to the network 1612.

For example, the network 1612 may include a public line network such as the Internet, a telephone line network, or a satellite communication network, various kinds of LANs such as the Ethernet (a registered trademark), a wide area network (WAN), or the like. Further, the network 1612 may include a dedicated line network such as an Internet protocol-virtual private network (IP-VPN).

The content server 1610 encodes content data, and generates and stores a data file including meta information of encoded data and encoded data. When the content server 1610 generates a data file of an MP4 format, encoded data corresponds to "mdat," and meta information corresponds to "moov."

Further, content data may be music data such as music, a lecture, or a radio program, video data such as a movie, a television program, a video program, a photograph, a document, a painting, and a graph, a game, software, or the like.

Here, the content server 1610 generates a plurality of data files for the same content at different bit rates. Further, in response to a content reproduction request received from the content reproducing device 1620, the content server 1611 includes information of a parameter added to a corresponding URL by the content reproducing device 1620 in a URL information of the content server 1610, and transmits the resultant information to the content reproducing device 1620. The details will be described below with reference to FIG. 65.

Figure 65:
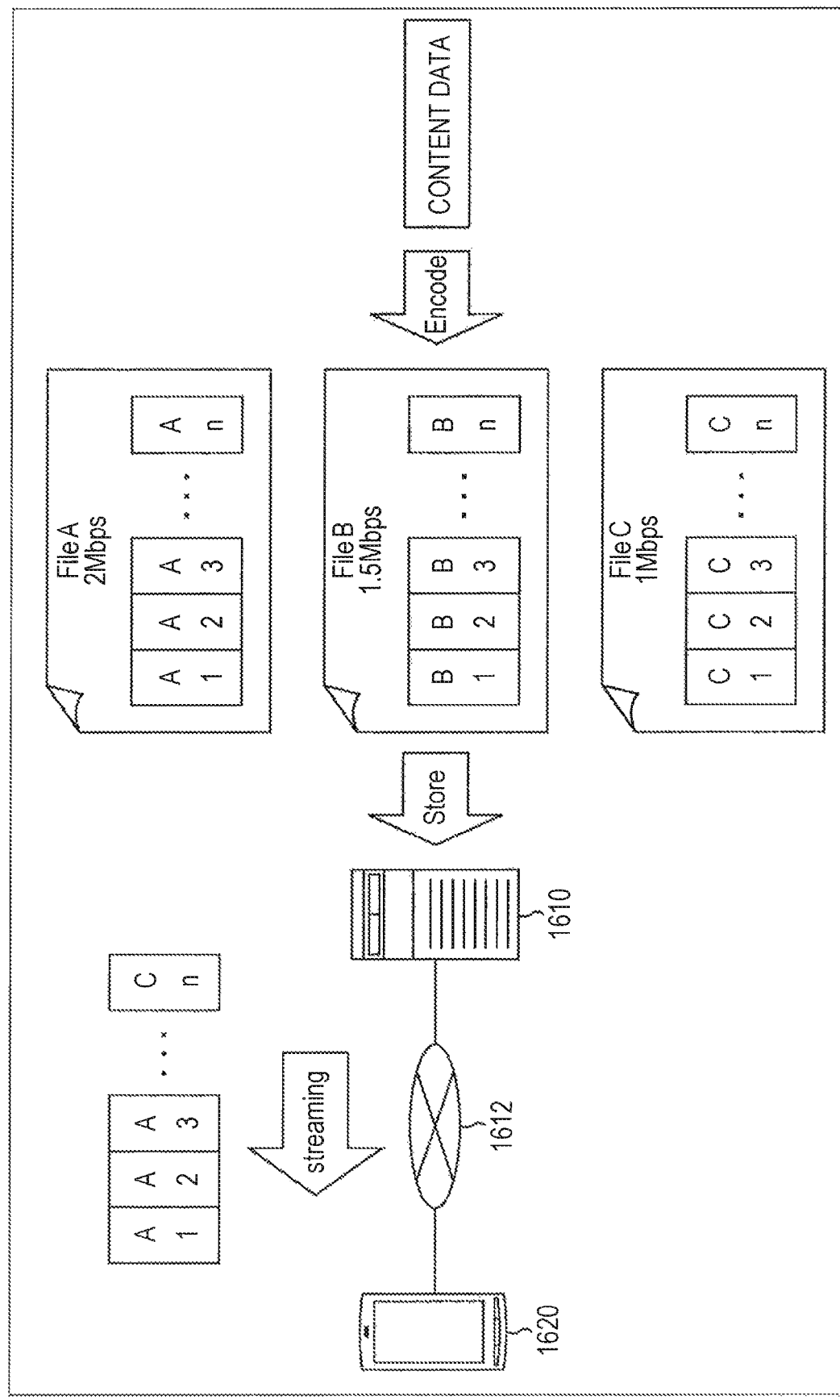
FIG. 65 is an explanatory diagram illustrating a data flow in a content reproducing system.

FIG. 65 is an explanatory diagram illustrating a data flow in the content reproducing system of FIG. 64. The content server 1610 encodes the same content data at different bit rates, and generates, for example, a file A of 2 Mbps, a file B of 1.5 Mbps, and a file C of 1 Mbps as illustrated in FIG. 65. Relatively, the file A is a high bit rate, the file B is a standard bit rate, and the file C is a low bit rate.

Further, encoded data of each file is divided into a plurality of segments as illustrated in FIG. 65. For example, encoded data of the file A is divided into segments such as "A1," "A2," "A3," ..., and "An," encoded data of the file B is divided into segments such as "B1," "B2," "B3," ..., and "Bn," and encoded data of the file C is divided into segments such as "C1," "C2," "C3," ..., and "Cn."

Further, each segment may be configured with a configuration sample rather than one or more pieces of encoded video data and encoded audio data that starts from a sink sample of MP4 (for example, an IDR-picture in video coding of AVC/H.264) and is independently reproducible. For example, when video data of 30 frames per second is encoded by a GOP having a fixed length of frames, each segment may be encoded video and audio data of 2 seconds corresponding to 4 GOPs or may be encoded video and audio data of 10 seconds corresponding to 20 GOPs.

Further, segments that are the same in an arrangement order in each file have the same reproduction ranges (ranges of a time position from the head of content). For example, the reproduction ranges of the segment "A2," the segment "B2," and the segment "C2" are the same, and when each segment is encoded data of 2 seconds, the reproduction ranges of the segment "A2," the segment "B2," and the segment "C2" are 2 to 4 seconds of content.

When the file A to the file C configured with a plurality of segments are generated, the content server 1610 stores the file A to the file C. Further, as illustrated in FIG. 65, the content server 1610 sequentially transmits segments configuring different files to the content reproducing device 1620, and the content reproducing device 1620 performs streaming reproduction on the received segments.

Here, the content server 1610 according to the present embodiment transmits a play list file (hereinafter, a "media presentation description (MPD)") including bit rate information and access information of each encoded data to the content reproducing device 1620, and the content reproducing device 1620 selects any of a plurality of bit rates based on the MPD, and requests the content server 1610 to transmit a segment corresponding to the selected bit rate.

FIG. 64 illustrates only one content server 1610, but the present disclosure is not limited to this example.

FIG. 66 is an explanatory diagram illustrating a specific example of the MPD. The MPD includes access information related to a plurality of pieces of encoded data having different bit rates (bandwidths) as illustrated in FIG. 66. For example, the MPD illustrated in FIG. 66 indicates that there are encoded data of 256 Kbps, encoded data of 1.024 Mbps, encoded data of 1.384 Mbps, encoded data of 1.536 Mbps, and encoded data 2.048 Mbps, and includes access information related to each encoded data. The content reproducing device 1620 can dynamically change a bit rate of encoded data that is subjected to streaming reproduction based on the MPD.

Further, FIG. 64 illustrates a mobile terminal as an example of the content reproducing device 1620, but the content reproducing device 1620 is not limited to this example. For example, the content reproducing device 1620 may be an information processing device such as a personal computer (PC), a home video processing device (a DVD recorder, a video cassette recorder (VCR)), a personal digital assistants (PDA), a home-use game machine, or a household electric appliance. Further, the content reproducing device 1620 may be an information processing device such as a mobile telephone, a personal handyphone system (PHS), a portable music player, a portable video processing device, or a portable game machine.

<Configuration of Content Server 1610>

The overview of the content reproducing system has been described above with reference to FIGS. 64 to 66. Next, a configuration of the content server 1610 will be described with reference to FIG. 67.

Figure 67:
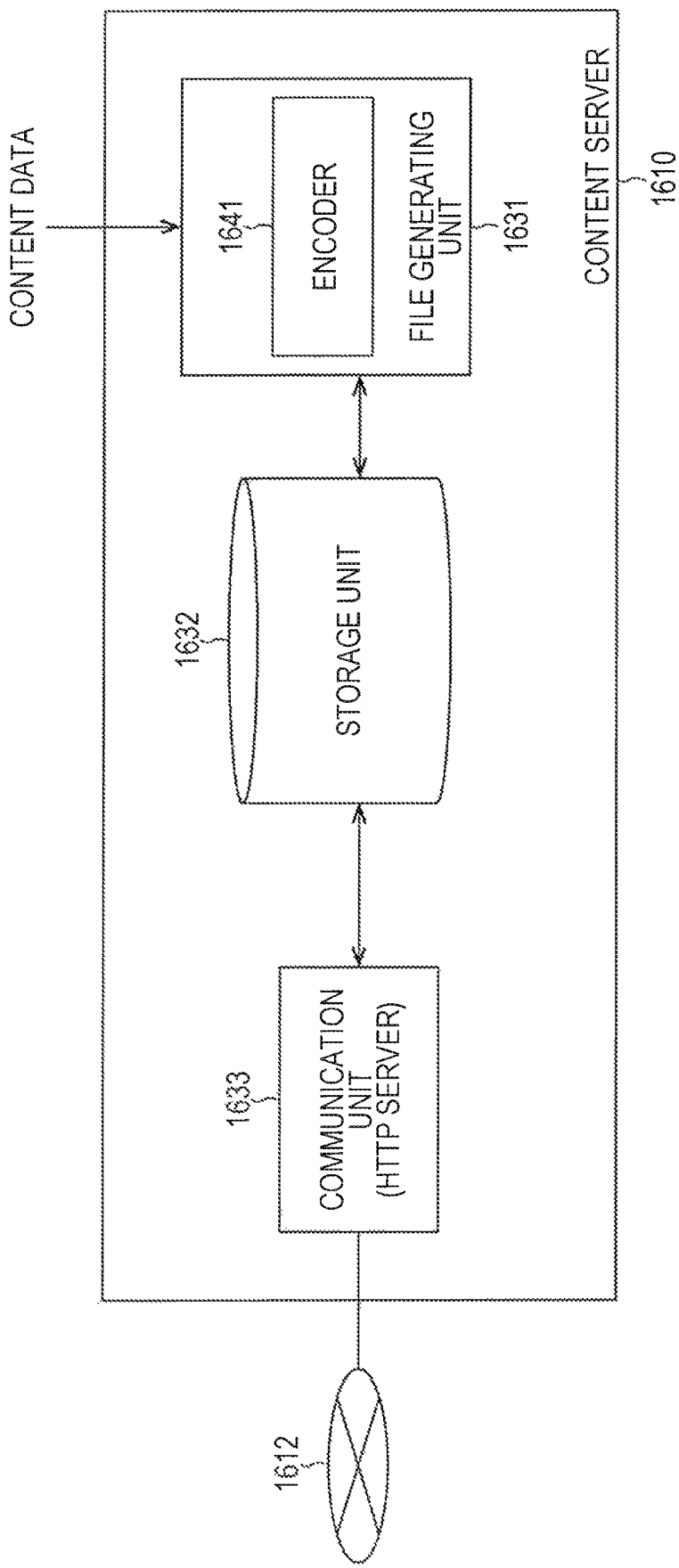
FIG. 67 is a functional block diagram illustrating a configuration of a content server of a content reproducing system.

FIG. 67 is a functional block diagram illustrating a configuration of the content server 1610. The content server 1610 includes a file generating unit 1631, a storage unit 1632, and a communication unit 1633 as illustrated in FIG. 67.

The file generating unit 1631 includes an encoder 1641 that encodes content data, and generates a plurality of pieces of encoded data having different bit rates for the same content and the MPD. For example, when encoded data of 256 Kbps, encoded data of 1.024 Mbps, encoded data of 1.384 Mbps, encoded data of 1.536 Mbps, and encoded data of 2.048 Mbps are generated, the file generating unit 1631 generates the MPD illustrated in FIG. 66.

The storage unit 1632 stores the plurality of pieces of encoded data having different bit rates and the MPD generated by the file generating unit 1631. The storage unit 1632 may be a storage medium such as a non-volatile memory, a magnetic disk, an optical disk, or a magneto optical (MO) disk. Examples of the non-volatile memory include an electrically erasable programmable read-only memory (EEPROM) and an erasable programmable ROM (EPROM). As a magnetic disk, there are a hard disk, a disk type magnetic disk, and the like. Further, as an optical disk, there are a compact disc (CD), a digital versatile disc recordable (DVD-R), a Blu-ray Disc (BD) (a registered trademark), and the like.

The communication unit 1633 is an interface with the content reproducing device 1620, and communicates with the content reproducing device 1620 via the network 1612. In further detail, the communication unit 1633 has a function as a HTTP server communicating with the content reproducing device 1620 according to the HTTP. For example, the communication unit 1633 transmits the MPD to the content reproducing device 1620, extracts encoded data requested based on the MPD from the content reproducing device 1620 according to the HTTP from the storage unit 1632, and transmits the encoded data to the content reproducing device 1620 as a HTTP response.

<Configuration of Content Reproducing Device 1620>

The configuration of the content server 1610 according to the present embodiment has been described above. Next, a configuration of the content reproducing device 1620 will be described with reference to FIG. 68.

Figure 68:
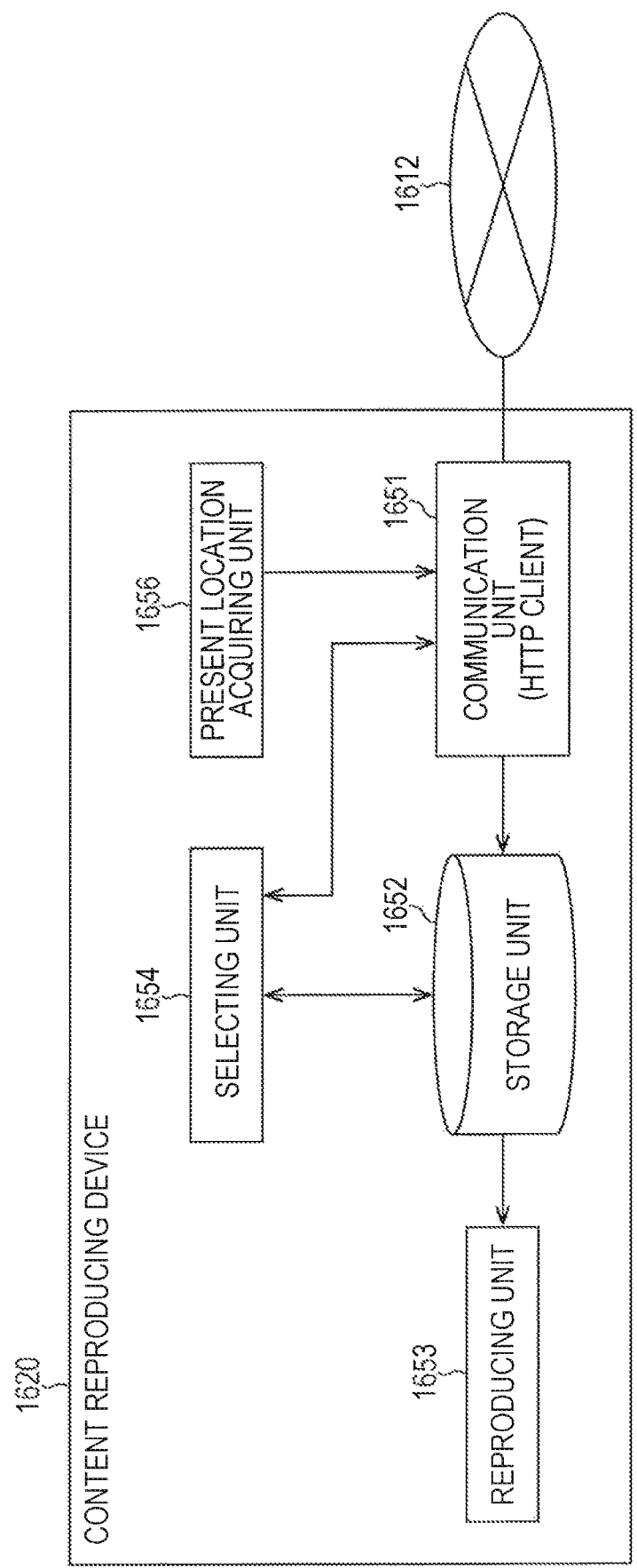
FIG. 68 is a functional block diagram illustrating a configuration of a content reproducing device of a content reproducing system.

FIG. 68 is a functional block diagram illustrating a configuration of the content reproducing device 1620. The content reproducing device 1620 includes a communication unit 1651, a storage unit 1652, a reproducing unit 1653, a selecting unit 1654, and a present location acquiring unit 1656 as illustrated in FIG. 68.

The communication unit 1651 is an interface with the content server 1610, requests the content server 1610 to transmit data, and acquires data from the content server 1610. In further detail, the communication unit 1651 has a function as a HTTP client communicating with the content reproducing device 1620 according to the HTTP. For example, the communication unit 1651 can selectively acquire the MPD and the segments of the encoded data from the content server 1610 using a HTTP range.

The storage unit 1652 stores various kinds of pieces of information related to reproduction of content. For example, the segments acquired from the content server 1610 by the communication unit 1651 are sequentially buffered. The segments of the encoded data buffered in the storage unit 1652 are sequentially supplied to the reproducing unit 1653 in a first in first out (FIFO) manner.

Further, the storage unit 1652 adds a parameter to a URL through the communication unit 1651 based on an instruction to add a parameter to a URL of content that is described in the MPD and requested from the content server 1611 which will be described later, and stores a definition for accessing the URL.

The reproducing unit 1653 sequentially reproduces the segments supplied from the storage unit 1652. Specifically, the reproducing unit 1653 performs segment decoding, DA conversion, rendering, and the like.

The selecting unit 1654 sequentially selects whether or not a segment of encoded data corresponding to any of the bit rates included in the MPD is acquired in the same content. For example, when the selecting unit 1654 sequentially selects the segments "A1," "B2," and "A3" according to the band frequency of the network 1612, the communication unit 1651 sequentially acquires the segments "A1," "B2," and "A3" from the content server 1610 as illustrated in FIG. 65.

The present location acquiring unit 1656 may be configured with a module that acquires a current position of the content reproducing device 1620, for example, acquires a current position of a global positioning system (GPS) receiver or the like. Further, the present location acquiring unit 1656 may acquire a current position of the content reproducing device 1620 using a wireless network.

<Configuration of Content Server 1611>

Figure 69:
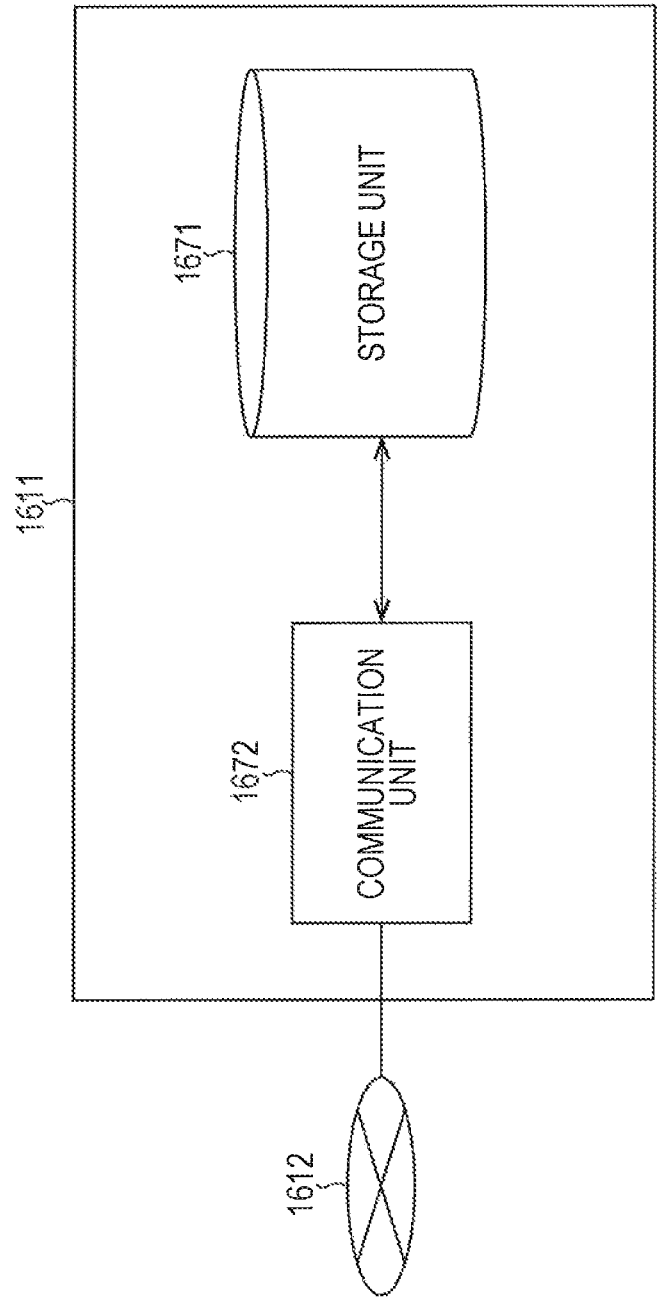
FIG. 69 is a functional block diagram illustrating a configuration of a content server of a content reproducing system.

FIG. 69 is a diagram for describing an exemplary configuration of the content server 1611. The content server 1611 includes a storage unit 1671 and a communication unit 1672 as illustrated in FIG. 69.

The storage unit 1671 stores the URL information of the MPD. The URL information of the MPD is transmitted from the content server 1611 to the content reproducing device 1620 according to the request received from the content reproducing device 1620 that requests reproduction of content. Further, when the URL information of the MPD is provided to the content reproducing device 1620, the storage unit 1671 stores definition information used when the content reproducing device 1620 adds the parameter to the URL described in the MPD.

The communication unit 1672 is an interface with the content reproducing device 1620, and communicates with the content reproducing device 1620 via the network 1612. In other words, the communication unit 1672 receives the request for requesting the URL information of the MPD from the content reproducing device 1620 that requests reproduction of content, and transmits the URL information of the MPD to the content reproducing device 1620. The URL of the MPD transmitted from the communication unit 1672 includes information to which the parameter is added through the content reproducing device 1620.

Various settings can be performed on the parameter to be added to the URL of the MPD through the content reproducing device 1620 based on the definition information shared by the content server 1611 and the content reproducing device 1620. For example, information such as a current position of the content reproducing device 1620, a user ID of the user using the content reproducing device 1620, a memory size of the content reproducing device 1620, and the capacity of a storage of the content reproducing device 1620 may be added to the URL of the MPD through the content reproducing device 1620.

In the content reproducing system having the above configuration, as the present technology described above with reference to FIGS. 1 to 43 is applied, the same effects as the effects described above with reference to FIGS. 1 to 43 can be obtained.

In other words, the encoder 1641 of the content server 1610 has the function of the image coding device according to the above embodiment. Further, the reproducing unit 1653 of the content reproducing device 1620 has the function of the image decoding device according to the above embodiment. Thus, it is possible to suppress an increase in a storage capacity necessary for encoding and decoding.

Further, in the content reproducing system, as data encoded according to the present technology is transmitted and received, it is possible to suppress an increase in a storage capacity necessary for encoding and decoding.

12. Tenth Embodiment

Application Examples of Wireless Communication System of Wi-Fi Standard

A basic operation example of a wireless communication device in the wireless communication system to which the present technology is applicable will be described.

<Basic Operation Example of Wireless Communication Device>

First, wireless packets are transmitted and received until a peer to peer (P2P) connection is established, and a specific application is operated.

Then, before a connection is established through a second layer, wireless packets are transmitted and received until a specific application to be used is designated, then a P2P connection is established, and a specific application is operated. Thereafter, after a connection is established through the second layer, wireless packets for activating a specific application are transmitted and received.

<Example of Communication when Operation of Specific Application Starts>

Figure 70:
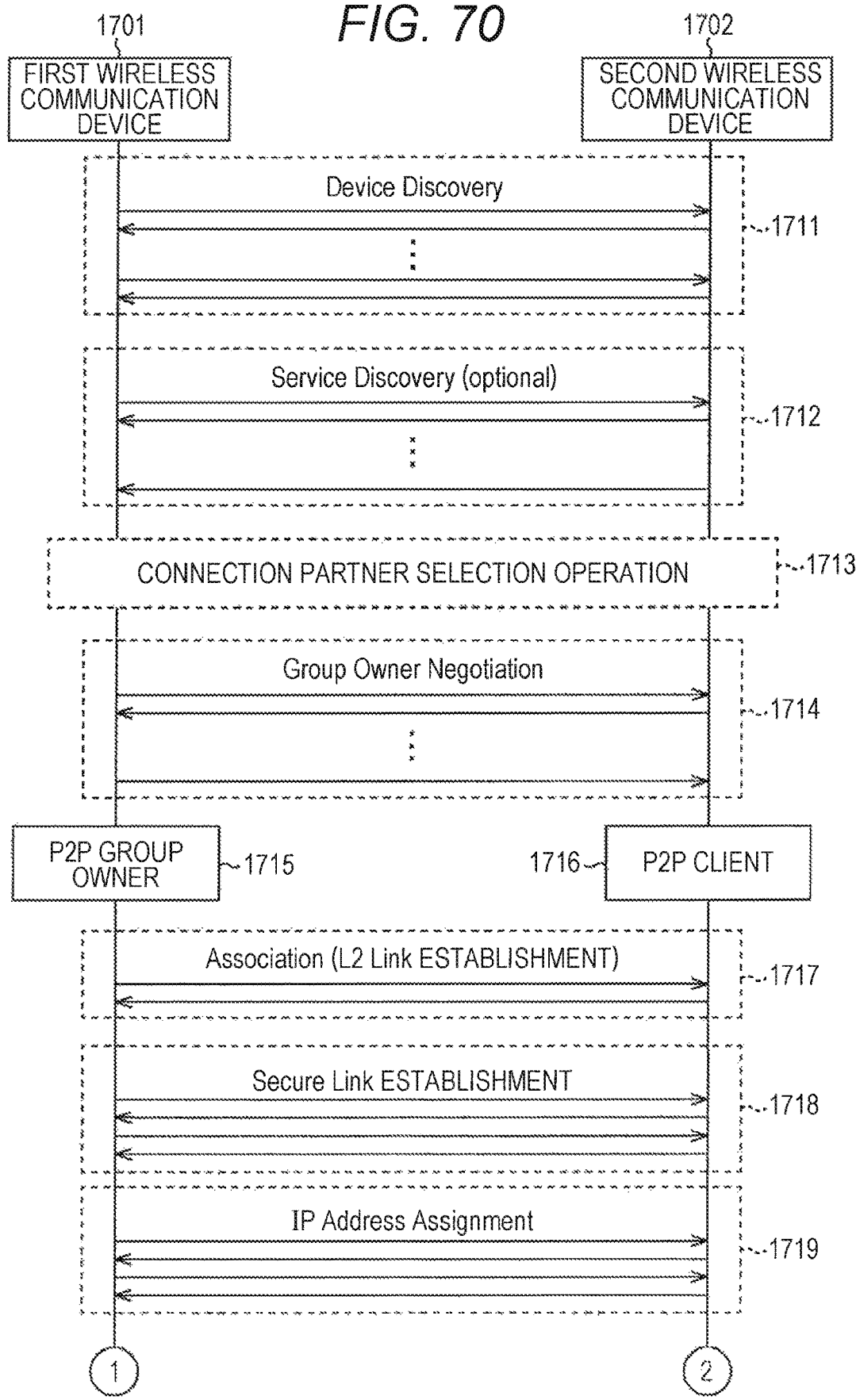
FIG. 70 is a sequence chart illustrating an exemplary communication process performed by devices of a wireless communication system.
Figure 71:
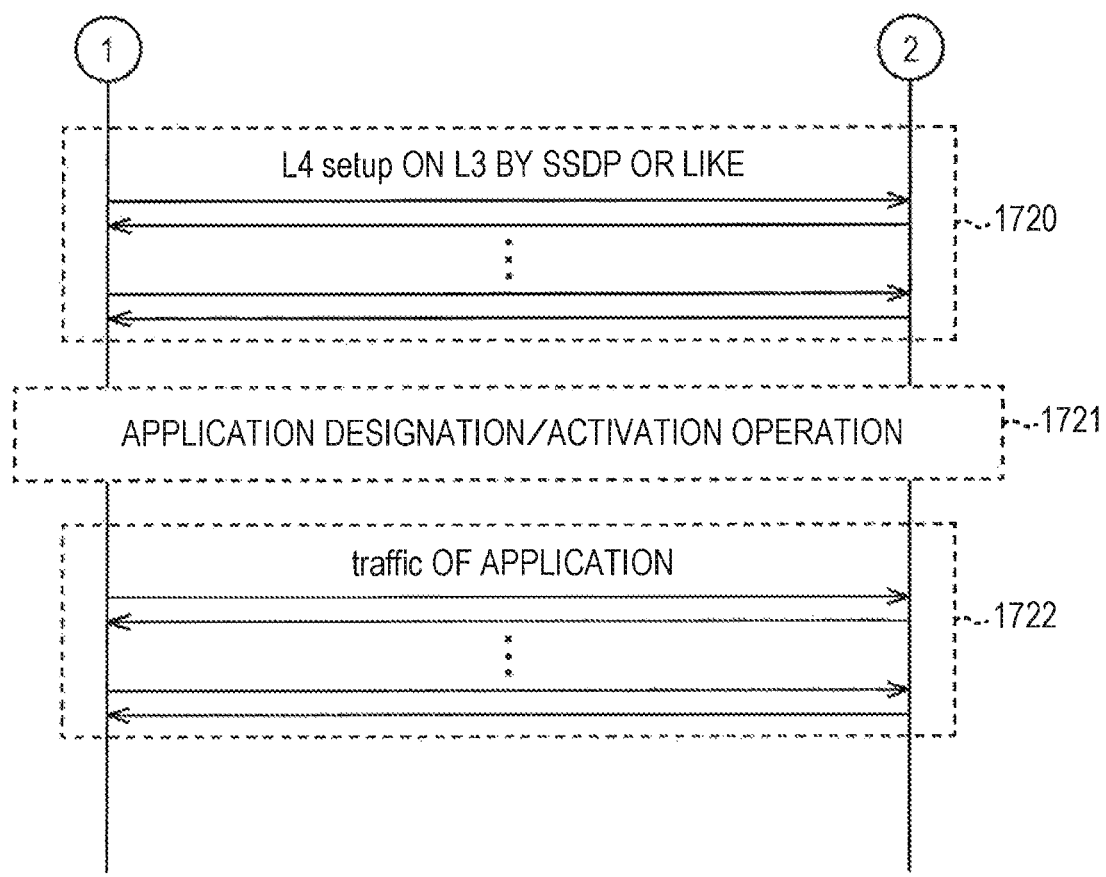
FIG. 71 is a sequence chart illustrating an exemplary communication process performed by devices of a wireless communication system.

FIGS. 70 and 71 are sequence charts illustrating an exemplary communication process by devices serving as the basis of wireless communication as an example of transmission and reception of wireless packets until a P2P connection is established, and a specific application is operated. Specifically, an exemplary direct connection establishment process of establishing a connection in the Wi-Fi direct standard (which is also referred to as "Wi-Fi P2P") standardized in the Wi-Fi Alliance is illustrated.

Here, in the Wi-Fi direct, a plurality of wireless communication devices detect the presence of the wireless communication device of the other party (device discovery and service discovery). Further, when connection device selection is performed, device authentication is performed between the selected devices through Wi-Fi protected setup (WPS), and then a direct connection is established. In the Wi-Fi direct, a plurality of wireless communication devices decide to undertakes a master device (a group owner) or a slave device (a client), and form a communication group.

Here, in this exemplary communication process, transmission and reception of some packets are not illustrated. For example, at the time of a first connection, packet exchange for using a WPS is necessary as described above, and packet exchange is also necessary in exchange of an authentication request/response or the like. However, in FIGS. 70 and 71, such packet exchange is not illustrated, and only a second connection and later are illustrated.

Further, in FIGS. 70 and 71, an exemplary communication process between a first wireless communication device 1701 and a second wireless communication device 1702 is illustrated, but the same applies to a communication process between other wireless communication devices.

First, the device discovery is performed between the first wireless communication device 1701 and the second wireless communication device 1702 (1711). For example, the first wireless communication device 1701 transmits a probe request (a response request signal), and receives a probe response (a response signal) to the probe request from the second wireless communication device 1702. Thus, the first wireless communication device 1701 and the second wireless communication device 1702 can discover the presence of the other party. Further, through the device discovery, it is possible to acquire a device name or a type (a TV, a PC, a smart phone, or the like) of the other party.

Then, the service discovery is performed between the first wireless communication device 1701 and the second wireless communication device 1702 (1712). For example, the first wireless communication device 1701 transmits a service discovery query of querying a service supported by the second wireless communication device 1702 discovered through the device discovery. Then, the first wireless communication device 1701 can acquire a service supported by the second wireless communication device 1702 by receiving a service discovery response from the second wireless communication device 1702. In other words, through the service discovery, it is possible to acquire, for example, a service executable by the other party. For example, the service executable by the other party is a service or a protocol (a digital living network alliance (DLNA), a digital media renderer (DMR), or the like).

Then, the user performs an operation (a connection partner selection operation) of selecting a connection partner (1713). The connection partner selection operation may be performed in only either of the first wireless communication device 1701 and the second wireless communication device 1702. For example, a connection partner selection screen is displayed on a display unit of the first wireless communication device 1701, and the second wireless communication device 1702 is selected on the connection partner selection screen as a connection partner according to the user's operation.

When the user performs the connection partner selection operation (1713), a group owner negotiation is performed between the first wireless communication device 1701 and the second wireless communication device 1702 (1714). In the example illustrated in FIGS. 70 and 71, as a result of the group owner negotiation, the first wireless communication device 1701 becomes a group owner 1715, and the second wireless communication device 1702 becomes a client 1716.

Then, processes (1717 to 1720) are performed between the first wireless communication device 1701 and the second wireless communication device 1702, and thus a direct connection is established. In other words, association (L2 (second layer) link establishment) (1717) and secure link establishment (1718) are sequentially performed. Further, IP address assignment (1719) and L4 setup (1720) on L3 by a simple service discovery protocol (SSDP) are sequentially performed. Further, L2 (layer 2) indicates a second layer (a data link layer), L3 (layer 3) indicates a third layer (a network layer), and L4 (layer 4) indicates a fourth layer (a transport layer).

Then, the user performs a specific application designation operation or an activation operation (an application designation/activation operation) (1721). The application designation/activation operation may be performed in only either of the first wireless communication device 1701 and the second wireless communication device 1702. For example, an application designation/activation operation screen is displayed on a display unit of the first wireless communication device 1701, and a specific application is selected on the application designation/activation operation screen according to the user's operation.

When the user performs the application designation/activation operation (1721), a specific application corresponding to application designation/activation operation is executed between the first wireless communication device 1701 and the second wireless communication device 1702 (1722).

Here, a connection is considered to be performed between access point stations (AP-STAs) within a range of the specification (the specification standardized in IEEE802.11) before the Wi-Fi direct standard. In this case, it is difficult to detect a device to be connected in advance before a connection is established through the second layer (before association is performed in the terminology of IEEE802.11).

On the other hand, as illustrated in FIGS. 70 and 71, in the Wi-Fi direct, when a connection partner candidate is searched for through the device discovery or the service discovery (option), it is possible to acquire information of a connection partner. Examples of the information of the connection partner include a type of a basic device and a supported specific application. Further, it is possible to cause the user to select the connection partner based on the acquired information of the connection partner.

By extending this specification, it is also possible to implement a wireless communication system in which a specific application is designated before a connection is established through the second layer, a connection partner is selected, and the specific application is automatically activated after the selection. An example of a sequence of establishing a connection in this case is illustrated in FIG. 73. Further, an exemplary configuration of a frame format transceived in the communication process is illustrated in FIG. 72.

<Exemplary Configuration of Frame Format>

Figure 72:
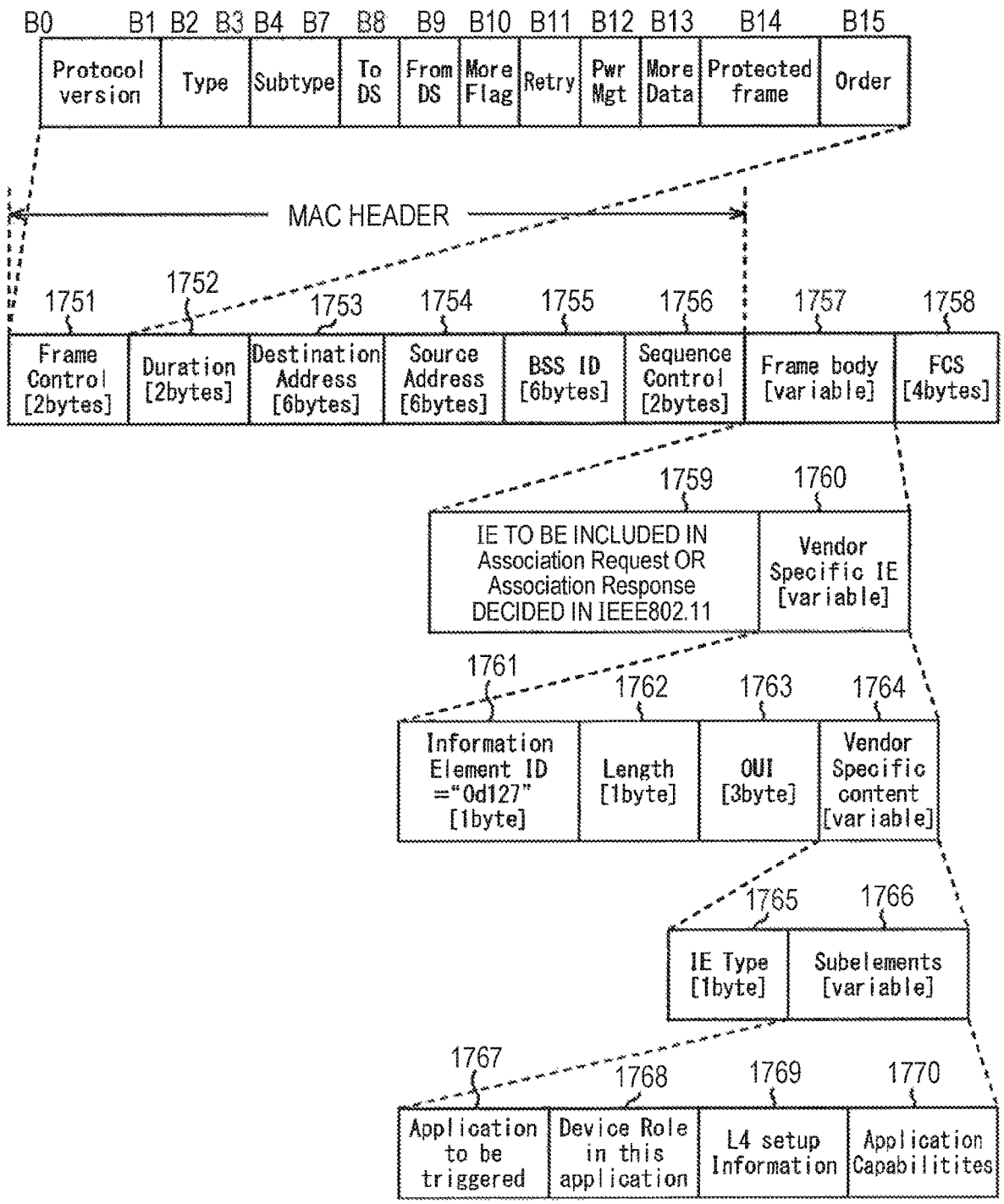
FIG. 72 is a diagram schematically illustrating an exemplary configuration of a frame format transceived in a communication process performed by devices of a wireless communication system.
Figure 73:
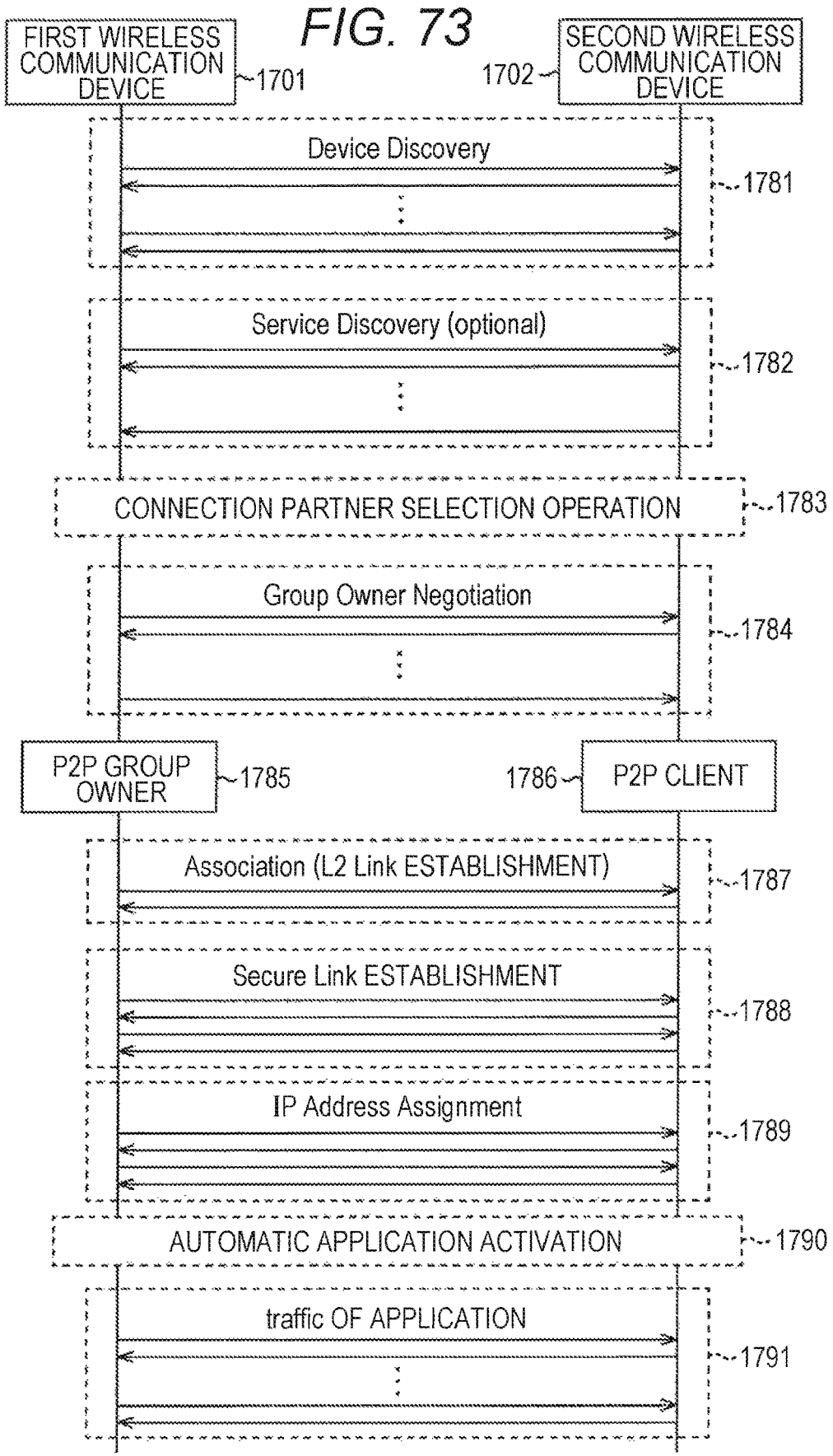
FIG. 73 is a sequence chart illustrating an exemplary communication process performed by devices of a wireless communication system.

FIG. 72 is a diagram schematically illustrating an exemplary configuration of a frame format transceived in a communication process performed by devices serving as the basis of the present technology. In other words, FIG. 72 illustrates an exemplary configuration of an MAC frame used to establish a connection through the second layer. Specifically, an example of a frame format of an association request/response (1787) for implementing the sequence illustrated in FIG. 73 is illustrated.

As illustrated in FIG. 72, an MAC frame includes a frame control (1751) to FCS (1758), and a portion ranging from the frame control (1751) to a sequence control (1756) serves as an MAC header. Further, when an association request is transmitted, B3B2="0b00" and B7B6B5B4="0b0000" are set in the frame control (1751). Further, when an association response is encapsulated, B3B2="0b00" and B7B6B5B4="0b0001" are set in the frame control (1751). Further, "0b00" is "00" in the binary notation, "0b0000" is "0000" in the binary notation, and "0b0001" is "0001" in the binary notation.

Here, the MAC frame (frame body (1757)) illustrated in FIG. 70 is basically an association request/response frame format described in sections 7.2.3.4 and 7.2.3.5 of the IEEE802.11-2007 specification. Here, a difference lies in that independently extended information elements (hereinafter, abbreviated as "IEs") as well as IEs defined in the IEEE802.11 specification (1759) are included.

Further, in order to indicate a vendor specific IE (1760), 127 that is a decimal number is set to an IE type (information element ID (1761)). In this case, through section 7.3.2.26 of the IEEE802.11-2007 specification, a length field (1762) and an OUI field (1763) are subsequent, and a vendor specific content (1764) is subsequently arranged.

As content of the vendor specific content (1764), a field (IE type (1765)) indicating a type of a vendor specific IE is first set. Subsequently, a configuration capable of storing a plurality of subelements (1766) is considered to be given.

As content of the subelement (1766), a name (1767) of a specific application to be used and a device role (1768) when the specific application operates are considered to be included. Further, information (information for L4 setup) (1769) of a specific application, a port number used for control thereof, or the like and information (capability information) (1770) related to the capability in a specific application are considered to be included. Here, for example, when a designated specific application is a DLNA, the capability information is information for specifying whether or not audio transmission/reproduction is supported, whether or not video transmission/reproduction is supported, or the like.

In the wireless communication system having the above configuration, as the present technology described above with reference to FIGS. 1 to 43 is applied, the same effects as the effects described above with reference to FIGS. 1 to 43 can be obtained. In other words, it is possible to suppress an increase in a storage capacity necessary for encoding and decoding. Further, in the wireless communication system, as transmission and reception of data encoded according to the present technology are performed, it is possible to suppress an increase in a storage capacity necessary for encoding and decoding.

In this specification, the description has been made in connection with the example in which various kinds of pieces of information are multiplexed into an encoded stream and transmitted from an encoding side to a decoding side. However, the technique of transmitting the information is not limited to this example. For example, the information may be transmitted or recorded as individual data associated with an encoded bitstream without being multiplexed into an encoded bitstream. Here, a term "associated" means that an image (or a part of an image such as a slice or a block) included in a bitstream can be linked with information corresponding to the image at the time of decoding. In other words, the information may be transmitted through a transmission path different from an image (or a bitstream). Further, the information may be recorded in a recording medium (or a different recording area of the same recording medium) different from an image (or a bitstream). Furthermore, for example, the information and the image (or a bitstream) may be associated with each other in arbitrary units such as units of a plurality of frames, units of frames, or units of parts of a frame.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The present technology can have the following configurations as well.

(1) An image processing device, including:
a receiving unit that receives an encoded bitstream including a syntax element related to an inter-image process; and
an analyzing unit that analyzes the syntax element received by the receiving unit in a state in which a value of the syntax element is restricted when the bitstream is a bitstream encoded based on a profile for encoding a still image.

(2) The image processing device according to any of (3) and (3) to (9), further including a decoding unit that decodes the bitstream using the syntax element analyzed by the analyzing unit.

(3) The image processing device according to any of (1), (2), and (4) to (9), further including a determining unit that determines whether or not the value of the syntax element received by the receiving unit is properly restricted when the bitstream is the bitstream encoded based on the profile for encoding the still image.

(4) The image processing device according to any of (1) to (3) and (5) to (9), further including an abnormality processing unit that performs an abnormality process when the determining unit determines that the value of the syntax element is not properly restricted.

(5) The image processing device according to any of (1) to (4) and (6) to (9), wherein the syntax element is stored in a sequence parameter set of the bitstream.

(6) The image processing device according to any of (1) to (5) and (7) to (9), wherein the syntax element is a syntax related to a reference picture.

(7) The image processing device according to any of (1) to (6), (8), and (9), wherein the syntax element is a syntax related to the number of reference pictures.

(8) The image processing device according to any of (1) to (7) and (9), further including a determining unit that determines whether or not the value of the syntax element received by the receiving unit is a predetermined value.

(9) The image processing device according to any of (1) to (8), wherein the predetermined value is 0.

(10) An image processing method, including:

receiving a syntax element related to an inter-image process; and analyzing the received syntax element in a state in which a value of the syntax element is restricted when the bitstream is a bitstream encoded based on a profile for encoding a still image.

(11) The image processing method according to any of (10) and (12) to (18), further including decoding the bitstream using the analyzed syntax element.

(12) The image processing method according to any of (10), (11), and (13) to (18), further including determining whether or not the value of the received syntax element is properly restricted when the bitstream is the bitstream encoded based on the profile for encoding the still image.

(13) The image processing method according to any of (10) to (12) and (14) to (18), further including performing an abnormality process when the value of the syntax element is determined to be not properly restricted.

(14) The image processing method according to any of (10) to (13) and (15) to (18), wherein the syntax element is stored in a sequence parameter set of the bitstream.

(15) The image processing method according to any of (10) to (14) and (16) to (18), wherein the syntax element is a syntax related to a reference picture.

(16) The image processing method according to any of (10) to (15), (17), and (18), wherein the syntax element is a syntax related to the number of reference pictures.

(17) The image processing method according to any of (10) to (16) and (18), further including determining whether or not the value of the received syntax element is a predetermined value.

(18) The image processing method according to any of (10) to (17), wherein the predetermined value is 0.

REFERENCE SIGNS LIST

100 Image coding device
106 Lossless encoding unit
121 Profile setting unit
131 Syntax element setting unit
132 Encoding unit
200 Image coding device
211 Determining unit
300 Image decoding device
302 Lossless decoding unit
321 Profile determining unit
331 Decoding unit
332 Syntax element analyzing unit
400 Image decoding device
411 Abnormality processing unit
421 Syntax element inspecting unit

The invention claimed is:

1. An image processing device, comprising:
circuitry configured to:
receive a bitstream including a syntax element related to a number of reference pictures used for processing of a sub layer;
analyze a value of the received syntax element related to the number of the reference pictures used for processing of the sub layer, the value being a first value different than 1 and 0 when a profile of the bitstream is a profile for encoding a moving image, and the value being restricted to 1 when a profile of the bitstream is a profile for encoding a still image which indicates that the bitstream has still image data; and
decode the bitstream using the analyzed syntax element when the profile of the bitstream is the profile for encoding the still image,
wherein the syntax element is included in a syntax of a sequence parameter set of the bitstream.

2. The image processing device according to claim 1, wherein the circuitry is further configured to:
determine whether or not the value of the received syntax element is properly set when the bitstream is the bitstream encoded based on the profile for encoding the still image.

3. The image processing device according to claim 2, wherein the circuitry is further configured to:
perform an abnormality process when the value of the syntax element is determined to be not properly set.

4. The image processing device according to claim 1, wherein the syntax element is a syntax related to a maximum of a number of sub layers.

5. The image processing device according to claim 1, wherein the circuitry is further configured to:
determine whether or not the value of the received syntax element is the restricted value.

6. An image processing method, the method being executed via at least one processor, and comprising:
receiving a bitstream including a syntax element related to a number of reference pictures used for processing of a sub layer;
analyzing a value of the received syntax element related to the number of the reference pictures used for processing of the sub layer, the value being a first value different than 1 and 0 when a profile of the bitstream is a profile for encoding a moving image, and the value being restricted to 1 when a profile of the bitstream is a profile for encoding a still image which indicates that the bitstream has still image data; and
decoding the bitstream using the analyzed syntax element when the profile of the bitstream is the profile for encoding the still image,
wherein the syntax element is included in a syntax of a sequence parameter set of the bitstream.

7. The image processing method according to claim 6, further comprising:
determining whether or not the value of the received syntax element is properly set when the bitstream is the bitstream encoded based on the profile for encoding the still image.

8. The image processing method according to claim 7, further comprising:
performing an abnormality process when the value of the syntax element is determined to be not properly set.

9. The image processing method according to claim 6, wherein the syntax element is a syntax related to a maximum of a number of sub layers.

10. The image processing method according to claim 6, further comprising:
determining whether or not the value of the received syntax element is the restricted value.

11. The image processing device according to claim 1, wherein the sub layer is a temporal layer.

12. The image processing device according to claim 1, wherein the value of the received syntax element is set based on a determination of whether a set profile is the profile for encoding the still image or the profile for encoding the moving image.

13. The image processing device according to claim 1, wherein the sub layer is a temporal layer.

14. The image processing device according to claim 1, wherein the syntax element includes num_ref_idx_10_default_active minus1 or num_ref_idx_11_default_active minus1.

* * * * *